(12) United States Patent
Cave et al.

(10) Patent No.: US 11,578,415 B2
(45) Date of Patent: Feb. 14, 2023

(54) ELECTROLYZER AND METHOD OF USE

(71) Applicant: Twelve Benefit Corporation, Berkeley, CA (US)

(72) Inventors: Etosha R. Cave, Berkeley, CA (US); Sichao Ma, Dublin, CA (US); Qun Zeng, Oakland, CA (US); Sara Hunegnaw, Oakland, CA (US); Kendra P. Kuhl, Oakland, CA (US); George Leonard, Oakland, CA (US); Ashley D. Mishra, Danville, CA (US); Ajay R. Kashi, Berkeley, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 177 days.

(21) Appl. No.: 16/697,066

(22) Filed: Nov. 26, 2019

(65) Prior Publication Data
US 2020/0240023 A1 Jul. 30, 2020

Related U.S. Application Data

(60) Provisional application No. 62/939,960, filed on Nov. 25, 2019, provisional application No. 62/772,460, filed on Nov. 28, 2018.

(51) Int. Cl.
*C25B 3/25* (2021.01)
*C25B 9/23* (2021.01)
(Continued)

(52) U.S. Cl.
CPC .................. *C25B 3/25* (2021.01); *C25B 3/03* (2021.01); *C25B 3/07* (2021.01); *C25B 3/26* (2021.01);
(Continued)

(58) Field of Classification Search
CPC ..... C25B 3/23; C25B 3/03; C25B 3/26; C25B 3/25; C25B 3/07
See application file for complete search history.

(56) References Cited

U.S. PATENT DOCUMENTS 4,042,496 A 8/1977 Tsushima et al.
4,089,758 A 5/1978 McAloon
(Continued)

FOREIGN PATENT DOCUMENTS

CA 1071143 2/1980
DE 102016211155 A1 12/2017
(Continued)

OTHER PUBLICATIONS

Office Action dated Nov. 1, 2018, in U.S. Appl. No. 15/586,173.
(Continued)

*Primary Examiner* — Brian W Cohen
(74) *Attorney, Agent, or Firm* — Weaver Austin Villeneuve & Sampson LLP

(57) ABSTRACT

Disclosed are membrane electrode assemblies having a cathode layer comprising a carbon oxide reduction catalyst that promotes reduction of a carbon oxide; an anode layer comprising a catalyst that promotes oxidation of a water; a polymer electrolyte membrane (PEM) layer disposed between, and in contact with, the cathode layer and the anode layer; and a salt having a concentration of at least about 10 uM in at least a portion of the MEA.

34 Claims, 23 Drawing Sheets

(51) Int. Cl.
  *C25B 15/08* (2006.01)
  *C25B 3/03* (2021.01)
  *C25B 3/07* (2021.01)
  *C25B 3/26* (2021.01)
  *C25B 13/08* (2006.01)
(52) U.S. Cl.
  CPC ............... *C25B 9/23* (2021.01); *C25B 15/08* (2013.01); *C25B 13/08* (2013.01)

(56) References Cited

U.S. PATENT DOCUMENTS

| | | |
|---|---|---|
| 4,176,215 A | 11/1979 | Molnar et al. |
| 4,609,440 A | 9/1986 | Frese et al. |
| 4,828,941 A | 5/1989 | Sterzel |
| 4,921,586 A | 5/1990 | Molter |
| 4,959,131 A | 9/1990 | Cook et al. |
| 5,039,389 A | 8/1991 | McMichael |
| 5,601,937 A | 2/1997 | Isenberg |
| 5,992,008 A | 11/1999 | Kindler |
| 6,358,651 B1 | 3/2002 | Chen et al. |
| 7,605,293 B2 | 10/2009 | Olah et al. |
| 7,608,356 B2 | 10/2009 | Risen et al. |
| 7,704,369 B2 | 4/2010 | Olah et al. |
| 7,883,817 B2 | 2/2011 | Hori et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,652,104 B2 | 2/2014 | Goral et al. |
| 8,652,704 B2 | 2/2014 | Sano et al. |
| 8,658,016 B2 | 2/2014 | Lakkaraju et al. |
| 8,721,866 B2 | 5/2014 | Sivasankar et al. |
| 8,845,875 B2 | 9/2014 | Teamey et al. |
| 8,845,878 B2 | 9/2014 | Cole et al. |
| 8,956,990 B2 | 2/2015 | Masel et al. |
| 9,012,345 B2 | 4/2015 | Masel et al. |
| 9,145,615 B2 | 9/2015 | Zhai et al. |
| 9,181,625 B2 | 11/2015 | Masel et al. |
| 9,193,593 B2 | 11/2015 | Masel et al. |
| 9,370,773 B2 | 6/2016 | Masel et al. |
| 9,464,359 B2 | 10/2016 | Masel et al. |
| 9,481,939 B2 | 11/2016 | Masel et al. |
| 9,555,367 B2 | 1/2017 | Masel et al. |
| 9,566,574 B2 | 2/2017 | Masel et al. |
| 9,580,824 B2 | 2/2017 | Masel et al. |
| 10,648,091 B2 | 5/2020 | Kuhl et al. |
| 10,822,709 B2 | 11/2020 | Kulh et al. |
| 10,865,490 B2 | 12/2020 | Ono et al. |
| 10,961,632 B2 | 3/2021 | Ono et al. |
| 10,975,480 B2 | 4/2021 | Masel |
| 10,975,481 B2 | 4/2021 | Guo et al. |
| 11,417,901 B2 | 8/2022 | Ma et al. |
| 2003/0059658 A1 | 3/2003 | Kohler et al. |
| 2005/0239912 A1 | 10/2005 | Archella et al. |
| 2006/0016685 A1 | 1/2006 | Hawkins et al. |
| 2008/0318093 A1 | 12/2008 | Lee et al. |
| 2009/0117436 A1 | 5/2009 | Choi et al. |
| 2010/0159347 A1 | 6/2010 | Choi et al. |
| 2011/0237830 A1 | 9/2011 | Masel |
| 2012/0171583 A1 | 7/2012 | Bocarsly et al. |
| 2012/0328942 A1 | 12/2012 | Thomas-Alyea et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0027303 A1 | 1/2014 | Cole et al. |
| 2014/0093799 A1 | 4/2014 | Masel et al. |
| 2014/0206894 A1 | 7/2014 | Cole et al. |
| 2014/0206896 A1 | 7/2014 | Sivasankar et al. |
| 2014/0291163 A1 | 10/2014 | Kanan et al. |
| 2015/0010804 A1 | 1/2015 | Laramie et al. |
| 2015/0030888 A1 | 1/2015 | Popat et al. |
| 2015/0064602 A1 | 3/2015 | Lee et al. |
| 2015/0136613 A1 | 5/2015 | Li et al. |
| 2016/0107154 A1 | 4/2016 | Masel et al. |
| 2016/0161869 A1 | 6/2016 | Avneri et al. |
| 2017/0183789 A1 | 6/2017 | Matthews et al. |
| 2017/0259206 A1* | 9/2017 | Masel ................ B01J 23/40 |
| 2017/0021334 A1 | 11/2017 | Kulh et al. |
| 2017/0321333 A1 | 11/2017 | Kuhl et al. |
| 2017/0321334 A1 | 11/2017 | Kuhl et al. |
| 2018/0057950 A1 | 3/2018 | Co et al. |
| 2018/0111083 A1* | 4/2018 | Masel ............... B01J 31/0284 |
| 2018/0265440 A1 | 9/2018 | Kudo et al. |
| 2018/0274109 A1 | 9/2018 | Kudo et al. |
| 2018/0274114 A1 | 9/2018 | Ono et al. |
| 2019/0062931 A1* | 2/2019 | Stark .................... C25B 1/04 |
| 2019/0085477 A1 | 3/2019 | Ono et al. |
| 2019/0127865 A1* | 5/2019 | Li ......................... C25B 3/26 |
| 2019/0134570 A1 | 5/2019 | Pintauro et al. |
| 2019/0226103 A1 | 7/2019 | Kuhl et al. |
| 2020/0056294 A1 | 2/2020 | Kanan et al. |
| 2020/0087233 A1 | 3/2020 | Ono et al. |
| 2020/0087805 A1 | 3/2020 | Ono et al. |
| 2020/0216968 A1 | 7/2020 | Hunegnaw et al. |
| 2020/0220185 A1 | 7/2020 | Ma et al. |
| 2020/0240023 A1 | 7/2020 | Cave et al. |
| 2020/0270756 A1 | 8/2020 | Kofuji et al. |
| 2020/0308718 A1 | 10/2020 | Patru et al. |
| 2020/0354843 A1 | 10/2020 | Khul et al. |
| 2020/0376479 A1 | 12/2020 | Masel |
| 2021/0002775 A1 | 1/2021 | Matsumoto et al. |
| 2021/0164116 A1 | 6/2021 | Kuhl et al. |
| 2022/0267916 A1 | 8/2022 | Zhao et al. |

FOREIGN PATENT DOCUMENTS

| | | | |
|---|---|---|---|
| DE | 102016211151 A1 | 1/2018 | |
| DE | 10 2017 208610 | 11/2018 | |
| DE | 102017208610 A1 | 11/2018 | |
| EP | 1193329 A1 | 4/2002 | |
| EP | 3378968 A | 9/2018 | |
| EP | 3453064 A1 | 3/2019 | |
| EP | 1038993 A1 | 9/2020 | |
| JP | H06 145379 | 5/1994 | |
| JP | H10507305 | 7/1998 | |
| JP | 100962903 | 6/2010 | |
| JP | 2013-520779 | 6/2013 | |
| JP | 2014-525115 A | 9/2014 | |
| KR | 10-20140142185 | 12/2014 | |
| WO | WO96/11507 | 4/1996 | |
| WO | WO 2007/041872 A1 | 4/2007 | |
| WO | WO2008124538 | 10/2008 | |
| WO | WO2011-104542 | 9/2011 | |
| WO | WO 2012/006240 A1 | 1/2012 | |
| WO | WO2012-174463 | 12/2012 | |
| WO | WO 2013/006710 A2 | 1/2013 | |
| WO | WO 2013/016447 A2 | 1/2013 | |
| WO | WO-2013089112 A1 | 6/2013 | |
| WO | WO2013/089112 | 6/2013 | |
| WO | WO 2014/018091 A1 | 1/2014 | |
| WO | WO 2014/032000 A1 | 2/2014 | |
| WO | WO 2014/042781 A2 | 3/2014 | |
| WO | WO 2014/043651 A2 | 3/2014 | |
| WO | WO 2014/046797 A2 | 3/2014 | |
| WO | WO 2014/160529 A1 | 10/2014 | |
| WO | WO 2015/035521 A1 | 3/2015 | |
| WO | WO 2016/039999 A1 | 3/2016 | |
| WO | WO 2017/014635 A1 | 1/2017 | |
| WO | WO-2017144395 A1 * | 8/2017 | ............... C25B 1/00 |
| WO | WO2017190234 A1 | 11/2017 | |
| WO | WO-2017192787 A1 | 11/2017 | |
| WO | WO-2018195045 A1 | 10/2018 | |
| WO | WO-2018215174 A1 | 11/2018 | |
| WO | WO-2019185622 A1 | 10/2019 | |
| WO | WO-2020020691 A1 | 1/2020 | |
| WO | WO-2020143970 A1 | 7/2020 | |
| WO | WO-2021007508 A1 | 1/2021 | |

OTHER PUBLICATIONS

Office Action dated Apr. 2, 2019, in U.S. Appl. No. 15/586,173.
Final Office Action dated Jan. 8, 2020, in U.S. Appl. No. 15/586,173.

(56) References Cited

OTHER PUBLICATIONS

Notice of Allowance dated Jan. 29, 2020, in U.S. Appl. No. 15/586,173.
Office Action dated Sep. 16, 2020, U.S. Appl. No. 16/842,659.
Notice of Allowance dated Apr. 13, 2021, U.S. Appl. No. 16/842,659.
Office Action dated Nov. 1, 2018, in U.S. Appl. No. 15/586,182.
Final Office Action dated Apr. 2, 2019, in U.S. Appl. No. 15/586,182.
Office Action dated Dec. 30, 2019, in U.S. Appl. No. 15/586,182.
Office Action dated Jul. 2, 2020, in U.S. Appl. No. 15/586,182.
Notice of Allowance dated Sep. 16, 2020, in U.S. Appl. No. 15/586,182.
Office Action dated Apr. 1, 2021, in U.S. Appl. No. 16/254,255.
CA First Office Action dated Oct. 15, 2019, in Application No. 3,022,807.
CA First Office Action dated Sep. 30, 2019, in Application No. 3,022,812.
CA Second Office Action dated Oct. 14, 2020, in Application No. 3,022,807.
CA Second Office Action dated Aug. 28, 2020, in Application No. 3,022,812.
EP Search Report dated Dec. 2, 2019, in Application No. 17793299.3.
EP Office Action dated Sep. 4, 2020, in Application No. 17793299.3.
EP Search Report dated Dec. 4, 2019, in Application No. 17793300.9.
EP Search Report dated Apr. 20, 2021, in Application No. 21152137.2.
IN Office Action dated Aug. 19, 2020, in Application No. 201817041222.
IN Office Action dated Aug. 10, 2020, in Application No. 201817041221.
JP Office Action dated Jan. 28, 2020, in Application No. 2018-558130.
JP Office Action dated Jan. 28, 2020, in Application No. 2018-558138.
International Search Report and Written Opinion dated Aug. 7, 2017, in PCT Application No. PCT/US2017/030935.
International Preliminary Report on Patentability dated Nov. 15, 2018, in PCT Application No. PCT/US2017/030935.
International Search Report and Written Opinion dated Sep. 13, 2017, in PCT Application No. PCT/US2017/030936.
Preliminary Report on Patentability dated Nov. 6, 2018, in PCT Application 2017/030936.
International Search Report and Written Opinion dated Apr. 30, 2019, for application No. PCT/US19/014586,
International Search Report and Written Opinion dated Apr. 8, 2020, in PCT Application No. PCT/US2019/067169.
International Search Report and Written Opinion dated Mar. 19, 2020, in PCT Application No. PCT/US2019/063471.
International Search Report and Written Opinion issued in PCT Application No. PCT/US2020/062080 dated Mar. 16, 2021.
Aeshala, L.M. et al., "Effect of solid polymer electrolyte on electrochemical CO2, Separation and Purification Technology," 94, (2012), p. 131-137.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
Choo et al. Modulated Ionomer Distribution in the Catalyst Layer of Polymer Electrolyte Membrane Fuel Cells for High Temperature Operation, Chemsuschem, col. 7, Issue 8, Aug. 2014, pp. 2335-2341.
Delacourt et al., "Design of an Electrochemical Cell Making Syngas ($CO + H_2$) from $CO_2$ and $H_2O$ Reduction at Room Temperature," Journal of The Electrochemical Society, (1), (2008), pp. B42-B49.
Delacourt, C., "Electrochemical reduction of carbon dioxide and water to syngas (CO + H2) at room temperature," Manuscript, Environmental Energy Technologies Division, Lawrence Berkeley National Laboratory and Department of Chemical Engineering, University of California Berkeley, 2006-2007, 171 pages.
Endrodi, B. et al., "Continuous-flow electroreduction of carbon dioxide," Progress in Energy and Combustion Science, vol. 62, Jun. 13, 2017, pp. 133-154.
Endrodi, B., "Multilayer Electrolyzer Stack Converts Carbon Dioxide to Gas Products at High Pressure with Multilayer Electrolyzer Stack Converts Carbon," ACS Energy Lett. 2019, 4, 1770-1777.
Hori, Y., "Chapter 48: $CO_2$-reduction, catalyzed by metal electrodes," Handbook of Fuel Cells—Fundamentals, Technology and Applications, vol. 2, Electrocatalysis, 2003. pp. 720-733.
James, B.D., et al. 2017 DOE Hydrogen and Fuel Cells Program Review, Fuel Cell Systems Analysis, Strategic Analysis, Project IDI FC163, Jun. 8, 2017, 34 pages.
Kaczur, J., et al., "A Review of the Use of Immobilized Ionic Liquids in the Electrochemical conversion of $CO_2$," Journal of Carbon Research, ,2020 6, 33, 12.
Kriescher, Stefanie M.A. et al., "A membrane electrode assembly for the electrochemical synthesis of hydrocarbons from $CO_2(g)$ and $HO_2(g)$, Electrochemistry Communications," 50 (2015), pp. 64-68.
Kutz, R. et al., Sustainion Imidazolium-Functionalized Polymers for Carbon Dioxide Electrolysis, Energy Technology, 2017, 5, pp. 929-936.
Li, et al., "Ectrolysis of Co2 to Syngas in Bipolar Membrane- Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Lu et al. "A selective and efficient electrocatalyst for carbon dioxide reduction," Nature communication, Jan. 30, 2014.
Nafion XL, Ion Exchange Materials, "Perfluorosulfonic Acid (PFSA) Membranes for Fuel," CellsFuelCellStore, Product Bulletin P-22, 4 pages.
Pătru, A., et al., "Design Principles of Bipolar Electrochemical Co-Electrolysis Cells Reduction for Efficient Reduction of Carbon Dioxide from Gas Phase at Low Temperature," Journal of the Electrochemical Society, 166 (2), (2019), pp. F34-F43.
Ren, D., et al., "Selective Electrochemical Reduction of Carbon Dioxide to Ethylene and Ethanol on Copper(I) Oxide Catalysts," ACS Catal., 2015, 5, pp. 2814-2821.
Ren, D., "The effects of currents and potentials on the selectivities of copper toward carbon dioxide electroreduction," Nature Communication, 2018, 9:925, p. 1-8.
Sharma, et al., "Electrocatalytic conversion of carbon dioxide to fuels: a review on the interaction between $CO_2$ and the liquid electrolyte," WIREs Energy Environ 2017, 6:e239. doi: 10.1002/wene.239, pp. 1-21.
Salvatore, D., et al. "Electrolysis of Gaseous $CO_2$ to CO in a Flow Cell with a Bipolar Membrane," ACS Energy Letters, 2018, 3, pp. 149-154.
Spets et al. "Direct Glucose Fuel Cell With Anion Exchange Membrane in the Near Neutral State Electrolyte, International Journal of Electrochemical Science," 7, 11696-11705, Dec. 1, 2012, entire document, http.electrochemsci .org/papers/vol?/71211696.pdf.
Srinivasan, S. et al., "Advances in Solid Polymer Electrolyte Fuel Cell Technology with Low Platinum Loading Electrodes," Journal of Power Sources, 22 (1998) pp. 359-375.
Verma et al., "The effect of electrolyte composition on the electroreduction of $CO_2$ to CO on Ag based gas diffusion electrodes," Phys. Chem. Chem. Phys., 2016, 18, pp. 7075-7084.
Xia, Chun, et al., "Continuous production of pure liquid fuel solutions via electrocatalytic $CO_2$ reduction using solid electrolyte devices," Nature Energy, http://www.nature.com/natureenergy; https://doi.org/10.1038/s41560-019-Q451-x.

(56) References Cited

OTHER PUBLICATIONS

Zhu, Wenlei et al., "Active and Selective Conversion of CO2 to CO on Ultrathin Au Nanowires," Journal of American Chemical Society, 2014, 136, pp. 16132-16135.

Zhu, Wenlei et al., "Monodisperse Au Nanoparticles for Selective Electrocatalytic Reduction of $CO_2$ to CO. Journal of the American Chemical Society," 2013, 135, pp. 16833-16836.

U.S. Appl. No. 17/247,036, filed Nov. 24, 2020, Ziyang Huo.

U.S. Appl. No. 17/303,329, filed May 26, 2021, Kuhl.

Casebolt, R., et al., "Effect of Electrolyte Composition and Concentration on Pulsed Potential Electrochemical CO2 Reduction," ChemElectroChem, Chemistry Europe, Accepted Manuscript, 25 pp.

Kim, C., et al., "Impact of Pulsed Electrochemical Reduction of CO2 on the formation of C2+ Products over Cu," ACS Catal., 2020, 10, 12403-12413.

Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.

Xu, Y., et al., "Self-Cleaning CO2 Reduction Systems: Unsteady Electrochemical Forcing Enables Stability," ACS Energy Letters, 2021, 6, pp. 809-815.

International Preliminary Report on Patentability dated Jul. 22, 2021, in PCT Application No. PCT/US2020/012600.

International Preliminary Report on Patentability dated Jun. 10, 2021, in PCT Application No. PCT/US2019/063471.

International Search Report and Written Opinion dated Apr. 2, 2020, in PCT Application No. PCT/US2020/012600.

Nation XL, Ion Exchange Materials, "Perfluorosulfonic Acid (PFSA) Membranes for Fuel," Cells Fuel Cell Store, Product Bulletin P-22, 4 pages.

Office Action dated Jan. 26, 2021, in U.S. Appl. No. 16/736,615.

U.S. Notice of Allowance dated Jul. 7, 2022 in U.S. Appl. No. 16/719,359.

U.S. Office Action dated May 6, 2022, in U.S. Appl. No. 16/736,615.

U.S. Office Action dated Oct. 25, 2021, in U.S. Appl. No. 16/736,615.

U.S. Corrected Notice of Allowability dated Dec. 30, 2021, in U.S. Appl. No. 16/719,359.

U.S Notice of Allowance dated Dec. 21, 2021, in U.S. Appl. No. 16/719,359.

U.S. Notice of Allowance dated Mar. 25, 2022 in U.S. Appl. No. 16/719,359.

U.S. Appl. No. 17/652,255, Inventors Zhao et al., filed Feb. 23, 2022.

U.S. Appl. No. 17/662,225, filed May 5, 2022.

Weekes D.M., et al., "Electrolytic CO2 Reduction in a Flow Cell", Accounts of Chemical Research, 2018, vol. 51 (4), pp. 910-918.

\* cited by examiner 903   905

| Time | NFY_CO before Change | NFY_CO after Change | Voltage Before | Voltage After |
|---|---|---|---|---|
| 13.15 hrs (Add) | 96.99 | 97.29 | 2.79 | 2.78 |
| 71.45 hrs (Add) | 92.90 | 94.96 | 2.89 | 2.79 |
| 97 hrs (Add) | 93 | 94 | 2.80 | 2.79 |
| 141.45 hrs (Change) | 90 | 92 | 2.83 | 2.80 |
| 211.45 hrs (Change) | 88 | 90 | 2.82 | 2.79 |
| 375.5 hrs (Change) | 92.87 | 93.95 | 2.89 | 2.87 |
| 520.5 hrs (Change) | 87 | 88 | 2.86 | 2.86 |

*Figure 19B*

ELECTROLYZER AND METHOD OF USE

CROSS-REFERENCE TO RELATED APPLICATIONS

This application claims the benefit of U.S. Provisional Application Ser. No. 62/772,460, filed on Nov. 28, 2018 and U.S. Provisional Application Ser. No. 62/939,960, filed on Nov. 25, 2019, which are incorporated herein by reference in their entireties and for all purposes.

STATEMENT OF GOVERNMENT SUPPORT

This invention was made with government support under Award Number NNX17CJ02C awarded by the National Aeronautics and Space Administration and Award Number DE-AR0000819 awarded by the U.S. Department of Energy (ARPA-E). The government has certain rights in the invention.

TECHNICAL FIELD

This disclosure relates generally to the electrolytic carbon oxide reduction field, and more specifically to systems and methods for electrolytic carbon oxide reactor operation.

BACKGROUND

Electrolytic carbon dioxide reactors must balance various operating conditions such as reactant composition at the anode and cathode, electrical energy delivered to the anode and cathode, and the physical chemical environment of the electrolyte, anode, and cathode. Balancing these conditions can have a strong impact on the electrolytic reactor's operating voltage, Faradaic yield, and mix of products generated at the cathode, including carbon monoxide (CO) and/or other carbon-containing products (CCPs) and hydrogen.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

On aspect of this disclosure pertains to membrane electrode assemblies (MEAs) that may be characterized by the following features: (a) a cathode layer comprising a carbon oxide reduction catalyst that promotes reduction of a carbon oxide; (b) an anode layer comprising a catalyst that promotes oxidation of a water; (c) a polymer electrolyte membrane (PEM) layer disposed between, and in contact with, the cathode layer and the anode layer; and (d) salt ions from a salt solution that contacts the MEA, wherein the salt in the salt solution has a concentration of at least about 10 uM. The MEA that contacts the salt solution may have a concentration of the salt (or ions of the salt) that deviate from the concentration of salt in the salt solution. In some embodiments, the concentration of salt or salt ions (accounting for multiple counterions donated by a multivalent ion) in the MEA is less than the concentration of salt in the salt solution.

In certain embodiments, the carbon oxide is carbon dioxide and the carbon oxide reduction catalyst comprises gold, silver, copper, or a combination thereof. In certain embodiments, the carbon oxide is carbon monoxide and the carbon oxide reduction catalyst comprises gold, silver, copper, or a combination thereof.

In certain embodiments, the cathode layer comprises an anion conducting polymer. In certain embodiments, the anode layer comprises a cation conducting polymer.

In certain embodiments, the MEA is bipolar, having at least one layer of a cation conducting polymer, and at least one layer of an anion conducting polymer. In some implementations, the PEM layer comprises a polymer electrolyte layer and a cathode buffer layer. As an example, the PEM layer may include a cation conducting polymer and the cathode buffer layer comprises and anion conducting polymer. In some cases, the PEM layer comprises an anion conducting polymer.

In certain embodiments, the salt ions comprise alkali metal ions. In some cases, the salt ions comprise an anion selected from the group consisting of phosphate, sulfate, carbonate, bicarbonate, and hydroxide.

In certain embodiments, the MEA is a bipolar MEA, and the carbon oxide reduction catalyst comprises copper. In some such cases, the salt comprises (i) an alkali metal cation, and (ii) a bicarbonate, a sulfate, or a hydroxide anion. Such salt may be present in the salt solution at a concentration of about 1 mM to about 1M, or about 1 mM to about 50 mM.

In some cases, a bipolar MEA is configured to produce methane by reducing carbon dioxide and/or carbon monoxide at the cathode layer, and wherein the salt ions are sodium ions. In some cases, the bipolar MEA is configured to produce one or more organic compounds having two or more carbon atoms by reducing carbon dioxide and/or carbon monoxide at the cathode layer, and wherein the salt ions comprise ions of potassium, cesium, rubidium, or any combination thereof.

In certain embodiments, the MEA is a bipolar MEA, wherein the carbon oxide reduction catalyst comprises gold, and the salt comprises (i) an alkali metal cation and (ii) a bicarbonate, hydroxide, or sulfate anion. In some implementations, such salt is present in the salt solution at a concentration of about 10 uM to about 200 mM, or about 100 uM to about 20 mM.

In some cases, a bipolar MEA is configured to produce carbon monoxide by reducing carbon dioxide at the cathode layer, and the salt ions comprise alkali metal ions. In some cases, the bipolar MEA comprises substantially no transition metal ions.

In certain embodiments, all polymers in the MEA are anion conducting polymers, and the carbon oxide reduction catalyst comprises copper, and wherein the salt comprises (i) an alkali metal cation and (ii) a bicarbonate or hydroxide anion. In some implementations, the salt is present in the salt solution at a concentration of about 10 mM to about 15M, or about 50 mM to about 1M.

In certain embodiments, the MEA with anion conducting polymers is configured to produce methane by reducing carbon dioxide and/or carbon monoxide at the cathode layer, and wherein the salt ions comprise sodium ions. Such MEA may be configured to produce one or more organic compounds having two or more carbon atoms by reducing carbon dioxide and/or carbon monoxide at the cathode layer, and the salt ions may comprise ions potassium, cesium, rubidium, or any combination thereof.

Some aspects of the disclosure pertain to electrochemical systems configured to electrolytically reduce a carbon oxide. Such systems may be characterized by the following features: (a) a membrane electrode assembly (MEA) comprising: (i) a cathode layer comprising a carbon oxide reduction catalyst that promotes reduction of a carbon oxide, (ii) an anode layer comprising a catalyst that promotes oxidation of a water, and (iii) a polymer electrolyte membrane (PEM) layer disposed between, and in contact with, the cathode layer and the anode layer; and (b) a source of anode water comprising a salt having a concentration of at least about 10 uM in the anode water, wherein the source of anode water is connected to the MEA in a manner allowing the anode water to contact the anode layer and provide the salt to the MEA.

In certain embodiments, the carbon oxide reduction catalyst comprises gold, silver, copper, or a combination thereof. In certain embodiments, the cathode layer comprises an anion conducting polymer. In certain embodiments, the anode layer comprises a cation conducting polymer.

In some implementations, the PEM layer comprises a polymer electrolyte layer and a cathode buffer layer. As an example, the PEM layer may comprise a cation conducting polymer and the cathode buffer layer comprises and anion conducting polymer. In some implementations, the PEM layer comprises an anion conducting polymer.

In certain embodiments, the salt comprises alkali metal ions. In certain embodiments, the salt comprises an anion selected from the group consisting of phosphate, sulfate, carbonate, bicarbonate, and hydroxide.

In some cases, the MEA of an electrochemical system is a bipolar MEA, having at least one layer of a cation conducting polymer, and at least one layer of an anion conducting polymer.

In certain bipolar MEA embodiments, the carbon oxide reduction catalyst comprises copper, and wherein the salt comprises (i) an alkali metal cation, and (ii) a bicarbonate, a sulfate, or a hydroxide anion. As an example, the salt is present in the anode water at a concentration of about 1 mM to about 1M, or about 1 mM to about 50 mM. In some implementations, the bipolar MEA is configured to produce methane by reducing carbon dioxide and/or carbon monoxide at the cathode layer, and the salt comprises sodium ions. In some implementations, the bipolar MEA is configured to produce one or more organic compounds having two or more carbon atoms by reducing carbon dioxide and/or carbon monoxide at the cathode layer, and the salt comprises ions of potassium, cesium, rubidium, or any combination thereof.

In certain bipolar MEA embodiments, the carbon oxide reduction catalyst comprises gold, and the salt comprises (i) an alkali metal cation and (ii) a bicarbonate, hydroxide, or sulfate anion.

In some cases, the salt is present in the anode water at a concentration of about 10 uM to about 200 mM, or about 100 uM to about 20 mM. In some cases, the bipolar MEA is configured to produce carbon monoxide by reducing carbon dioxide at the cathode layer, and the salt comprises alkali metal ions. In some implementations, the bipolar MEA configured to produce carbon monoxide comprises substantially no transition metal ions.

In certain embodiments, all polymers in the MEA are anion conducting polymers, and the carbon oxide reduction catalyst comprises copper, and wherein the salt comprises (i) an alkali metal cation and (ii) a bicarbonate or hydroxide anion. In some implementations, the salt is present in the anode water at a concentration of about 10 mM to about 15M, or about 50 mM to about 1M. In certain embodiments, the MEA with anion conducting polymers is configured to produce methane by reducing carbon dioxide and/or carbon monoxide at the cathode layer, and wherein the salt comprises sodium ions. In certain embodiments, the MEA with anion conducting polymers is configured to produce one or more organic compounds having two or more carbon atoms by reducing carbon dioxide and/or carbon monoxide at the cathode layer, and wherein the salt comprises ions potassium, cesium, rubidium, or any combination thereof.

In certain embodiments, electrochemical system additionally includes a recirculation loop connected to the MEA and configured to recover anode water from the MEA, store and/or treat recovered anode water, and supply stored or treated anode water to the MEA. In some cases, the recirculation loop comprises a reservoir for storing the anode the water. In some cases, the recirculation loop comprises an inlet for receiving purified water. In certain embodiments, the recirculation loop comprises an anode water purification element configured to remove impurities from the anode water. In some embodiments, the recirculation loop is connected to the source of anode water.

In certain embodiments, the electrochemical system additionally includes a cathode water conduit connected to the anode water recirculation loop. The cathode water conduit may be configured to provide the recirculation loop with water recovered from a carbon oxide stream after the carbon oxide stream has contacted the cathode layer of the MEA. In some cases, the electrochemical system additionally includes a water separator coupled to the cathode water conduit and configured to separate cathode water from the carbon oxide stream.

Other aspects of the disclosure pertain to methods of electrolytically reducing a carbon oxide. Such methods may be characterized by the following operation (in any order): (a) providing a salt solution to a membrane electrode assembly (MEA) comprising (a) a cathode layer comprising a carbon oxide reduction catalyst that promotes reduction of a carbon oxide; (b) an anode layer comprising a catalyst that promotes oxidation of a water; and (c) a polymer electrolyte membrane (PEM) layer disposed between, and in contact with, the cathode layer and the anode layer, wherein the salt solution comprises at least about 10 uM of a salt; and (b) electrolytically reducing a carbon oxide at the cathode of the MEA while the MEA is in contact with the salt solution.

In various embodiments, the methods may employ MEAs, salts, and associated system components as set forth above for the MEA and electrochemical system aspects of this disclosure. Note that while some aspects described above supply salt to an MEA via anode water, not all methods require this. For example, the salt may preloaded to the MEA by infusing salt into the MEA prior to operation.

In some embodiments, the methods provide the salt solution to the MEA by supplying anode water to the anode layer of the MEA. In some implementations, the methods additionally include (i) recovering anode water that was supplied to the MEA, and (ii) recirculating recovered anode water to the anode layer of the MEA. In some implementations, the methods additionally include storing and/or treating the recovered anode water before recirculating the recovered anode water to the anode layer of the MEA. In some implementations, the methods additionally include purifying the anode water and/or the recovered anode water to remove impurities from the anode water.

In certain embodiments, the methods additionally include (i) recovering water from a carbon oxide stream after the carbon oxide stream has contacted the cathode layer of the MEA, and (ii) providing recovered water from the carbon oxide stream to the anode layer of the MEA.

These and other features of the disclosure will be presented in more detail below with reference to the associated drawings.

BRIEF DESCRIPTION OF THE FIGURES

FIGS. 19A and 19B (table) illustrate the selectivity and voltage improvement after fresh salt solution is added or replace the old solution in the anolyte reservoir.

DETAILED DESCRIPTION

Introduction and Overview

Figure 1A:
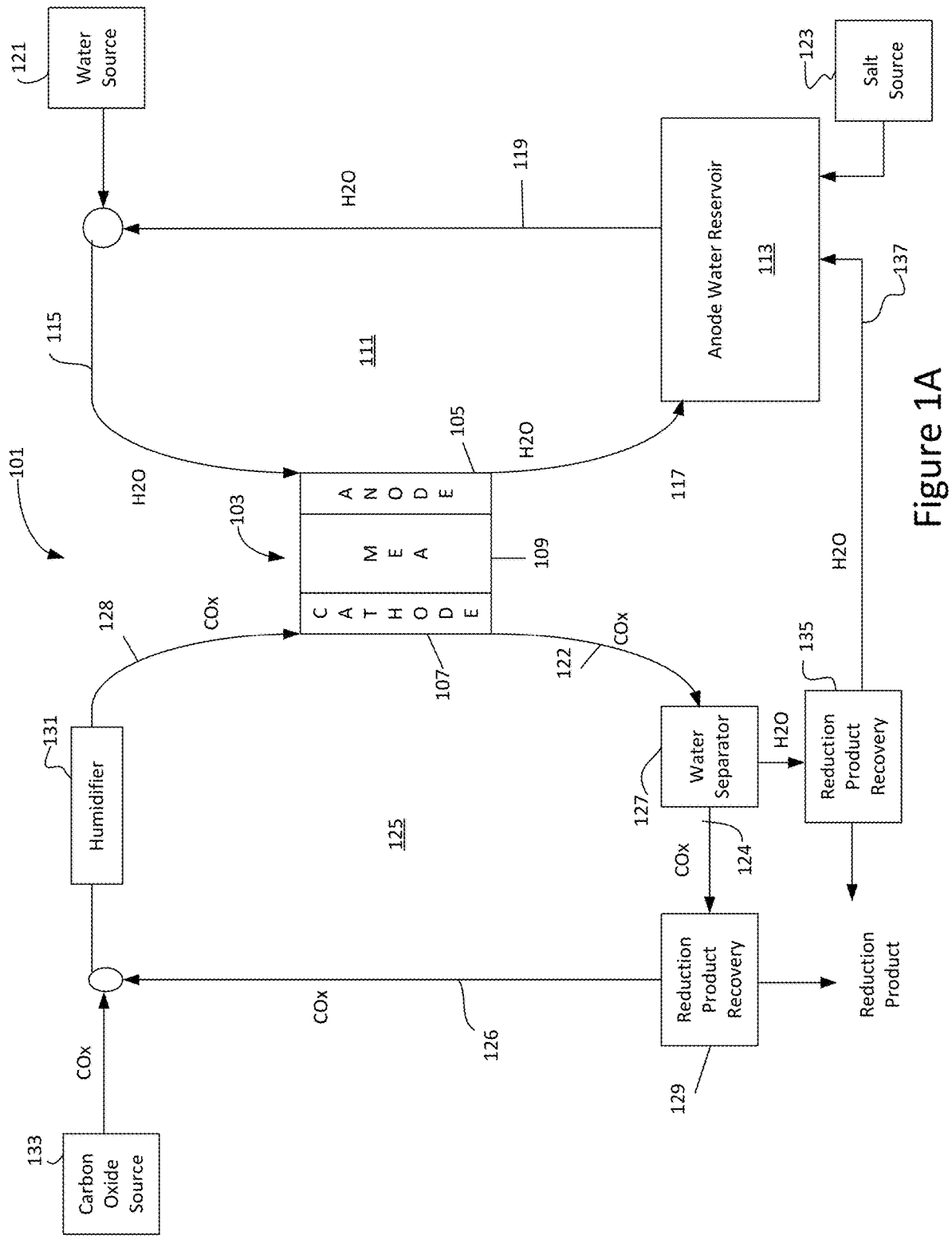
FIG. 1A is an illustration of an example of an electrolytic carbon oxide reduction system that may be used to control water composition and flow in an MEA cell.

Polymer-electrolyte membrane electrolyzers are used for electrolyzing water to produce oxygen at the anode and hydrogen at the cathode. In a typical water electrolyzer, care is taken to prepare the membrane-electrode assembly so that no ions besides $H^+$ or $OH^-$ are introduced. And, during operation, only pure water is introduced to the anode side of the cell.

An electrolyzer system of the present disclosure can produce oxygen at the anode from water oxidation and one or more carbon-based compounds through the electrochemical reduction of carbon dioxide or other carbon oxide introduced to the cathode. As used herein, the term carbon oxide includes carbon dioxide and/or carbon monoxide. In some embodiments, carbon monoxide is used as a reducible reactant. In some embodiments carbon dioxide is used as a reducible reactant. In some embodiments, a mixture of carbon dioxide and carbon monoxide is used as a reducible reactant.

In contrast to water electrolyzers, where salt ions are not desirable, the inventors have found that salt ions can have a positive impact on carbon oxide electrolyzer performance. Cations may be introduced to the carbon oxide electrolyzer through water circulating through the anode of the electrolyzer or by incorporation into the polymer-electrolyte membrane, catalyst, or catalyst support used to make the membrane-electrode assembly.

The presence of salts has been observed to decrease the MEA cell voltage, improve Faradaic yield, change the product selectivity, and/or decrease the decay rate of operating parameters (e.g., voltage efficiency) during operation of a carbon oxide reduction electrolyzer.

The introduction of salt ions may affect the carbon oxide electrolysis performance through any of several possible mechanisms. While not wishing to be bound by theory, the following is list of example mechanisms by which salts may influence operation of an MEA cell during electrolytic carbon oxide reduction.

The presence of cations and/or anions from a salt reduces the activation energy of one or more catalytic pathways. This may be due to any of many possible mechanisms. For example, a salt may change the local electrolyte structure and/or electron density on the catalyst surface. It has been observed that salt ions increase in Faradaic yield in some carbon oxide reduction systems. It has also been observed that the presence of particular ions changes the selectivity of a catalyst for one reaction over another.

Cations and/or anions from a salt may help hydrate polymer-electrolyte, particularly anion exchange polymers. Ions travel as hydrates; i.e., they carry water molecules with them as they move across polymer layers. Hydration of the MEA, and particularly portions the MEA close to the cathode catalyst, may facilitate the reduction reaction by preventing the flowing carbon oxide from evaporating water in the MEA. In general, salt ions may promote hydration of the MEA, particularly at regions of the MEA susceptible to drying. In various embodiments, the presence of salt in the polymer renders the polymer more hygroscopic.

The presence of salts and the ions from a salt may increase the conductivity of one or more MEA layers. In particular, the ions may increase the conductivity of anion exchange polymers, which tend to have relatively low conductivity compared to cation exchange polymers. Increasing conductivity of the polymers may reduce the overall resistance of the MEA cell.

The presence of a salt may raise the pH of one or more polymer-electrolyte layers. This should be compared with proton donating additives, which lower the polymers' pH.

The presence of cations and/or anions from a salt changes water uptake and swelling of polymer electrolyte layers. If volumetric changes due to swelling are mismatched between the anode side and the cathode side of an MEA, mechanical stress on the MEA can degrade cell performance. In certain embodiments, the presence of a salt at a defined concentration tunes the relative amounts of swelling in two or more different layers of an MEA to equalize the swelling exhibited by these layers.

The presence of cations and/or anions provided by salts may change the conductivity at the interface between two layers of the MEA. In a bipolar interface, for example, protons may have to jump across an interfacial gap to meet anions. This jump has an associated resistance. The presence of a salt may decrease the barrier to protons and anions coming together across the interface. Note that pores in Nafion and similar polymers have sulfonic acid groups to allow protons to move with low resistance. At a bipolar interface, these groups are not present to facilitate continued movement. A salt can provide a non-charge depleted region at the interface to facilitate protons and anions coming together (e.g., protons come from the anode side and react with bicarbonate ions from the cathode side). Stated another way, a salt solution present at the interface may provide a conductive bridge or and ionically conductive bridge between the anion conducting polymer and the cation conducting polymer.

Cations and/or anions provided by a salt may provide a counter ion for charged carbon-based species formed by the cathode reduction reaction. Such charged species require an available counter ion to maintain charge neutrality. In some implementations, the reduction reaction at the cathode produces a carboxylate product (e.g., formate, oxalate, or acetate). However, if there are relatively few available cations, the reaction may be disfavored. This may be the case where the cathode layer comprises an anion exchange polymer, such as an anion exchange membrane (AEM), which blocks the flux of protons (potential counterions). Cations donated by a salt may provide the needed species to facilitate carboxylate-producing reactions.

A salt concentration gradient may induce osmotic pressure. For example, the salt concentration may be greater on the anode side, which draws water away from the cathode and thereby reduces the occurrence of cathode flooding. Note that water present on the cathode side may be provided, at least in part, by reaction of hydrogen ions and bicarbonate ions in the MEA interior. This water does not initially have salt ions, which contributes to the concentration gradient.

Characteristics of Salt Used in MEA Cell

Various types of salt may be used in an MEA cell. Such salts may have inorganic or organic cations and anions. The salt composition may affect cell operating conditions such as overpotential, Faradaic efficiency, and/or selectivity among multiple carbon oxide reduction reactions. Various factors influencing the choice of salt composition are described herein.

Cation Reactivity

The salt composition may depend on the catalyst used at the cathode. In certain embodiments, the salt does not contain a cation that could poison the cathode catalyst. For example, the salt may not contain a cation that could be reduced at a cathode catalyst such as a catalyst comprising gold or another noble metal. Such catalysts are sometimes used in MEA cells configured to reduce carbon dioxide to carbon monoxide or other reduction product. It has been found that reduction of metal ions such as iron or other transition metal ions on catalyst particles can poison the catalyst or otherwise decrease the catalytic conversion of carbon dioxide to a reduction product such as carbon monoxide.

In certain embodiments, a salt employed in a carbon oxide reduction reactor contains only cations that are not reducible in an aqueous medium to elemental metal under operating conditions for carbon dioxide reduction at a cathode. In certain embodiments, a salt employed in the reactor does not have transition metal ions. In certain embodiments, a salt employed in the reactor has only alkali metal cations and/or alkaline earth element cations.

While generation of carbon monoxide from carbon dioxide may be performed with a gold or silver catalyst, generation of hydrocarbons and/or organic oxygen-containing compounds from a carbon oxide may be performed with a copper or other transition metal catalyst at the cathode. In some cases, a salt employed in a cell configured to produce hydrocarbons and/or organic oxygen-containing compounds has one or more cations that are not alkali metal ions or alkaline earth element ions. For example, an MEA with a transition metal catalyst may be configured with a salt comprising one or more transition metals.

The types of salts used as well as their concentration may vary depending upon whether the carbon oxide reduction reactor is one that uses a bipolar MEA, one that uses an anion exchange polymer only MEA, or one that uses some other MEA configuration. A cell configured to reduce carbon monoxide may employ an anion exchange polymer only MEA because little or no bicarbonate is formed at the cathode and so the MEA need not include a cation-conducting polymer to block bicarbonate transport to the anode where it could liberate carbon dioxide that would otherwise be used in a reduction reaction at the cathode. Such cells may employ salts that contain cations of transition metals or other metals that might poison a noble metal catalyst. In certain embodiments, a carbon dioxide reduction cell having a bipolar MEA employs a salt that does not have transition metal ions.

In certain embodiments, the salt contains a cation that adjusts the pH at one or more locations in a carbon oxide reducing cell (e.g., at the anode, the cathode, or an intermediate ionically conductive polymer layer). In some cases, during operation, the salt adjusts the pH to be more acidic or more basic at one or more such locations. In certain embodiments, the anion is ammonium, a derivatized ammonium cation such as a quaternary ammonium ion, an alkali metal ion, or an alkaline earth metal ion.

Anion Reactivity

The salt composition may be influenced by the reaction at the anode of a carbon dioxide reduction cell. In certain embodiments, a salt contains an anion that does not readily oxidize at the anode and/or does not readily reduce at the cathode under operating conditions of the cell. In certain embodiments, the anion is not a halide. In some cases, the anion is not chloride, bromide, or iodide. Halides potentially oxidize at the anode where they could form elemental halogen. Note that in certain embodiments, however, a halide is used in a carbon dioxide reduction cell where the reduction product is a halogenated compound. In certain embodiments, a salt has an anion that is not an oxidizable nitrogen-containing anion such as a nitrite or an amine. In certain embodiments, a salt has an anion that is not an organic anion; for example, the salt does not contain a carboxylate ion.

In certain embodiments, the salt contains an anion that adjusts the pH at one or more locations in a carbon oxide reducing cell (e.g., at the anode, the cathode, or an intermediate ionically conductive polymer layer). In some cases, during operation, the salt adjusts the pH to be more acidic or more basic at one or more such locations. In certain embodiments, the anion is hydroxide, bicarbonate, sulfite, or sulfate.

Ionic Mobility

One consideration in choosing the cation and/or an anion of a salt is the ion's mobility. In certain embodiments, the ion has a relatively high mobility in the polymers of an MEA. In some cases, one or more layers of an MEA with the salt present each have an ionic conductivity of at least about 4 mS/cm. In some implementations, ions that are relatively small in atomic weight are used. In some cases, the cation of the salt has an atomic or molecular weight of about 140 or lower, or about 90 or lower, or about 40 or lower. In some cases, the anion of the salt has an atomic or molecular weight of about 100 or lower.

Solubility

In certain embodiments, the salt is relatively soluble in aqueous media. For example, the salt may have a solubility of at least about 1 mol/L, or least about 2 mol/L, or at least about 10 mol/L in otherwise deionized water at 25° C.

Product Selectivity, Voltage Efficiency, Lifetime Improvement, and Decay Rate Decrease The type of the salt can impact product selectivity in an MEA cell. The choice of one cation over another may change the ratio of one product over another by, e.g., at least about 10%.

In certain embodiments, a sodium-containing salt such as sodium bicarbonate when used in an MEA cell with a gold catalyst on the cathode selectively increases production of carbon monoxide over the byproduct hydrogen during carbon dioxide reduction. This increase in carbon monoxide production is observed in comparison to similar gold catalyst-containing MEA cells containing no salt. For example, an MEA cell having a gold catalyst and employing sodium bicarbonate may increase the carbon monoxide production by at least about 100% when compared to a similar MEA cell that uses no salt. In other words, an MEA cell employing a sodium-containing salt such as sodium bicarbonate generates carbon monoxide in a molar quantity that is at least about two-fold higher than that produced by the same MEA cell operated in the same way but with substantially no salt. In some embodiments, the MEA cell employing a sodium containing salt generates carbon monoxide in a molar quantity that is at least about three-fold higher. In some cases, an MEA cell employing a potassium containing salt such as potassium bicarbonate generates carbon monoxide in a molar quantity that is at least about two-fold higher than that produced by the same MEA cell operated in the same way but with substantially no salt. In some cases, an MEA cell employing a salt with higher atomic weight alkali metal such as cesium or rubidium generates carbon monoxide in a molar quantity that is at least about two-fold higher than that produced by the same MEA cell operated in the same way but with substantially no salt.

In some implementations, an MEA cell configured to produce carbon monoxide from carbon dioxide employs an alkali metal containing salt and is operated in a manner that produces products at the cathode having at least about 70 mole % carbon monoxide or at least about 80 mole % carbon monoxide among various products, but not including unreacted carbon dioxide. Other products that may be produced at the cathode include hydrogen, one or more hydrocarbons, one or more carbonyl-containing products, and the like. An MEA cell configured to produce carbon monoxide may comprise gold, silver, or other noble metal at the cathode. An MEA cell configured to produce carbon monoxide may comprise a bipolar membrane assembly.

In certain embodiments, the concentration of a sodium, potassium, cesium, or rubidium containing salt in water delivered to an MEA cell is about 1 mM to 20 mM. This concentration range may apply to MEA cells configured to produce carbon monoxide from carbon dioxide. In certain embodiments, such cells comprise a gold or other noble metal as a cathode catalyst. As used herein, a noble metal is a metal that strongly resists chemical action. Examples include platinum and silver, in addition to gold.

In some cases, MEA cells with relatively smaller surface areas (e.g., about 10 $cm^2$ to about 50 $cm^2$ assuming a planar face) skew to a relatively lower concentration range, such as from about 1 mM to 5 mM, while MEA cells with relatively larger surface areas (e.g., about 50 $cm^2$ to about 1000 $cm^2$) skew to a relatively higher concentration range, such as from about 5 mM to 20 mM.

In certain embodiments, a salt such as sodium bicarbonate when supplied via anode water to an MEA cell with a gold catalyst on the cathode improves energy efficiency by about 9%-25%. Further, in certain embodiments, desirable levels of selectivity for CO and cell voltage, observed during initial operation of a cell, are more than an order of magnitude more stable when the salt solution is used.

In some cases, an MEA cell employing a sodium containing salt such as sodium bicarbonate has a voltage efficiency for producing carbon monoxide that is at least about 5% higher than the voltage efficiency of the same MEA cell operated in the same way but with substantially no salt. In some cases, the MEA cell employing a sodium containing salt such as sodium bicarbonate has a voltage efficiency for producing carbon monoxide that is at least about 10% higher, or at least about 20% higher, than the voltage efficiency of the same MEA cell operated in the same way but with no substantially salt. In some cases, an MEA cell employing a potassium containing salt such as potassium bicarbonate has a voltage efficiency for producing carbon monoxide that is at least about 5% higher than the voltage efficiency of the same MEA cell operated in the same way but with substantially no salt. In some cases, an MEA cell employing a salt with a higher atomic weight alkali metal such as cesium or rubidium has a voltage efficiency for producing carbon monoxide that is at least about 5% higher than the voltage efficiency of the same MEA cell operated in the same way but with substantially no salt. In certain embodiments, the voltage efficiency for producing carbon monoxide in a bipolar MEA having gold or other noble metal cathode catalyst is at least about 25%.

As an example, a tested cell with no salt in the anode water has an average voltage of 3.86V and an average CO Faradaic yield of 0.53 for the first hour at 0.5 $A/cm^2$ and decay rate of 144 mV/hour and 0.018 CO Faradaic yield/ hour for hours 2-5 at 500 mA/cm². In comparison, the same cell operated with 2 mM NaHCO₃ has an average voltage of 3.52 V and an average CO Faradaic yield of 0.936 for the first hour at 0.5 A/cm² and decay rate of 15.5 mV/hour and 0.001 CO Faradaic yield/hour for hours 2-5 at 500 mA/cm². In certain embodiments, an MEA cell configured to produce carbon monoxide from carbon dioxide has an average voltage of at most about 3.6 V for the first hour of operation and a decay rate of no more than about 16 mV/hour for hours 2-5.

In certain embodiments, the voltage efficiency and/or the product selectivity for carbon monoxide production in an MEA cell employing a sodium, potassium, cesium, or rubidium containing salt in water is stable over a period of operation that is at least 10 times longer than that of a corresponding MEA cell operated in the same way, over the same period, but with substantially no salt. In certain embodiments, the voltage for carbon monoxide production in an MEA cell employing an aqueous sodium, potassium, cesium, or rubidium containing salt does not increase by more than about 0.5%, or by more than about 16 mV per hour, at an applied current density of 600 mA/cm² or lower for more than 8 hours of operation. In certain embodiments, the mole fraction of carbon monoxide among all other products (excluding carbon dioxide) produced at the cathode of an MEA cell employing an aqueous sodium, potassium, cesium, or rubidium containing salt does not decrease by more than about 1% per hour, at an applied current density of 600 mA/cm² or lower for more than 8 hours of operation. In certain embodiments, the voltage for carbon monoxide production in an MEA cell employing an aqueous sodium, potassium, cesium, or rubidium containing salt does not increase by more than about 0.03%, or by more than about 0.05 mV per hour, at an applied current density of 300 mA/cm² or below for more than 100-hour operation. In certain embodiments, the mole fraction of carbon monoxide among all other chemicals produced at the cathode of an MEA cell employing an aqueous sodium, potassium, cesium, or rubidium containing salt does not decrease by more than about 0.1% per hour, at an applied current density of 300 mA/cm² or lower for more than 100-hour operation.

Faraday efficiency, which is also sometimes referred to as Faradaic yield, coulombic efficiency or current efficiency, is the efficiency with which charge is transferred in a system facilitating an electrochemical reaction. The use of Faraday's constant in Faradaic efficiency correlates charge with moles of matter and electrons. Faradaic losses are experienced when electrons or ions participate in unwanted side reactions. These losses appear as heat and/or chemical byproducts.

Voltage efficiency describes the fraction of energy lost through overpotential or resistance to charge movement in the MEA cell. For an electrolytic cell this is the ratio of a cell's thermodynamic potential divided by the cell's experimental cell voltage, converted to a percentile. Losses in a cell's voltage due to overpotentials are described by voltage efficiency. For a given type of electrolysis reaction, electrolytic cells with relatively higher voltage efficiencies have relatively lower overall cell voltage losses due to resistance.

In certain embodiments, a sodium containing salt such as sodium bicarbonate when used in a bipolar MEA cell with copper catalyst on the cathode produces methane with improved voltage efficiency in proportion with increasing salt concentration. An increase in voltage efficiency by 6.5% was observed when increasing salt concentration from 3 mM to 20 mM sodium bicarbonate.

In certain embodiments, a sodium-containing salt such as sodium bicarbonate when used in a bipolar MEA cell with copper catalyst on the cathode produces methane with improved voltage efficiency as compared to deionized water. At least about a 30% improvement in initial voltage efficiency and at least about 8× improvement in voltage decay rate was seen when sodium bicarbonate was used as anolyte as compared to deionized water.

In certain embodiments, a potassium containing salt such as potassium bicarbonate used in an MEA cell having a copper catalyst on a cathode selectively produces ethanol and ethylene over methane during carbon dioxide reduction. By contrast, a sodium containing salt such as sodium bicarbonate when used in an MEA cell having a copper catalyst on a cathode selectively produces methane during carbon dioxide reduction. In MEA cells employing copper reduction catalysts, salts with higher atomic weight cations increase the Faradaic yield of multi-carbon products (e.g., ethylene).

In one example, a bipolar MEA setup with copper catalyst at the cathode was used with anolyte sodium bicarbonate in the concentration of 3 mM to give product selectivity distribution of about 61.3 mole % methane, about 3 mole % ethylene, about 1.3 mole % carbon monoxide and about 28.5 mole % hydrogen. This demonstrated a high ratio of methane to ethylene (over 20:1) when carbon dioxide electrolysis is performed in the presence of a sodium salt.

In one example, a cell comprising a bipolar MEA with copper catalyst at the cathode and sodium bicarbonate salt as anolyte at a conductivity of 279 microSiemens (~3 mM concentration) was shown to produce about 40% methane, about 20 mole % ethylene, about 1 mole % carbon monoxide and about 17 mole % hydrogen. When the salt solution of the same setup was changed to potassium bicarbonate of a similar conductivity (~2 mM) a significant product selectivity change was observed. The total ethylene and liquid C2-C3 production was increased by about 170 mole %, accompanied by about a 73 mole % decrease in methane production, and about a 40 mole % decrease in hydrogen.

In various embodiments, potassium cation salts favor a selectivity for ethylene by a mole ratio of at least about 5:1 over methane. In various embodiments, sodium cation salts favor a selectivity of methane by a mole ratio of at least about 20:1 over ethylene. These embodiments apply to bipolar MEA cells. In some cases, the MEA cells employ a copper catalyst. Cesium has a similar effect as potassium with bipolar MEA cells.

In certain embodiments, a bipolar MEA cell with copper catalyst and a sodium-containing salt gives a methane from carbon dioxide Faradaic efficiency of at least about 50% (e.g., up to about 73%). In certain embodiments, a bipolar MEA cell with copper catalyst and a potassium-containing salt gives an ethylene from carbon dioxide Faradaic efficiency of at least about 20% (e.g., up to about 33%). Cesium may be employed with similar effect to potassium with bipolar MEA cells. In certain embodiments, an anion conducting polymer only cell with copper catalyst and a potassium-containing salt gives an ethylene from carbon dioxide Faradaic efficiency of at least about 30% (e.g., about 41%).

In some implementations, an MEA cell configured to produce methane from carbon dioxide employs a sodium containing salt and is operated in a manner that produces products at the cathode having at least about 50 mole % methane or at least about 70 mole % methane. Other products that may be produced at the cathode include hydrogen, carbon monoxide, one or more two or more carbon organic molecules, and the like. An MEA cell configured to produce methane may comprise copper or other transition metal at the cathode. An MEA cell configured to produce methane may comprise a bipolar membrane assembly.

In some implementations, an MEA cell configured to produce ethylene and/or other organic compounds having two or more carbon atoms from carbon dioxide employs a potassium, cesium, or rubidium-containing salt and is operated in a manner that produces products at the cathode having at least about 60 mole % ethylene and/or other organic compounds having two or more carbon atoms or at least about 80 mole % ethylene and/or other organic compounds having two or more carbon atoms. Other products that may be produced at the cathode include hydrogen, methane, and carbon monoxide. An MEA cell configured to produce ethylene and/or other organic compounds having two or more carbon atoms may comprise copper or other transition metal at the cathode. An MEA cell configured to produce ethylene and/or other organic compounds having two or more carbon atoms may comprise a bipolar membrane assembly.

In certain embodiments, the voltage efficiency and/or the product selectivity for methane or organic compound production in an MEA cell employing a sodium, potassium, cesium, or rubidium containing salt in water does not decrease by more than about 1%, or by more than about 0.3%, or by more than about 0.01%, over 90 A-hr.

The cathode catalysts described herein include alloys, doped materials, and other variants of the listed material. For example, an MEA cathode catalyst described as containing gold or other noble metal is understood to include alloys, doped metals, and other variants of gold or other noble metals. Similarly, an MEA cathode catalyst described as containing copper or other transition metal is understood to include alloys, doped metals, and other variants of copper or other transition metals.

Representative Examples of Salts

In certain embodiments, a salt employed in the reactor has cations that are not ions of transition metals. In certain embodiments, the salt contains a cation that is an alkali metal on or an alkaline earth metal ion. In certain embodiments, the salt contains a lithium ion, sodium ion, potassium ion, cesium ion, and/or a rubidium ion. In certain embodiments, the salt contains no cations other than sodium, and/or potassium ions. In some implementations, the salt contains only cations that are monovalent such as alkali metal ions.

In certain embodiments, the salt contains an anion that is hydroxide, bicarbonate, carbonate, perchlorate, phosphate, or sulfate. In some cases, the salt contains an anion that is hydroxide, bicarbonate, carbonate, or sulfate. In certain embodiments, the salt contains no halide ions. In certain embodiments, the salt contains an anion that is produced from the carbon oxide reduction reaction. Examples include carboxylates such as formate, oxalate, and acetate.

In certain embodiments, the salt is selected from the group including sodium bicarbonate, potassium bicarbonate, potassium sulfate, sodium sulfate, cesium bicarbonate, cesium sulfate, and any combination thereof.

In some cases, an MEA employs multiple salts or a mixed salt. For example, the MEA may employ multiple cations (e.g., sodium and potassium ions) but only a single anion (e.g., sulfate). In another example, the MEA employs only a single cation (e.g., sodium ions) but multiple anions (e.g., bicarbonate and sulfate). In yet another example, the MEA employs at least two cations and at least two anions. In certain embodiments, the salts include a combination of sodium bicarbonate and potassium bicarbonate. In certain embodiments, the salts include a combination of potassium bicarbonate and potassium phosphate.

Delivery of Salt to MEA

A salt may be delivered to the cell in various ways. In one example, a salt is provided with an MEA as fabricated and/or is provided with a reconstituted MEA. In another example, a salt is provided with a feedstock (a reactant containing composition) to the anode or cathode. In some implementations, water is a reactant at the anode and a salt is provided with the anode reactant. Water supplied to the anode is sometimes termed "anode water." The anode water may be an aqueous solution that, during operation, is flowed to the anode. In some embodiments, the anode reaction is oxidation of water to produce oxygen. In some embodiments, liquid water containing a salt is delivered to the cathode in any of various ways. For example, the salt may be delivered via flowing a liquid solution to the cathode during operation. The liquid may contain dissolved carbon dioxide or dissolved carbon monoxide. In some cases, aqueous solutions of salt are delivered to the cathode as a mixture of liquid and gas. For example, a salt solution may be sprayed on the MEA.

Salt-containing solution provided to the MEA directly or via anode water during operation may be prepared in various ways. In some cases, salt-containing solutions are made by dissolving salt directly in water. In some cases, salt-containing solutions are made by passing water through a resin (optionally in a column) that releases salt into the water.

Salt Concentration

In embodiments where salt is provided to the MEA by way of liquid water such as anode water, the salt may be provided at a set concentration. The salt concentration may vary depending upon the MEA configuration and the particular cathode catalyst employed, as well as the associated carbon oxide reduction reaction.

In some embodiments employing a bipolar membrane MEA, the salt is provided in an aqueous solution at a concentration of about 1 mM to about 30 mM or at a concentration of about 3 mM to about 30 mM. In some embodiments employing a bipolar membrane MEA, the salt is provided at a concentration of about 2 mM to about 15 mM. In some embodiments employing a bipolar membrane MEA, the salt is provided at a concentration of about 0.1 mM to about 30 mM, or about 5 mM to about 10 mM.

In some embodiments employing a bipolar membrane MEA configured for hydrocarbon production from carbon dioxide, the salt is provided in anode water or other source at a concentration of about 2 mM to about 50 mM. In some MEAs employed in cells configured for methane production from carbon dioxide, the salt is provided in a concentration of about 10 mM to 30 mM. In various implementations, such cells employ a copper catalyst and a salt selected from the group including sodium bicarbonate, potassium bicarbonate, potassium sulfate, sodium sulfate, cesium bicarbonate, cesium sulfate, and any combination thereof. In various embodiments, the salt employed for methane selectivity is sodium bicarbonate, which has been shown to enhance methane to ethylene ratio by at least about 20:1.

In certain embodiments employing a bipolar membrane MEA configured for hydrocarbon product generation from a carbon oxide, and particularly carbon dioxide, the salt is provided at a concentration of about 2 mM to 1 M. In some implementations, the salt is potassium bicarbonate, which has been shown to enhance C2-C3 product selectivity over methane by a ratio of about 5:1 compared to sodium bicarbonate, is provided at a concentration of about 100 mM to about 500 mM. In certain embodiments, where the MEA is configured with a copper catalyst as cathode to reduce carbon dioxide to ethylene, the potassium bicarbonate concentration is about 1 mM to 5 mM. In certain embodiments, where the MEA is configured to reduce carbon monoxide to ethylene, the salt concentration, particularly potassium bicarbonate, is about 150 mM to about 250 mM.

In some embodiments employing an MEA containing only anion-conducting polymer(s), the salt is provided in an aqueous solution at a concentration of about 1 mM to 10 molar. In some embodiments employing an MEA containing only anion-conducting polymer, the salt is provided in a concentration of about 100 mM to 5 molar. In certain embodiments employing potassium hydroxide as a salt, the salt concentration is about 50 to 150 mM. In certain embodiments employing potassium bicarbonate as a salt, the salt concentration is about 4 to 10 mM.

The following concentration ranges are useful for anion conducting polymer only and bipolar cells employing anode water with potassium hydroxide and/or potassium bicarbonate. In certain MEA cells employing potassium hydroxide, the salt concentration is about 10 mM to 15 M. In some MEA cells employing potassium hydroxide, the salt concentration is about 50 to 500 mM. In some MEA cells employing potassium hydroxide, the salt concentration is about 0.5M to –15M. In certain MEA cells employing potassium bicarbonate, the salt concentration is about 1 mM to 1M. In some MEA cells employing potassium bicarbonate, the salt concentration is about 1 to 50 mM. In some MEA cells employing potassium bicarbonate, the salt concentration is about 100 mM to 500 mM.

The following salt concentration ranges are used, in certain embodiments, employing carbon dioxide as a reactant in an MEA cell:

Bipolar membrane for carbon monoxide production (e.g., gold-containing catalyst): The salt concentration in anode water is about 10 uM-200 mM, or about 100 um to 20 mM, or about 1 mM-10 mM, or about 1 mM-5 mM, or about 2 mM-5 mM. In certain embodiments, any of these concentration ranges is used when the salt is sodium bicarbonate. In certain embodiments, any of these concentration ranges is used for MEA cells having cathode surface areas of about 25 $cm^2$.

Bipolar membrane for methane production (e.g., copper-containing catalyst): The salt concentration in anode water is about 1 mM-40 mM, or about 10 mM-30 mM, or about 3 mM-20 mM. In certain embodiments, any of these concentration ranges is used when the salt is sodium bicarbonate. In certain embodiments, any of these concentration ranges is used for MEA cells having cathode surface areas of about 25 $cm^2$.

Bipolar membrane for ethylene production (e.g., copper-containing catalyst): The salt concentration in anode water is about 100 um to 20 mM, or about 1 mM-10 mM, or about 1 mM-5 mM, or about 2 mM-5 mM. In certain embodiments, any of these concentration ranges is used when the salt is potassium bicarbonate. In certain embodiments, any of these concentration ranges is used for MEA cells having cathode surface areas of about 25 $cm^2$.

Anion conducting polymer only MEA for ethylene production (e.g., copper-containing catalyst): The salt concentration in anode water is about 0.05M-5M, or about 0.05M-1M, or about 0.5M-1M, or about 0.05M-0.5M. In certain embodiments, any of these concentration ranges is used when the salt is potassium hydroxide. In certain embodiments, any of these concentration ranges is used for MEA cells having cathode surface areas of about 25 $cm^2$.

The following salt concentration ranges are used, in certain embodiments, employing carbon monoxide as a reactant in an MEA cell:

Anion conducting polymer only MEA for ethylene production (e.g., copper-containing catalyst): The salt concentration in anode water is about 0.05M-5M, or about 0.05M-1M, or about 0.5M-1M, or about 0.05M-0.5M, or about 0.5M-10M. In certain embodiments, any of these concentration ranges is used when the salt is potassium hydroxide. In certain embodiments, any of these concentration ranges is used for MEA cells having cathode surface areas of about 25 $cm^2$.

Anion conducting polymer only MEA for methane production (e.g., copper-containing catalyst): The salt concentration in anode water is about 0.05M-10M, or about 0.05M-1M, or about 0.05M-0.5M, or about 0.5M-10M or about 0.5M-1M. In certain embodiments, any of these concentration ranges is used when the salt is potassium hydroxide or sodium hydroxide. In certain embodiments, any of these concentration ranges is used for MEA cells having cathode surface areas of about 25 $cm^2$.

Bipolar MEA for ethylene production (e.g., copper-containing catalyst): The salt concentration in anode water is about 20 mM-2M, or about 50 mM-500 mM, or about 50 mM-250 mM, or about 100 mM-500 mM. In certain embodiments, any of these concentration ranges is used when the salt is potassium bicarbonate. In certain embodiments, any of these concentration ranges is used for MEA cells having cathode surface areas of about 25 $cm^2$.

While the salt concentrations provided herein may be appropriate for MEAs of any size, in certain embodiments, they are appropriate for cells employing MEAs having a surface area of about 25 $cm^2$ and the listed ranges may be scaled for cells with MEAs having larger surface areas. For example, in some embodiments, the salt concentrations increase with MEA area increases by a ratio of about 3:4. So, for example, if a salt concentration of 2 mM is appropriate for a cell having an MEA area of 25 $cm^2$, the concentration may be increased to 6 mM for a cell having an MEA area of 100 $cm^2$. As used herein, the area of an MEA is the area of a geometric plane at the MEA surface; it does account for pores or other deviations from planarity at the MEA surface.

In certain embodiments, the concentration of salt in an MEA, in moles of salt per mass of polymer electrolyte, is between about 1 and 3 mM/g. In certain embodiments, the concentration of salt in the polymer is estimate using conductivity measurements.

In some implementations, the concentration of any impurity other than introduced salt in anode or cathode water is very low; e.g., on the order of parts per million. This is particularly true of anions that are oxidizable at the anode and cations that are reducible at the cathode. In certain embodiments, the water containing one or more introduced salts has substantially no other ions other than those of the salt. For example, the water may contain no more than about 100 ppb of any transition metal ion other than any transition metal in the introduced salt. In some cases, the concentration of reducible transition metal ion is no greater than 10 ppb, or no greater than 1 ppb, or no greater than 0.1 ppb. In another example, the water contains no more than about 10 ppm of any halide ion. In another example, the water contains no more than about 10 ppm of any cation other than alkali metal ions and/or alkaline earth metal ions. In another example, the water contains no more than about 10 ppm of any cation other than alkali metal ions. In certain embodiments, the salt-containing water contains no more than about 100 ppm of unintentionally provided ion. In some cases, the salt-containing water contains no more than about 10 ppm of unintentionally provided ion, or no more than about 1 ppm of unintentionally provided ion, or no more than about 0.1 ppm of unintentionally provided ion.

In certain embodiments, unwanted ions and/or other impurities are removed from water prior to delivery of the water to a carbon dioxide reducing cell. This may be accomplished by purifying water upstream of the anode and/or cathode to which it is delivered. The water may be purified by any of various techniques such as passing the water through a resin column containing a chelating-type resin such as CR11 available from Sigma-Aldrich. Examples of techniques to achieve ultra-high purity water include gross filtration for large particulates, carbon filtration, water softening, reverse osmosis, exposure to ultraviolet (UV) light for TOC and/or bacterial static control, polishing using either ion exchange resins or electrodeionization (EDI) and filtration or ultrafiltration. The specific steps are affected by the starting quality of the water. With certain combinations of steps, it is possible to purify water to the point where it has a resistance of greater than about 18 MOhms. In certain embodiments, a resistance of only about 10 MOhm prior to the deliberate addition of salt is sufficient water purification for $CO_2$ electrolysis.

The salt concentration values presented herein may define salt concentration in an aqueous solution supplied to an MEA cell. Such solutions include anode water supplied during cell operation, a solution in which an MEA is soaked or otherwise contacted to infuse salt, and the like. The salt concentration may be different in an MEA than in a solution that supplies salt to the MEA. Typically, salt ions will penetrate the MEA from the solution and then move through the MEA via one or more transport mechanisms. In one mechanism, salt ions pass into the MEA via the supply solution. This may be the case when the solution permeates the MEA via pores or other openings in the MEA. Once in the MEA, the solution may move under a pressure gradient. The moving solution carries the salt ions along with it. While the salt ions are carried in the supply solution, their overall concentration in the MEA may be reduced because they occupy a greater volume: they occupy the volume of the supply solution in addition to the volume of the MEA polymers.

Salt ions in the solution may move independently of the bulk solution under the influence of a salt concentration gradient (diffusion or osmosis) or under the influence of an electric field (migration). These transport phenomena may also modify the salt concentration within the MEA. Independently of movement within the supply solution, salt ions may move by ionic conduction through the conductive polymers of the MEA. For example, salt cations may move by ionic conduction in the polymer matrix of a cation exchange membrane such as a sulfonated tetrafluoroethylene. And salt anions may move by ionic conduction through the matrix of an anion exchange membrane. The movement of salt ions in such polymer matrixes is sometimes referred to hopping, with the salt ions hopping between adjacent charged sites within a polymer matrix. During operation of an MEA cell, the salt ions within the polymer matrixes have their own concentrations that contribute to the overall salt or salt ion concentration in the MEA.

Due to the above factors and possibly other factors, the salt concentration in the MEA may be different from the salt concentration in the supply solution. While the salt concentration values presented herein typically represent the salt concentrations within the supply solution, before it penetrates the MEA, the values may also represent the concentration within an MEA. To the extent that the values represent concentrations within an MEA, they should be considered average values throughout the MEA. Note that salt ions may have different molar concentrations than their source salts. For example, a 1M solution of sodium sulfate may, when fully dissociated, be viewed as providing a 2M solution of sodium ions.

Delivery of Salt Via the MEA

In certain embodiments, salt is provided, at least in part, via pre-operation introduction to one or more components of the MEA. For example, the PEM, cathode buffer layer, anode buffer layer, anode catalyst layer, cathode catalyst layer, or any combination thereof may be pre-loaded with salt. The pre-loading may be performed before, during, or after assembly of individual MEA layers into an MEA stack. In some implementations, before the assembly, the pre-loading is achieved by soaking different layers of MEA in salt-containing solutions at various preferred concentrations. In some implementations, during the assembly, the pre-loading is achieved by adding droplets of salt-containing solutions onto different layers of MEAs. In some implementations, after the assembly, the pre-loading is achieved by circulating salt-containing solutions at the anode and/or the cathode compartment.

In certain embodiments, salt is introduced to an MEA after the MEA has operated for a time in a carbon oxide reduction cell. In some cases, after a certain amount of usage, the MEA is taken out of service and exposed to a composition that introduces salt into the polymers of the MEA. This may be accomplished, for example, by adding salt to the anode water or by putting salt-containing water through the cathode of the cell.

Remove Salt from MEA Cell

In certain embodiments, salts can precipitate or otherwise come out of solution and accumulate in certain locations within the cell. For example, salts may deposit in a cell's flow field and/or MEA layers and ultimately foul the cell.

To address this concern or for other reasons, the cell may be periodically taken off line and exposed to a flow of water (e.g., deionized water) under hydrodynamic conditions (flow velocity, pressure, and the like) that purge solid salt from the flow field or other structure where it has formed. In some cases, deionized water is flowed through the cell under thermodynamic conditions that facilitate dissolution of the solid salt.

Management of Salt Concentration and Water Delivery in MEA Cells

As mentioned, salt may be provided to an MEA from various sources including anode water and preloaded MEA polymer layers. Salts provided to an MEA cell can become depleted over the course of the cell's operation. This may happen even when salt-containing anode water is recycled to the MEA. Various mechanisms may account for this loss. For example, salt from anode water may be taken up by one or more MEA components such as a PEM or other cation exchange polymer layer. Further, some salt may move by diffusion, migration, and/or osmosis from a region of high concentration (anode) to a region of lower concentration (cathode). The anode water itself—not just its salt content—may move due to permeation of the anode water from the anode to the cathode where it is swept away by flowing gaseous carbon oxide.

Various mechanisms may be employed to manage salt concentration during operation of an MEA cell. For example, anode water may be treated to (a) add salt, (b) remove impurities, and/or (c) add purified water. Such treatment may be accomplished by dosing concentrated salt solutions and/or purified water to anode water in an anode water reservoir. Removing impurities may be accomplished by filtration and/or treatment with ion exchange resins.

Various mechanisms may be employed to manage anode water depletion during operation of an MEA cell. One way is to capture the water that leaves the anode and recirculate the water back to an anode water inlet. Another way is by recycling water recovered in the cathode product stream. In some implementations, the cathode water includes salts introduced via the anode water.

FIG. 1A provides an example of an electrolytic carbon oxide reduction system that may be used to control water composition and flow in an MEA cell. As shown in the figure, a system 101 includes an MEA cell 103 comprising an anode 105, a cathode 107, and a membrane electrode assembly 109. System 101 also includes an anode water recirculation loop 111 and a gaseous carbon oxide recirculation loop 125.

In the depicted embodiment, anode water recirculation loop 111 delivers water to and removes water from anode 105. Loop 111 includes an anode water reservoir 113 and water flow paths 115, 117, and 119. Anode water recirculation loop 111 may interface with a water source 121 and/or a source of concentrated salt solution 123. These sources may be used to dose the anode water with purified water and/or concentrated salt solution in order to adjust the composition of the anode water. In certain embodiments, water source 121 provides purified water such as highly purified deionized water, e.g., water having a resistivity of at least about 10 megaohm-cm. In the depicted embodiment, the source of concentrated salt solution 123 is directly connected to anode water reservoir 113. In some embodiments, the source of concentrated salt solution 123 is connected to another point on the anode water recirculation loop 111.

Not depicted in FIG. 1A is a water purification component such as a filter, a resin column, or other purifier configured to remove certain ions such as iron ions or other transition metal ions from the anode water. A water purification component may be provided in one of the water flow paths 115, 117, or 119, or it may be provided with water source 121, or even between water source 121 and anode water recirculation loop 111.

In certain embodiments, an anode water recirculation loop is configured differently from that shown in FIG. 1A. For example, an anode water recirculation loop may not include separate purified water and concentrated salt sources. In some embodiments, a purified water source is not employed. In certain embodiments, both a purified water source and a concentrated salt solution source are directly connected to an anode water reservoir.

Regardless of which components are present in the anode water recirculation loop, the loop may be configured to provide or maintain anode water with a salt composition appropriate for operation of the MEA cell. Such salt compositions are described elsewhere herein.

Returning to FIG. 1A, gaseous carbon oxide recirculation loop 125 provides a gaseous carbon oxide feed stream to and removes a gaseous product stream from the cathode 107. In addition to reaction products, cathode outlet stream may contain substantial quantities of unreacted gaseous carbon oxide. In the depicted embodiment, recirculation loop 125 includes a water separator component 127 (e.g., a water condenser), a reduction product recovery component 129, a humidifier 131, and, in addition, flow paths 122, 124, 126, and 128. Fresh carbon oxide reactant gas may be provided from a carbon oxide source 133 which connects into gaseous carbon oxide recirculation loop 125.

Humidifier 131 may humidify an input stream of a carbon oxide gaseous reactant upstream from cathode 107. The humidifier provides carbon oxide with a relatively high partial pressure of water vapor, which as explained more fully herein may prevent drying the cathode 107 or any components of MEA 109. In some embodiments, a humidifier is not present in the system.

When the gaseous carbon oxide reactant contacts cathode 107, it may remove anode water that has made its way from anode 105 through MEA 109, to cathode 107. In recirculation loop 125, anode water present in a gaseous carbon oxide stream leaving the cathode 107 is brought in contact with water separator component 127 in which at least a fraction of the water present in the carbon oxide outlet stream is removed. The relatively dried carbon oxide stream that leaves water separator 127 enters the reduction product recovery component 129 which removes one or more reduction products from the carbon oxide outlet stream. Such reduction products may include carbon monoxide, hydrocarbons, and/or other organic compounds.

Some of the reduction product produced at the cathode of MEA cell 103 may be dissolved or otherwise contained in water that is removed by water separator 127. Optionally, to address this issue, the water processed at separator 127 is provided to a reduction product recovery component 135 configured to remove one or more reduction products from the water provided by water separator 127.

In some implementations, substantial quantities of anode water cross from the anode to the cathode of MEA 109 where the anode water, with salts dissolved, can be lost. Given the high value of the salt and of the otherwise high purity water in which the salt is dissolved, a connection between the two loops that can return water from gas loop 125 to water loop 111 may improve the technical and commercial viability of the system. Note that, as explained, anode water may have extremely low concentrations (e.g., ppm or ppb levels) of certain inorganic and/or organic materials. For example, the water may have extremely low concentrations of iron and other transition metal ions. The anode water might also have intentionally added salts. Any such processed anode water that can be recovered from the cathode side may be delivered back to the anode.

In the depicted embodiment, water that has been removed from the gaseous carbon oxide recirculation loop 125 is delivered via a line 137 to the anode water reservoir 113 where it can reenter the anode water recirculation loop 111.

In alternative embodiments, there is not a direct connection between carbon oxide recirculation loop 125 and anode water recirculation loop 111. Note also that reduction product recovery component 135 is optional. In some implementations, reduction products in the water recirculation loop 125 are not removed and are included in the water provided to anode water recirculation loop 111. Some or all of the reduction products may be oxidized at the anode 105.

Figure 1B:
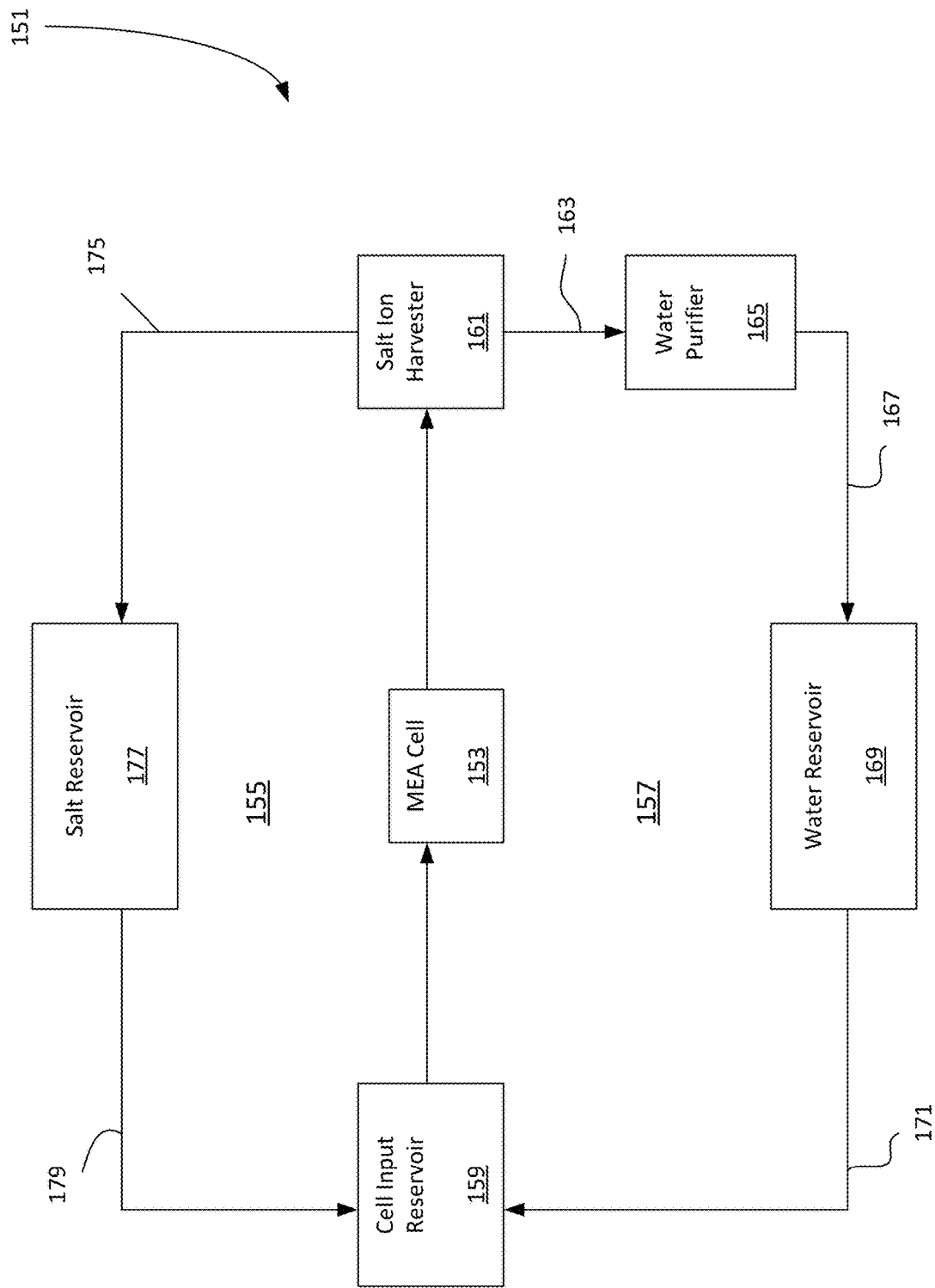
FIG. 1B is an illustration of an example of an electrolytic carbon oxide reduction system that may be used to control water composition and flow in an MEA cell.

FIG. 1B illustrates an example of an electrolytic carbon oxide reduction system that may be used to control water composition and flow in an MEA cell. In the figure, a system 151 includes an MEA carbon oxide reduction cell 153 and two recirculation loops: a salt recirculation loop 155 and a pure water recirculation loop 157. Outputs of the two loops are combined in a cell input reservoir 159, where they produce anode water having a salt composition and concentration suitable for use with the MEA cell 153, e.g., a composition and concentration as described elsewhere herein. Anode water is supplied from cell input reservoir 159 to MEA cell 153 via a conduit 152.

Anode water that leaves MEA cell 153 is provided to a salt ion harvester 161 configured to remove some or all the salt from the anode water. Relatively pure water leaves salt ion harvester 161 via a conduit 163 that feeds the water to a water purifier component 165 that may remove remaining impurities after desirable salt ions have been harvested. Component 165 may include a small pore filter (e.g., a Milli-DI® filter available from Millipore Sigma of Darmstadt, Germany) and/or an ion exchange resin (e.g., in a bed). The resulting purified water may have very low concentrations (e.g., ppm or ppb levels) of potentially detrimental ions such as transition metal ions and/or halides. The purified water that leaves water purifier 165 is provided to a reservoir 169 via a conduit 167. The purified water in reservoir 169 is then provided, as needed, to cell input reservoir 159, where it is combined with salt or a concentrated salt solution to prepare anode water for use in the MEA cell 153. As illustrated, purified water is provided to cell input reservoir 59 via a conduit 171.

As shown, the purified water recirculation loop 157 includes water purifier 165, reservoir 169, cell input reservoir 159, and salt ion harvester 161. In certain embodiments, a purified water loop does not include one or more of these elements. For example, some embodiments of the loop do not include a water purifier. Some embodiments of the loop do not include a reservoir.

Returning to FIG. 1B, salt or concentrated salt solution produced by salt ion harvester 161 is delivered via a conduit 175 to a salt reservoir 177, which maintains harvested salt in solid or solution form. Salt is provided, as needed, from reservoir 177 to cell input reservoir 159, where it is combined with purified water to prepare anode water for use in the MEA cell 153. Purified water is provided to cell input reservoir 159 via a conduit 179. Salt reservoir 177 may serve as a holding point for desired salt ions to be pumped accordingly into cell input reservoir 159.

As shown, the salt recirculation loop 155 includes reservoir 177 in addition to cell input reservoir 159 and salt ion harvester 161. In certain embodiments, a salt recirculation loop does not include one or more of these elements. For example, some embodiments of the loop do not include a reservoir.

Examples of salt ion harvesters include devices that contain an ion-selective membrane and devices configured with salt chelating and releasing agents. Such devices may select for desired salt ions (e.g., potassium or sodium ions) in an anode water stream. In certain embodiments, a salt ion harvester produces a solid salt precipitate that is then selectively introduced back into a salt recirculation loop or other portion of an anode water management system.

As mentioned, water may be purified to remove detrimental ions by using an ion exchange resin. Examples of such resins include (a) Diaion™CR11, available from Mitsubishi Chemical Corporate of Tokyo, Japan, which captures relatively large multivalent ions (i.e., transition metals) that could deposit on the cathode catalyst and which releases sodium ions, and (b) Amberlite™ MB20, available from DuPont de Nemours, Inc. of Wilmington, Del., which captures all ions (cations and anions) and releases only protons and hydroxide leaving very pure water. In certain embodiments, the resins are iminodiacetate chelating resins. In certain embodiments, the resins are mixtures of strong acid cation and strong base anion exchange resins.

An electrolytic carbon oxide reduction system such as that depicted in FIGS. 1A and 1B may employ control system that includes a controller and one or more controllable components such as pumps, sensors, valves, and power supplies. Examples of sensors include pressure sensors, temperature sensors, flow sensors, conductivity sensors, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, purified water, salt solution, etc., and/or other components of an electrolytic carbon oxide reduction system.

A control system may be configured to provide anode water over the course of an MEA cell's operation. For example, the control system may maintain salt concentration at defined levels and/or recover and recirculate anode water. Under control of the control system, the system may, for example, (a) recirculate anode water flowing out of an anode, (b) adjust the composition and/or flow rate of anode water into the anode, (c) move water from cathode outflow back to anode water, and/or (d) adjust the composition and/or flow rate of water recovered from the cathode stream, before returning to the anode. Note that the (d) may account for carbon oxide reduction products in recovered water from the cathode. However, in some implementations, this need not be considered as some reduction products may subsequently oxidize to harmless products at the anode.

In certain embodiments, a control system is configured to utilize feedback from sensors (e.g., conductivity/ion-specific monitoring) to adjust a mix of pure water and introduced salt ions to assure a bulk conductivity or other anode water parameter is within desired levels. In some embodiments, sensors in the anode water detect the salt concentration, and if the concentration becomes too low, salt from a higher concentration reservoir may be added. If the salt concentration becomes too high, then pure water can be added to dilute the salt back to the desired concentration range.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g. a server) can provide process recipes to a system over a network, which may include a local network or the internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as the processes and controls described herein. An example of a distributed controller for such purposes would be one or more integrated circuits on an MEA cell or recirculation loop in communication with one or more integrated circuits located remotely (such as at the platform level or as part of a remote computer) that combine to control a process on the chamber.

In certain embodiments, an electrolytic carbon oxide reduction system is configured and controlled to avoid precipitating salt within an MEA. Precipitated salt can block channels and/or have other impacts that degrade an MEA cell's performance. In some cases, a cell may become too dry, e.g., at the cathode side, because dry gaseous reactant removes too much water from the MEA, particularly on the cathode side. This issue, which may cause salt precipitation, may be addressed by controlling the water partial pressure in the gas inlet stream (e.g., by humidifying the gaseous carbon oxide source gas). In some cases, a salt concentration in anode water is sufficiently high that it promotes salt precipitation in the MEA. This issue may be addressed by controlling the salt concentration in the anode water. In some embodiments, the system is taken offline periodically or as needed to address any actual or potential salt build up in the MEA cell. While offline, the cathode compartment or other portion of the system may be flushed with water to avoid or remove salt buildup.

MEA Design Embodiments
MEA Overview

In various embodiments, an MEA contains an anode layer, a cathode layer, electrolyte, and optionally one or more other layers. The layers may be solids and/or gels. The layers may include polymers such as ion-conducting polymers.

When in use, the cathode of an MEA promotes electrochemical reduction of $CO_x$ by combining three inputs: $CO_x$, ions (e.g., protons) that chemically react with $CO_x$, and electrons. The reduction reaction may produce CO, hydrocarbons, and/or oxygen and hydrogen containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants at anode or elsewhere in the MEA; (c) maintain physical integrity of the MEA during the reaction (e.g., prevent delamination of the MEA layers); (d) prevent $CO_x$ reduction product cross-over; (e) prevent oxidation production (e.g., $O_2$) cross-over; (f) maintain a suitable environment at the cathode for oxidation; (g) provide pathway for desired ions to travel between cathode and anode while blocking undesired ions; and (h) minimize voltage losses. As explained herein, the presence of salts or salt ions in the MEA can facilitate some of all of these conditions.

COx Reduction Considerations

Polymer-based membrane assemblies such as MEAs have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 $cm^2$.

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and a first ion-conducting polymer. The cathode layer may also include an ion conductor and/or an electron conductor. The anode layer includes an oxidation catalyst and a second ion-conducting polymer. The anode layer may also include an ion conductor and/or an electron conductor. The PEM includes a third ion-conducting polymer.

In certain embodiments, the MEA has a cathode buffer layer between the cathode layer and the polymer electrolyte membrane. The cathode buffer includes a fourth ion-conducting polymer.

In certain embodiments, the MEA has an anode buffer layer between the anode layer and the polymer electrolyte membrane. The anode buffer includes a fifth ion-conducting polymer.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

Conductivity and Selectivity of Ion-Conducting Polymers for MEA Layers

The term "ion-conducting polymer" is used herein to describe a polymer electrolyte having greater than about 1 mS/cm specific conductivity for anions and/or cations. The term "anion-conductor" describes an ion-conducting polymer that conducts anions primarily (although there will still be some small amount of cation conduction) and has a transference number for anions greater than about 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material or ionomer. Examples of ion-conducting polymers of each class are provided in the below Table.

| Ion-Conducting Polymers | | | |
|---|---|---|---|
| Class | Description | Common Features | Examples |
| A. Anion-conducting | Greater than approximately 1 mS/cm specific conductivity for anions, which have a transference number greater than approximately 0.85 at around 100 micron thickness | Positively charged functional groups are covalently bound to the polymer backbone | aminated tetramethyl polyphenylene; poly(ethylene-co-tetrafluoro-ethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetra-fluoroethylene co-polymer; sulfonated poly(ether ether ketone); poly(styrene sulfonic acid-co-maleic acid) |

Some Class A ion-conducting polymers are known by tradenames such as 2259-60 (Pall RAI), AHA by Tokuyama Co, Fumasep® FAA-(fumatech GbbH), Sustanion®, Morgane ADP by Solvay, or Tosflex® SF-17 by Tosoh anion exchange membrane material. Further class A ion-conducting polymers include HNN5/HNN8 by Ionomr, FumaSep by Fumatech, TM1 by Orion, and PAP-TP by W7energy. Some Class C ion-conducting polymers are known by tradenames such as various formulations of Nafion® (DuPont™), GORE-SELECT® (Gore), Fumapem® (fumatech GmbH), and Aquivion® PFSA (Solvay).

Bipolar MEA for COx Reduction

In certain embodiments, the MEA includes a bipolar interface with an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

During operation, an MEA with a bipolar interface moves ions through a polymer-electrolyte, moves electrons through metal and/or carbon in the cathode and anode layers, and moves liquids and gas through pores in the layers.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block unwanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas generation is decreased and the rate of CO or other product production and the overall efficiency of the process are increased.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not react and is lost with oxidation products. To prevent the carbonate and bicarbonate ion produced at the cathode from reaching the anode, the anode and/or a anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 2:
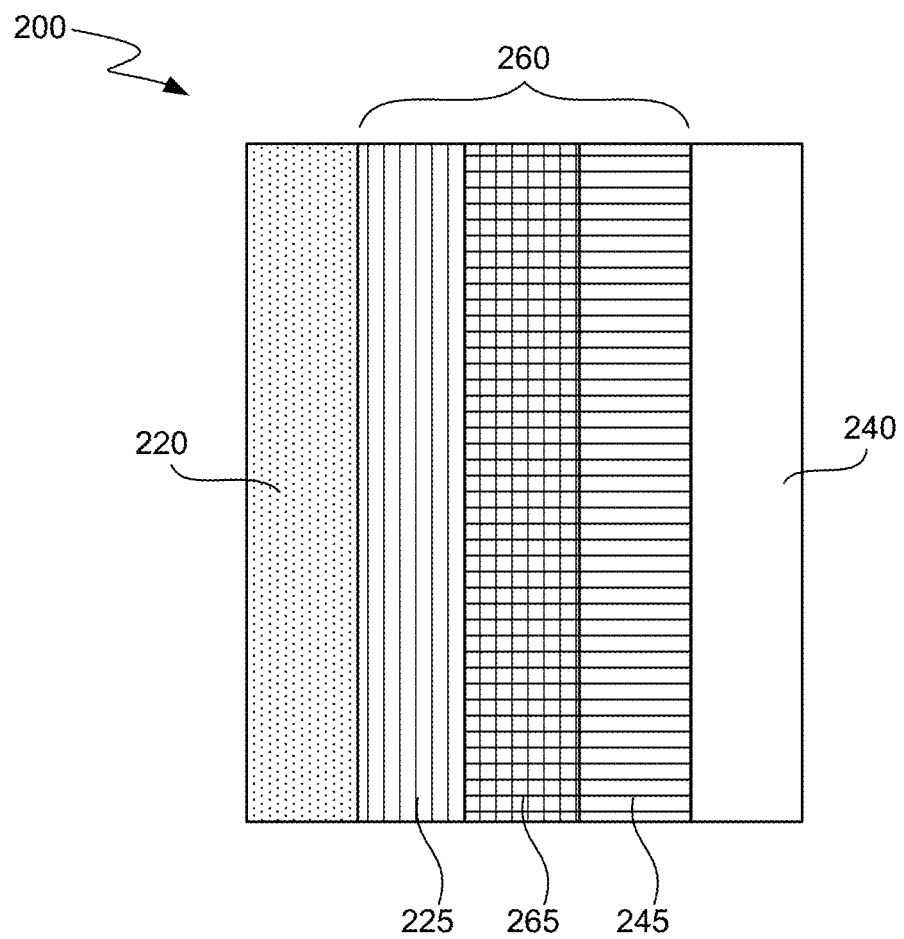
FIG. 2 is a schematic illustration of a membrane electrode assembly for use in $CO_x$ reduction, according to an embodiment of the disclosure.

An example MEA 200 for use in $CO_x$ reduction is shown in FIG. 2. The MEA 200 has a cathode layer 220 and an anode layer 240 separated by an ion-conducting polymer layer 260 that provides a path for ions to travel between the cathode layer 220 and the anode layer 240. In certain embodiments, the cathode layer 220 includes an anion-conducting polymer and/or the anode layer 240 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 260 may include two or three sublayers: a polymer electrolyte membrane (PEM) 265, an optional cathode buffer layer 225, and/or an optional anode buffer layer 245. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 265 is nonporous. Example characteristics of anode buffer layers and cathode buffer layers are provided elsewhere herein. In certain embodiments, the ion-conducting layer includes only a single layer or two sublayers.

Figure 3:
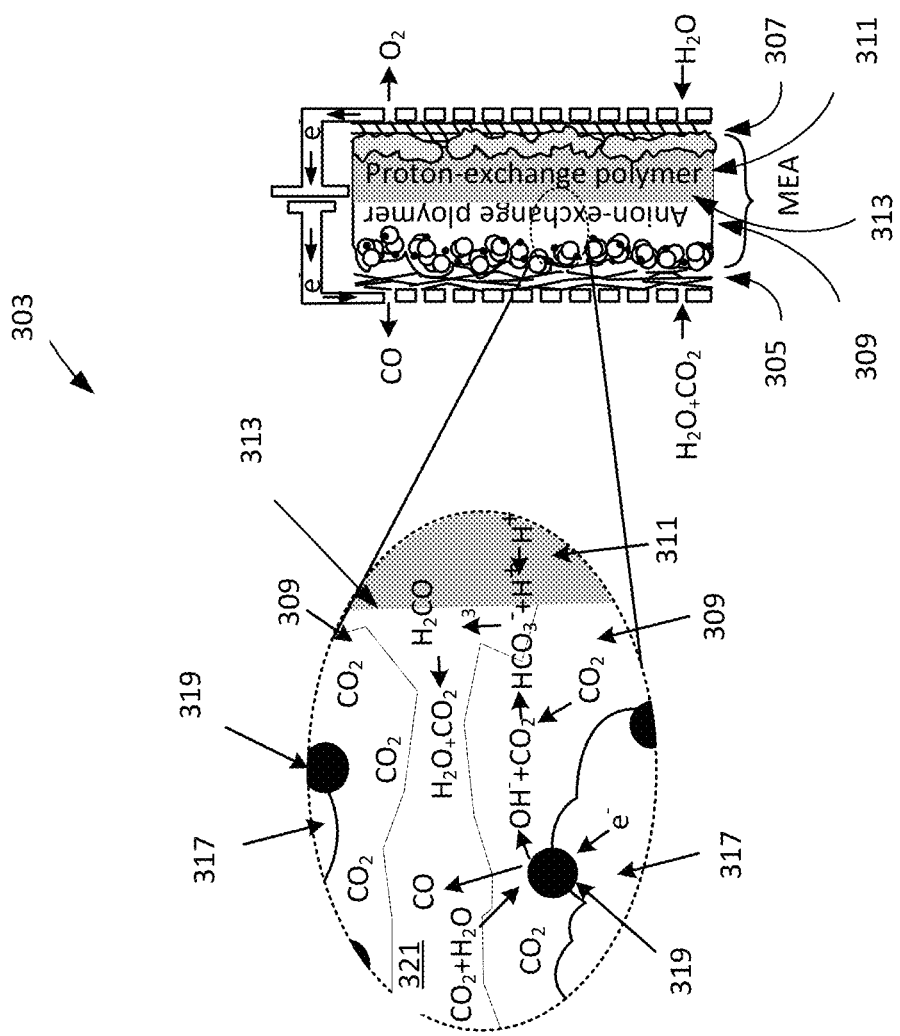
FIG. 3 is an illustration of a bipolar MEA in which bicarbonate and/or carbonate ions may combine with hydrogen ions between the cathode layer and the anode layer to form carbonic acid, which may decompose to form gaseous $CO_2$.

FIG. 3 shows $CO_2$ electrolyzer 303 configured to receive water and $CO_2$ (e.g., humidified or dry gaseous $CO_2$) as a reactant at a cathode 305 and expel CO as a product. Electrolyzer 303 is also configured to receive water as a reactant at an anode 307 and expel gaseous oxygen. Electrolyzer 303 includes bipolar layers having an anion-conducting polymer 309 adjacent to cathode 305 and a cation-conducting polymer 311 (illustrated as a proton-exchange membrane) adjacent to anode 307.

As illustrated in the magnification inset of a bipolar interface 313 in electrolyzer 303, the cathode 305 includes an anion exchange polymer (which in this example is the same anion-conducting polymer 309 that is in the bipolar layers) electronically conducting carbon support particles 317, and metal nanoparticles 319 supported on the support particles. $CO_2$ and water are transported via pores such as pore 321 and reach metal nanoparticles 319 where they react, in this case with hydroxide ions, to produce bicarbonate ions and reduction reaction products (not shown). $CO_2$ may also reach metal nanoparticles 319 by transport within anion exchange polymer 315.

Hydrogen ions are transported from anode 307, and through the cation-conducting polymer 311, until they reach bipolar interface 313, where they are hindered from further transport toward the cathode by anion exchange polymer 309. At interface 313, the hydrogen ions may react with bicarbonate or carbonate ions to produce carbonic acid ($H_2CO_3$), which may decompose to produce $CO_2$ and water. As explained herein, the resulting $CO_2$ may be provided in gas phase and should be provided with a route in the MEA back to the cathode 305 where it can be reduced. The cation-conducting polymer 311 hinders transport of anions such as bicarbonate ions to the anode where they could react with protons and release $CO_2$, which would be unavailable to participate in a reduction reaction at the cathode.

As illustrated, a cathode buffer layer having an anion-conducting polymer may work in concert with the cathode and its anion-conductive polymer to block transport of protons to the cathode. While MEAs employing ion conducting polymers of appropriate conductivity types in the cathode, the anode, cathode buffer layer, and if present, an anode buffer layer may hinder transport of cations to the cathode and anions to the anode, cations and anions may still come in contact in the MEA's interior regions, such as in the membrane layer.

As illustrated in FIG. 3, bicarbonate and/or carbonate ions combine with hydrogen ions between the cathode layer and the anode layer to form carbonic acid, which may decompose to form gaseous $CO_2$. It has been observed that MEAs sometime delaminate, possibly due to this production of gaseous $CO_2$, which does not have an easy egress path.

The delamination problem can be addressed by employing a cathode buffer layer having inert filler and associated pores. One possible explanation of its effectiveness is that the pores create paths for the gaseous carbon dioxide to escape back to the cathode where it can be reduced. In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode. The porosity of various layers in an MEA is described further at other locations herein.

Examples of Bipolar MEAs

As an example, an MEA includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer (e.g., PFSA polymer), a membrane layer including a second cation-conducting polymer and arranged between the cathode layer and the anode layer to conductively connect the cathode layer and the anode layer, and a cathode buffer layer including a second anion-conducting polymer (e.g., Sustainion, FumaSep FAA-3, Tokuyama anion exchange polymer) and arranged between the cathode layer and the membrane layer to conductively connect the cathode layer and the membrane layer. In this example, the cathode buffer layer can have a porosity between about 1 and 90 percent by volume, but can additionally or alternatively have any suitable porosity (including, e.g., no porosity). In other examples the cathode buffer layer can have any suitable porosity (e.g., between 0.01-95%, 0.1-95%, 0.01-75%, 1-95%, 1-90%, etc.).

Too much porosity can lower the ionic conductivity of the buffer layer. In some embodiments, the porosity is 20% or below, and in particular embodiments, between 0.1-20%, 1-10%, or 5-10%. Porosity in these ranges can be sufficient to allow movement of water and/or $CO_2$ without losing ionic conductivity. Porosity may be measured as described further below.

In a related example, the membrane electrode assembly can include an anode buffer layer that includes a third cation-conducting polymer, and is arranged between the membrane layer and the anode layer to conductively connect the membrane layer and the anode layer. The anode buffer layer preferably has a porosity between about 1 and 90 percent by volume, but can additionally or alternatively have any suitable porosity (including, e.g., no porosity). However, in other arrangements and examples, the anode buffer layer can have any suitable porosity (e.g., between 0.01-95%, 0.1-95%, 0.01-75%, 1-95%, 1-90%). As with the cathode buffer layer, in some embodiments, the porosity is 20% or below, e.g. 0.1-20%, 1-10%, or 5-10%

In an example, an anode buffer layer may be used in a MEA having a cathode catalyst layer with anion exchange polymer, a cathode buffer layer with anion-exchange polymer, a membrane with cation-exchange polymer, and an anode buffer layer with anion-exchange polymer. In such a structure, the anode buffer layer may porous to facilitate water transport to the membrane/anode buffer layer interface. Water will be split at this interface to make protons that travel through the membrane and hydroxide that travels to the anode catalyst layer. One advantage of this structure is the potential use of low cost water oxidation catalysts (e.g., $NiFeO_x$) that are only stable in basic conditions.

In another specific example, the membrane electrode assembly includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer, a membrane layer including a second anion-conducting polymer (e.g., Sustainion, FumaSep FAA-3, Tokuyama anion exchange polymer) and arranged between the cathode layer and the anode layer to conductively connect the cathode layer and the anode layer, and an anode buffer layer including a second cation-conducting polymer and arranged between the anode layer and the membrane layer to conductively connect the anode layer and the membrane layer.

An MEA containing an anion-exchange polymer membrane and an anode buffer layer containing cation-exchange polymer may be used for CO reduction. In this case, water would form at the membrane/anode buffer layer interface. Pores in the anode buffer layer could facilitate water removal. One advantage of this structure would be the use of an acid stable (e.g., $IrO_x$) water oxidation catalyst.

In a related example, the membrane electrode assembly can include a cathode buffer layer that includes a third anion-conducting polymer, and is arranged between the cathode layer and the membrane layer to conductively connect the cathode layer and the membrane layer. The third anion-conducting polymer can be the same or different from the first and/or second anion-conducting polymer. The cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%). In some embodiments, the porosity is 20% or below, and in particular embodiments, between 0.1-20%, 1-10%, or 5-10%.

In an example, a cathode catalyst layer composed of Au nanoparticles 4 nm in diameter supported on Vulcan XC72R carbon and mixed with TM1 (mTPN-1) anion exchange polymer electrolyte (from Orion). Layer is ~15 um thick, Au/(Au+C)=20 wt %, TM1 to catalyst mass ratio of 0.32, mass loading of 1.4-1.6 mg/cm2 (total Au+C), estimated porosity of 0.56. Anion-exchange polymer layer composed of TM1 and PTFE particles. PTFE is approximately 200 nm in diameter. TM1 molecular weight is 30 k-45 k. Thickness of the layer is ~15 um. PTFE may introduce porosity of about 8%. Proton-exchange membrane layer composed of perfluorosulfonic acid polymer (e.g., Nafion 117). Thickness is approximately 125 um. Membrane forms a continuous layer that prevents significant movement of gas ($CO_2$, CO, $H_2$) through the layer. Anode catalyst layer composed of Ir or IrOx nanoparticles (100-200 nm aggregates) that is 10 um thick.

Anion Exchange Membrane-Only MEA for $CO_x$ Reduction

In some embodiments, an MEA does not contain a cation-conducting polymer layer. In such embodiments, the electrolyte is not a cation-conducting polymer and the anode, if it includes an ion-conducting polymer, does not contain a cation-conducting polymer. Examples are provided herein.

An AEM-only MEA allows conduction of anions across the MEA. In embodiments in which none of the MEA layers has significant conductivity for cations, hydrogen ions have limited mobility in the MEA. In some implementations, an AEM-only membrane provides a high pH environment (e.g., at least about pH 7) and may facilitate $CO_2$ and/or CO reduction by suppressing the hydrogen evolution parasitic reaction at the cathode. As with other MEA designs, the AEM-only MEA allows ions, notably anions such as hydroxide ions, to move through polymer-electrolyte. The pH may be lower in some embodiments; a pH of 4 or greater may be high enough to suppress hydrogen evolution. The AEM-only MEA also permits electrons to move to and through metal and carbon in catalyst layers. In embodiments, having pores in the anode layer, the cathode layer, and/or the PEM, the AEM-only MEA permits liquids and gas to move through pores.

In certain embodiments, the AEM-only MEA comprises an anion-exchange polymer electrolyte membrane with an electrocatalyst layer on either side: a cathode and an anode. In some embodiments, one or both electrocatalyst layers also contain anion-exchange polymer-electrolyte.

In certain embodiments, an AEM-only MEA is formed by depositing cathode and anode electrocatalyst layers onto porous conductive supports such as gas diffusion layers to form gas diffusion electrodes (GDEs), and sandwiching an anion-exchange membrane between the gas diffusion electrodes.

In certain embodiments, an AEM-only MEA is used for $CO_2$ reduction. The use of an anion-exchange polymer electrolyte avoids low pH environment that disfavors $CO_2$ reduction. Further, water is transported away from the cathode catalyst layer when an AEM is used, thereby preventing water build up (flooding) which can block reactant gas transport in the cathode of the cell.

Water transport in the MEA occurs through a variety of mechanisms, including diffusion and electro-osmotic drag. In some embodiments, at current densities of the $CO_2$ electrolyzers described herein, electro-osmotic drag is the dominant mechanism. Water is dragged along with ions as they move through the polymer electrolyte. For a cation-exchange membrane such as Nafion membrane, the amount of water transport is well characterized and understood to rely on the pre-treatment/hydration of the membrane. Protons move from positive to negative potential (anode to cathode) with each carrying 2-4 water molecules with it, depending on pretreatment. In anion-exchange polymers, the same type of effect occurs. Hydroxide, bicarbonate, or carbonate ions moving through the polymer electrolyte will 'drag' water molecules with them. In the anion-exchange MEAs, the ions travel from negative to positive voltage, so from cathode to anode, and they carry water molecules with them, moving water from the cathode to the anode in the process.

In certain embodiments, an AEM-only MEA is employed in CO reduction reactions. Unlike the $CO_2$ reduction reaction, CO reduction does not produce carbonate or bicarbonate anions that could transport to the anode and release valuable reactant.

Figure 4:
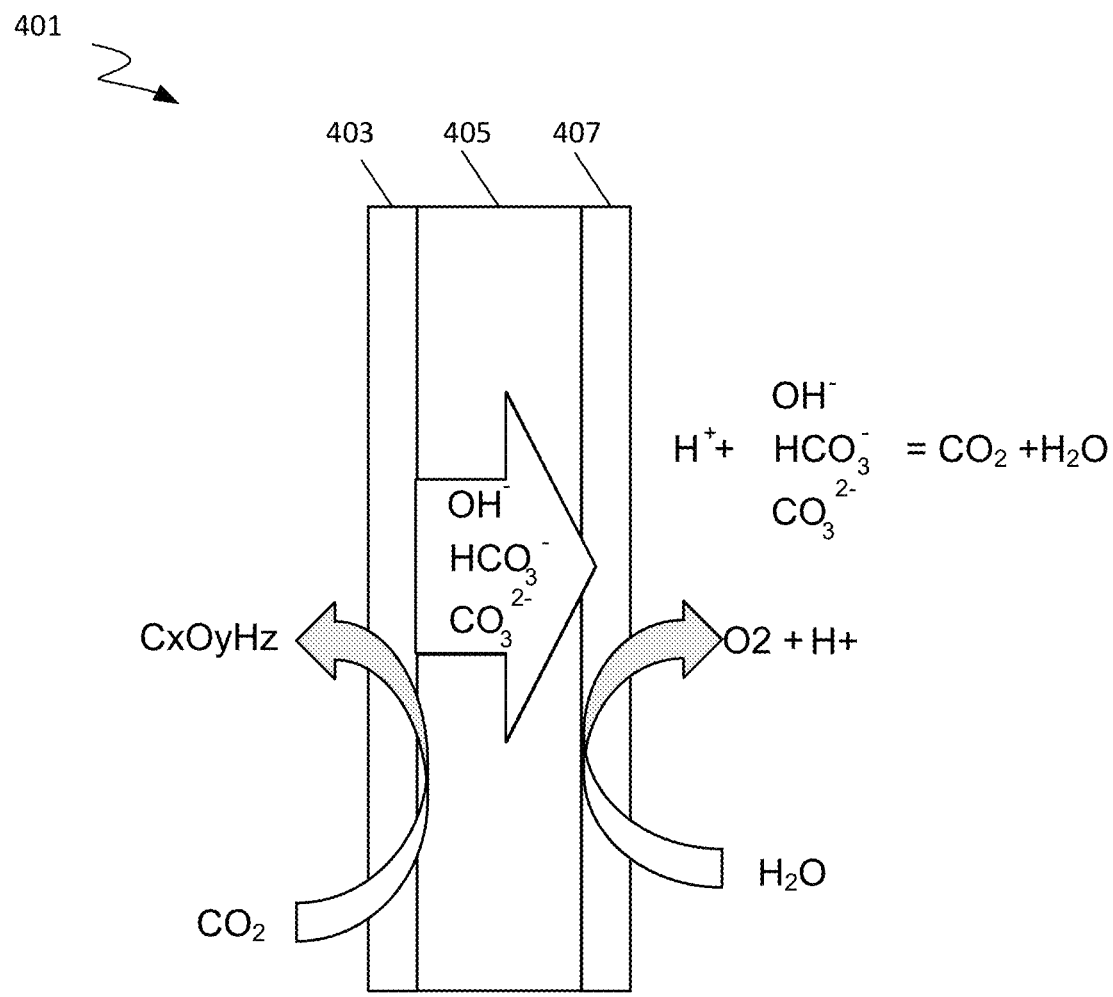
FIG. 4 is an illustration of an MEA in which $CO_2$ gas is provided to a cathode catalyst layer.

FIG. 4 illustrates an example construction of a $CO_2$ reduction MEA 401 having a cathode catalyst layer 403, an anode catalyst layer 405, and an anion-conducting PEM 407. In certain embodiments, cathode catalyst layer 403 includes metal catalyst particles (e.g., nanoparticles) that are unsupported or supported on a conductive substrate such as carbon particles. In some implementations, cathode catalyst layer 403 additionally includes an anion-conducting polymer. The metal catalyst particles may catalyze $CO_2$ reduction, particularly at pH greater than 7. In certain embodiments, anode catalyst layer 405 includes metal oxide catalyst particles (e.g., nanoparticles) that are unsupported or supported on a conductive substrate such as carbon particles. In some implementations, anode catalyst layer 403 additionally includes an anion-conducting polymer. Examples of metal oxide catalyst particles for anode catalyst layer 405 include iridium oxide, nickel oxide, nickel iron oxide, iridium ruthenium oxide, platinum oxide, and the like. Anion-conducting PEM 407 may comprise any of various anion-conducting polymers such as, for example, HNN5/HNN8 by Ionomr, FumaSep by Fumatech, TM1 by Orion, PAP-TP by W7energy, Sustainion by Dioxide Materials, and the like. These and other anion-conducting polymer that have an ion exchange capacity (IEC) ranging from 1.1 to 2.6, working pH ranges from 0-14, bearable solubility in some organic solvents, reasonable thermal stability and mechanical stability, good ionic conductivity/ASR and acceptable water uptake/swelling ratio may be used. The polymers may be chemically exchanged to certain anions instead of halogen anions prior to use.

As illustrated in FIG. 4, $CO_2$ such as $CO_2$ gas may be provided to cathode catalyst layer 403. In certain embodiments, the $CO_2$ may be provided via a gas diffusion electrode. At the cathode catalyst layer 403, the $CO_2$ reacts to produce reduction product indicated generically as $C_xO_yH_z$. Anions produced at the cathode catalyst layer 403 may include hydroxide, carbonate, and/or bicarbonate. These may diffuse, migrate, or otherwise move to the anode catalyst layer 405. At the anode catalyst layer 405, an oxidation reaction may occur such as oxidation of water to produce diatomic oxygen and hydrogen ions. In some applications, the hydrogen ions may react with hydroxide, carbonate, and/or bicarbonate to produce water, carbonic acid, and/or $CO_2$. Fewer interfaces give lower resistance. In some embodiments, a highly basic environment is maintained for C2 and C3 hydrocarbon synthesis.

Figure 5:
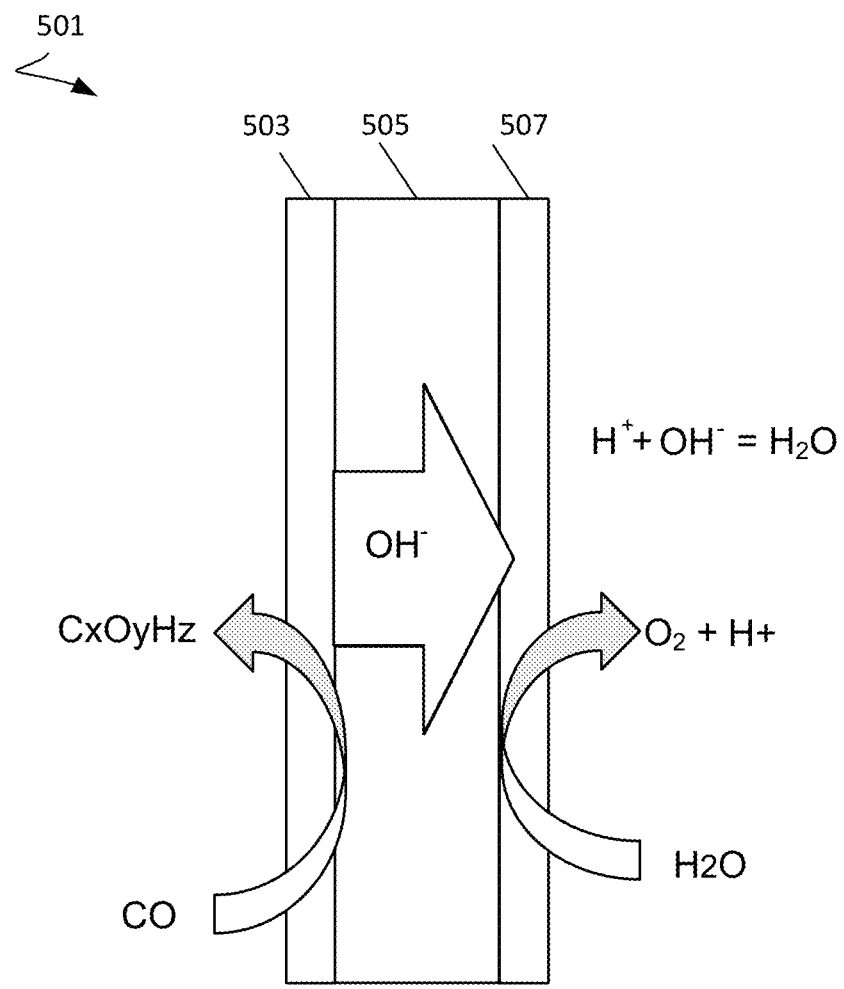
FIG. 5 is an illustration of an MEA having a cathode catalyst layer, an anode catalyst layer, and an anion-conducting PEM configured to promote a CO reduction reaction.

FIG. 5 illustrates an example construction of a CO reduction MEA 501 having a cathode catalyst layer 503, an anode catalyst layer 505, and an anion-conducting PEM 507. Overall, the constructions of MEA 501 may be similar to that of MEA 401 in FIG. 4. However, the cathode catalyst may be chosen to promote a CO reduction reaction, which means that different reduction catalysts would be used in CO and $CO_2$ reduction embodiments.

In some embodiments, an AEM-only MEA may be advantageous for CO reduction. The water uptake number of the AEM material can be selected to help regulate moisture at the catalyst interface, thereby improving CO availability to the catalyst. AEM-only membranes can be favorable for CO reduction due to this reason. Bipolar membranes can be more favorable for $CO_2$ reduction due to better resistance to $CO_2$ dissolving and crossover in basic anolyte media.

In various embodiments, cathode catalyst layer 503 includes metal catalyst particles (e.g., nanoparticles) that are unsupported or supported on a conductive substrate such as carbon particles. In some implementations, cathode catalyst layer 503 additionally includes an anion-conducting polymer. In certain embodiments, anode catalyst layer 505 includes metal oxide catalyst particles (e.g., nanoparticles) that are unsupported or supported on a conductive substrate such as carbon particles. In some implementations, anode catalyst layer 503 additionally includes an anion-conducting polymer. Examples of metal oxide catalyst particles for anode catalyst layer 505 may include those identified for the anode catalyst layer 405 of FIG. 4. Anion-conducting PEM 507 may comprise any of various anion-conducting polymer such as, for example, those identified for the PEM 407 of FIG. 4.

As illustrated in FIG. 5, CO gas may be provided to cathode catalyst layer 503. In certain embodiments, the CO may be provided via a gas diffusion electrode. At the cathode catalyst layer 503, the CO reacts to produce reduction product indicated generically as $C_xO_yH_z$.

Anions produced at the cathode catalyst layer 503 may include hydroxide ions. These may diffuse, migrate, or otherwise move to the anode catalyst layer 505. At the anode catalyst layer 505, an oxidation reaction may occur such as oxidation of water to produce diatomic oxygen and hydrogen ions. In some applications, the hydrogen ions may react with hydroxide ions to produce water.

While the general configuration of the MEA 501 is similar to that of MEA 401, there are certain differences in the MEAs. First, MEAs may be wetter for CO reduction, helping the catalyst surface to have more —H. Also, for $CO_2$ reduction, a significant amount of $CO_2$ may be dissolved and then transferred to the anode for an AEM-only MEA such as shown in FIG. 4. For CO reduction, there is less likely to be significant CO gas crossover. In this case, the reaction environment could be very basic. MEA materials, including the catalyst, may be selected to have good stability in high pH environment. In some embodiments, a thinner membrane may be used for CO reduction than for $CO_2$ reduction.

Example of AEM-Only MEA

1. Copper metal (USRN 40 nm thick Cu, ~0.05 mg/cm$^2$) was deposited onto a porous carbon sheet (Sigracet 39BC gas diffusion layer) via electron beam deposition. Ir metal nanoparticles were deposited onto a porous titanium sheet at a loading of 3 mg/cm$^2$ via drop casting. An anion-exchange membrane from Ionomr (25-50 μm, 80 mS/cm$^2$ OH— conductivity, 2-3 mS/cm$^2$ $HCO_3^-$ conductivity, 33-37% water uptake) was sandwiched between the porous carbon and titanium sheets with the electrocatalyst layers facing the membrane.

2. Sigma Aldrich 80 nm spherical Cu nanoparticles, mixed with FAA-3 anion exchange solid polymer electrolyte from Fumatech, FAA-3 to catalyst mass ratio of 0.10, setup as described above.

US Patent Application Publication No. US 2017/0321334, published Nov. 9, 2017 and US Patent Application Publication No. 20190226103, published Jul. 25, 2019, which describe various features and examples of MEAS, are incorporated herein by reference in their entireties. All publications referred to herein are incorporated by reference in their entireties as if fully set forth herein.

Cathode Catalyst Layer—General Structure

As indicated above, the cathode of the MEA, which is also referred to as the cathode layer or cathode catalyst layer, facilitates $CO_x$ conversion. It is a porous layer containing catalysts for $CO_x$ reduction reactions.

In some embodiments, the cathode catalyst layer contains a blend of reduction catalyst particles, electronically-conductive support particles that provide support for the reduction catalyst particles, and a cathode ion-conducting polymer. In some embodiments, the reduction catalyst particles are blended with the cathode ion-conducting polymer without a support.

Examples of materials that can be used for the reduction catalyst particles include, but are not limited to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the particular reaction performed at the cathode of the CRR.

Catalysts can be in the form of nanoparticles that range in size from approximately 1 to 100 nm or particles that range in size from approximately 0.2 to 10 nm or particles in the size range of approximately 1-1000 nm or any other suitable range. In addition to nanoparticles and larger particles, films and nanostructured surfaces may be used.

If used, the electronically-conductive support particles in the cathode can be carbon particles in various forms. Other possible conductive support particles include boron-doped diamond or fluorine-doped tin oxide. In one arrangement, the conductive support particles are Vulcan carbon. The conductive support particles can be nanoparticles. The size range of the conductive support particles is between approximately 20 nm and 1000 nm or any other suitable range. It is especially useful if the conductive support particles are compatible with the chemicals that are present in the cathode when the CRR is operating, are reductively stable, and have a high hydrogen production overpotential so that they do not participate in any electrochemical reactions.

For composite catalysts such as Au/C, example metal nanoparticle sizes may range from about 2 nm-20 nm and the carbon size may be from about 20-200 nm as supporting materials. For pure metal catalyst such as Ag or Cu, the particles have a board range from 2 nm to 500 nm in term of crystal grain size. The agglomeration could be even larger to micrometer range.

Figure 6:
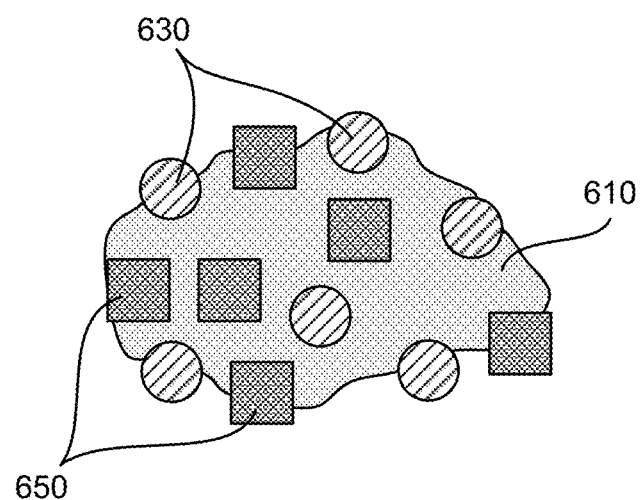
FIG. 6 is a schematic drawing showing an example morphology of cathode particles having catalysts supported on a catalyst support particle.

In general, such conductive support particles are larger than the reduction catalyst particles, and each conductive support particle can support many reduction catalyst particles. FIG. 6 is a schematic drawing that shows a possible morphology for two different kinds of catalysts supported on a catalyst support particle 610, such as a carbon particle. Catalyst particles 630 of a first type and second catalyst particles 650 of a second type are attached to the catalyst support particle 610. In various arrangements, there is only one type of catalyst particle or there are more than two types of catalyst particles attached to the catalyst support particle 610.

Using two types of catalysts may be useful in certain embodiments. For example, one catalyst may be good at one reaction (e.g., $CO_2 \rightarrow CO$) and the second good at another reaction (e.g., $CO \rightarrow CH_4$). Overall, the catalyst layer would perform the transformation of $CO_2$ to $CH_4$, but different steps in the reaction would take place on different catalysts.

The electronically-conductive support may also be in forms other than particles, including tubes (e.g., carbon nanotubes) and sheets (e.g., graphene). Structures having high surface area to volume are useful to provide sites for catalyst particles to attach.

In addition to reduction catalyst particles and electronically-conductive support particles, the cathode catalyst layer may include an ion conducting polymer. There are tradeoffs in choosing the amount of cathode ion-conducting polymer in the cathode. It can be important to include enough cathode ion-conducting polymer to provide sufficient ionic conductivity. But it is also important for the cathode to be porous so that reactants and products can move through it easily and to maximize the amount of catalyst surface area that is available for reaction. In various arrangements, the cathode ion-conducting polymer makes up somewhere in the range between 30 and 70 wt %, between 20 and 80 wt %, or between 10 and 90 wt %, of the material in the cathode layer, or any other suitable range. The wt % of ion-conducting polymer in the cathode is selected to result in the cathode layer porosity and ion-conductivity that gives the highest current density for $CO_x$ reduction. In some embodiments, it may be between 20 and 60 wt. % or between 20 and 50 wt. %. Example thicknesses of the cathode catalyst layer range from about 80 nm-300 µm.

In addition to the reduction catalyst particles, cathode ion conducting polymer, and if present, the electronically-conductive support, the cathode catalyst layer may include other additives such as PTFE.

In addition to polymer:catalyst mass ratios, the catalyst layer may be characterized by mass loading (mg/cm$^2$), and porosity. Porosity may be determined by a various manners. In one method, the loading of each component (e.g., catalyst, support, and polymer) is multiplied by its respective density. These are added together to determine the thickness the components take up in the material. This is then divided by the total known thickness to obtain the percentage of the layer that is filled in by the material. The resulting percentage is then subtracted from 1 to obtain the percentage of the layer assumed to be filled with air, which is the porosity. Methods such as mercury porosimetry or image processing on TEM images may be used as well.

Examples of cathode catalyst layers for CO, methane, and ethylene/ethanol productions are given below.

CO production: Au nanoparticles 4 nm in diameter supported on Vulcan XC72R carbon and mixed with TM1 anion exchange polymer electrolyte from Orion. Layer is about 15 µm thick, Au/(Au+C)=30%, TM1 to catalyst mass ratio of 0.32, mass loading of 1.4-1.6 mg/cm$^2$, estimated porosity of 0.47

Methane production: Cu nanoparticles of 20-30 nm size supported on Vulcan XC72R carbon, mixed with FAA-3 anion exchange solid polymer electrolyte from Fumatech. FAA-3 to catalyst mass ratio of 0.18. Estimated Cu nanoparticle loading of ~7.1 µg/cm$^2$, within a wider range of 1-100 µg/cm$^2$ Ethylene/ethanol production: Cu nanoparticles of 25-80 nm size, mixed with FAA-3 anion exchange solid polymer electrolyte from Fumatech. FAA-3 to catalyst mass ratio of 0.10. Deposited either on Sigracet 39BC GDE for pure AEM or on MEA electrode assembly. Estimated Cu nanoparticle loading of 270 µg/cm$^2$.

The functions, materials, and structures of the components of the cathode catalyst layer are described further below.

Water Management (Cathode Catalyst Layer)

The cathode catalyst layer may facilitate movement of water to prevent it from being trapped in the cathode catalyst layer. Trapped water can hinder access of $CO_x$ to the catalyst and/or hinder movement of reaction product out of the cathode catalyst layer.

Water management challenges are in many respects unique to CRRs. For example, compared to a PEM fuel cell's oxygen electrode, a CRR uses a much lower gas flow rate. Vapor phase water removal is determined by the volumetric gas flow, thus much less vapor phase water removal is carried out in a CRR. A CRR may also operate at higher pressure (e.g., 100 psi-450 psi) than a fuel cell; at higher pressure the same molar flow results in lower volumetric flow and lower vapor phase water removal. As a result, liquid water in MEA of a CRR is present to be removed. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes pores having sizes of 1 nm-100 nm and pores having sizes of at least 1 micron. This size distribution can aid in water removal. The porous structures could be formed by one or more of: pores within the carbon supporting materials; stacking pores between stacked spherical carbon nanoparticles; secondary stacking pores between agglomerated carbon spheres (micrometer scale); or inert filler (e.g., PTFE) introduced porous with the interface between the PTFE and carbon also creating irregular pores ranging from hundreds of nm to micrometers.

The cathode catalyst layer may have a thickness that contributes to water management. Using a thicker layer allows the catalyst and thus the reaction to be distributed in a larger volume. This spreads out the water distribution and makes it easier to manage.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer.

Gas Transport (Cathode Catalyst Layer)

The cathode catalyst layer may be structured for gas transport. Specifically, $CO_x$ is transported to the catalyst and gas phase reaction products (e.g., CO, ethylene, methane, etc.) is transported out of the catalyst layer.

Certain challenges associated with gas transport are unique to CRRs. Gas is transported both in and out of the cathode catalyst layer—$CO_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution.

In some embodiments, the ionomer-catalyst contact is minimized. For example, in embodiments that use a carbon support, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

Ionomer (Cathode Catalyst Layer)

The ionomer may have several functions including holding particles of the catalyst layer together and allowing movement of ions through the cathode catalyst layer. In some cases, the interaction of the ionomer and the catalyst surface may create an environment favorable for $CO_x$ reduction, increasing selectivity to a desired product and/or decreasing the voltage required for the reaction. Importantly, the ionomer is an ion-conducting polymer to allow for the movement of ions through the cathode catalyst layer. Hydroxide, bicarbonate, and carbonate ions, for example, are moved away from the catalyst surface where the $CO_x$ reduction occurs. In the description below, the ionomer in the cathode catalyst layer can be referred to as a first ion-conducting polymer.

The first ion-conducting polymer can comprise at least one ion-conducting polymer that is an anion-conductor. This can be advantageous because it raises the pH compared to a proton conductor.

In some embodiments, the first ion-conducting polymer can comprise one or more covalently-bound, positively-charged functional groups configured to transport mobile negatively-charged ions. The first ion-conducting polymer can be selected from the group consisting of aminated tetramethyl polyphenylene; poly(ethylene-co-tetrafluoroethylene)-based quaternary ammonium polymer; quaternized polysulfone), blends thereof, and/or any other suitable ion-conducting polymers. The first ion-conducting polymer can be configured to solubilize salts of bicarbonate or hydroxide.

In some embodiments, the first ion-conducting polymer can comprise at least one ion-conducting polymer that is a cation-and-anion-conductor. The first ion-conducting polymer can be selected from the group consisting of polyethers that can transport cations and anions and polyesters that can transport cations and anions. The first ion-conducting polymer can be selected from the group consisting of polyethylene oxide, polyethylene glycol, polyvinylidene fluoride, and polyurethane.

A cation-and-anion conductor will raise pH (compared to a pure cation conductor.) Further, in some embodiments, it may be advantageous to use a cation-and-anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

A typical anion-conducting polymer has a polymer backbone with covalently bound positively charged functional groups appended. These may include positively charged nitrogen groups in some embodiments. In some embodiments, the polymer backbone is non-polar, as described above. The polymer may be any appropriate molecular weight, e.g., 25,000 g/mol-150,000 g/mol, though it will be understood that polymers outside this range may be used.

Particular challenges for ion-conducting polymers in CRR's include that $CO_2$ can dissolve or solubilize polymer electrolytes, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 12 mS/cm, is chemically and mechanically stable at temperatures 80° C. and lower, and soluble in organic solvents used during fabrication such as methanol, ethanol, and isoproponal. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments.

Examples of anion-conducting polymers are given above in above table as Class A ion-conducting polymers. A particular example of an anion-conducting polymer is Orion mTPN1, which has m-triphenyl fluori-alkylene as backbone and trimethylamonium (TMA+) as cation group. The chemical structure is shown below.

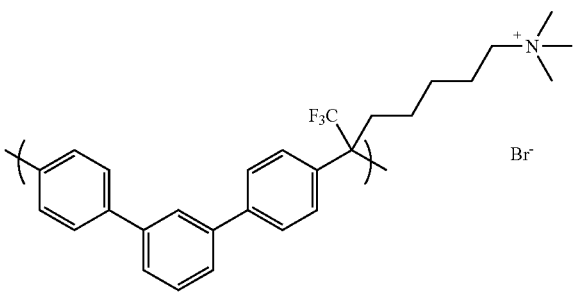

Additional examples include anion exchange membranes produced by Fumatech and Ionomr. Fumatech FAA-3 ionomers come in Br— form. Anion exchange polymer/membrane based on polybenzimidazole produced by Ionomr comes in I— form as AF-1-HNN8-50-X.

The as-received polymer may be prepared by exchanging the anion (e.g., I⁻, Br⁻, etc.) with bicarbonate.

Also, as indicated above, in certain embodiments the ionomer may be a cation-and-ion-conducting polymer. Examples are given in the above table as Class B ion-conducting polymers.

Metal Catalyst (Cathode Catalyst Layer)

The metal catalyst catalyzes the COx reduction reaction(s). The metal catalyst is typically nanoparticles, but larger particles, films, and nanostructured surfaces may be used in some embodiments. The specific morphology of the nanoparticles may expose and stabilize active sites that have greater activity.

The metal catalyst is often composed of pure metals (e.g., Cu, Au, Ag), but specific alloys or other bimetallic systems may have high activity and be used for certain reactions. The choice of catalyst may be guided by the desired reaction. For example, for CO production, Au may be used; for methane and ethylene production, Cu may be used. Other metals including Ag, alloys, and bimetallic systems may be used. $CO_2$ reduction has a high overpotential compared to other well-known electrochemical reactions such as hydrogen evolution and oxygen evolution on known catalysts. Small amounts of contaminants can poison catalysts for $CO_2$ conversion. And as indicated above, metal catalysts such as Cu, Au, and Ag are less developed than catalysts such as platinum used in hydrogen fuel cells.

Metal catalyst properties that affect the cathode catalyst layer performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, and the presence of poisoning surface ligands from synthesis.

Nanoparticles may be synthesized by any appropriate method, such as for example, described in Phan et al., "Role of Capping Agent in Wet Synthesis of Nanoparticles," J. Phys. Chem. A 2018, 121, 17, 3213-3219; Bakshi "How Surfactants Control Crystal Growth of Nanomaterials," Cryst. Growth Des. 2016, 16, 2, 1104-1133; and Morsy "Role of Surfactants in Nanotechnology and Their Applications," Int. J. Curr. Microbiol. App. Sci. 2014, 3, 5, 237-260, which are incorporated by reference herein.

In some embodiments, metal nanoparticles are provided without the presence of poisoning surface ligands. This may be achieved by using the ionomer as a ligand to direct the synthesis of nanocrystal catalysts. The surface of the metal nanocatalysts are directly connected with ionically conductive ionomer. This avoids having to treat the catalyst surface to allow ionomer contact with the metal and improves the contact.

The metal catalyst may be disposed on a carbon support in some embodiments. For CO production, examples include Premetek 20 wt % Au supported on Vulcan XC-72R carbon with 4-6 nm Au particle size and 30% Au/C supported on Vulcan XC-72R with 5-7 nm Au particle size. For methane, examples include Premetek 20 wt % Cu supported on Vulcan XC-72R carbon with 20-30 nm Cu particle size. In some embodiments, the metal catalyst may be unsupported. For ethylene production, examples of unsupported metal catalysts include SigmaAldrich unsupported Cu 80 nm particle size and ebeam or sputter deposited thin Cu layer of 10 nm to 100 nm.

Support (Cathode Catalyst Layer)

The support of the cathode catalyst layer may have various functions. It may stabilize metal nanoparticles to prevent them from agglomerating and distributed the catalytic sites throughout the catalyst layer volume to spread out loss of reactants and formation of products. It may also form an electronically form an electrically conductive pathway to metal nanoparticles. Carbon particles, for example, pack together such that contacting carbon particles provide the electrically conductive pathway. Void space between the particles forms a porous network that gas and liquids can travel through.

In some embodiments, carbon supports developed for fuel cells can be used. Many different types have been developed; these are typically 50 nm-500 nm in size, and can be obtained in different shapes (spheres, nanotubes, sheets (e.g., graphene)), porosities, surface area per volume, electrical conductivity, functional groups (N-doped, O-doped, etc).

The support may be hydrophobic and have affinity to the metal nanoparticle.

Examples of carbon blacks that can be used include:

Vulcan XC-72R-Density of 256 mg/cm2, 30-50 nm

Ketjen Black-Hollow structure, Density of 100-120 mg/cm2, 30-50 nm

Printex Carbon, 20-30 nm

Anode Catalyst Layer

The anode of the MEA, which is also referred to as the anode layer or anode catalyst layer, facilitates oxidation reactions. It is a porous layer containing catalysts for oxidation reactions. Examples of reactions are:

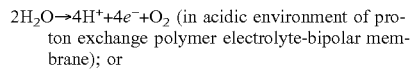
$2H_2O \rightarrow 4H^+ + 4e^- + O_2$ (in acidic environment of proton exchange polymer electrolyte-bipolar membrane); or

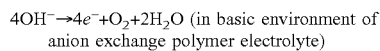
$4OH^- \rightarrow 4e^- + O_2 + 2H_2O$ (in basic environment of anion exchange polymer electrolyte)

The oxidation of other materials, such as hydrocarbons to make $CO_2$ or chloride ions to make chlorine gas, may also be performed.

In some embodiments, with reference to FIG. 2, the anode 240 contains a blend of oxidation catalyst and an anode ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

The oxidation catalyst can be in the form of a structured mesh or can be in the form of particles. If the oxidation catalyst is in the form of particles, the particles can be supported by electronically-conductive support particles. The conductive support particles can be nanoparticles. It is especially useful if the conductive support particles are compatible with the chemicals that are present in the anode 240 when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. An example of such an arrangement is shown in FIG. 3 and is discussed above with respect to the cathode catalyst layer. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

In some embodiments, the MEA has an anode layer comprising oxidation catalyst and a second ion-conducting polymer. The second ion-conducting polymer can comprise one or more polymers that contain covalently-bound, negatively-charged functional groups configured to transport mobile positively-charged ions. The second ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Examples of cation-conducting polymers include e.g., Nafion 115, Nafion 117, and/or Nafion 211.

There are tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

In one example of a metal catalyst, Ir or IrOx particles (100-200 nm) and Nafion ionomer form a porous layer approximately 10 μm thick. Metal catalyst loading is approximately 0.5-3 g/cm$^2$.

In some embodiments, $NiFeO_x$ is used for basic reactions.

PEM

The MEAs include a polymer electrolyte membrane (PEM) disposed between and conductively coupled to the anode catalyst layer and the cathode catalyst layer. Referring to FIG. 2, the polymer electrolyte membrane 265 has high ionic conductivity (greater than about 1 mS/cm), and is mechanically stable. Mechanical stability can be evidenced in a variety of ways such as through high tensile strength, modulus of elasticity, elongation to break, and tear resistance. Many commercially-available membranes can be used for the polymer electrolyte membrane 265. Examples include, but are not limited to, various Nafion® formulations, GORE-SELECT, FumaPEM® (PFSA) (FuMA-Tech GmbH), and Aquivion (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

Cathode Buffer Layer

Referring to FIG. 2, it may be noted that when the polymer electrolyte membrane 265 is a cation conductor and is conducting protons, it contains a high concentration of protons during operation of the CRR, while the cathode 220 operates best when a low concentration of protons is present. It can be useful to include a cathode buffer layer 225 between the polymer electrolyte membrane 265 and the cathode 220 to provide a region of transition from a high concentration of protons to a low concentration of protons. In one arrangement, the cathode buffer layer 225 is an ion-conducting polymer with many of the same properties as the ion-conducting polymer in the cathode 220. The cathode buffer layer 225 provides a region for the proton concentration to transition from the polymer electrolyte membrane 265, which has a high concentration of protons to the cathode 220, which has a low proton concentration. Within the cathode buffer layer 225, protons from the polymer electrolyte membrane 265 encounter anions from the cathode 220, and they neutralize one another. The cathode buffer layer 225 helps ensure that a deleterious number of protons from the polymer electrolyte membrane 265 does not reach the cathode 220 and raise the proton concentration. If the proton concentration of the cathode 220 is too high, COx reduction does not occur. High proton concentration is considered to be in the range of approximately 10 to 0.1 molar and low concentration is considered to be less than approximately 0.01 molar.

The cathode buffer layer 225 can include a single polymer or multiple polymers. If the cathode buffer layer 225 includes multiple polymers, the multiple polymers can be mixed together or can be arranged in separate, adjacent layers. Examples of materials that can be used for the cathode buffer layer 225 include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that COx reduction activity is high due to the proton concentration being low. This sufficiency can be different for different cathode buffer layer materials. In general, the thickness of the cathode buffer layer is between approximately 200 nm and 100 between 300 nm and 75 between 500 nm and 50 or any suitable range.

In some embodiments, the cathode buffer layer is less than 50 μm, for example between 1-25 μm such between 1-5 μm, 5-15 μm, or 10-25 μm. By using a cathode buffer layer in this range of thicknesses, the proton concentration in the cathode can be reduced while maintaining the overall conductivity of the cell. In some embodiments, an ultra-thin layer (100 nm-1 μm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Anode Buffer Layer

In some CRR reactions, bicarbonate is produced at the cathode 220. It can be useful if there is a polymer that blocks bicarbonate transport somewhere between the cathode 220 and the anode 240, to prevent migration of bicarbonate away from the cathode. It can be that bicarbonate takes some $CO_2$ with it as it migrates, which decreases the amount of $CO_2$ available for reaction at the cathode. In one arrangement, the polymer electrolyte membrane 265 includes a polymer that blocks bicarbonate transport. Examples of such polymers include, but are not limited to, Nafion® formulations, GORE-SELECT, FumaPEM® (PFSA) (FuMA-Tech GmbH), and Aquivion (PFSA) (Solvay). In another arrangement, there is an anode buffer layer 245 between the polymer electrolyte membrane 265 and the anode 240, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion (PFSA) (Solvay). Of course, including a bicarbonate blocking feature in the ion-exchange layer 260 is not particularly desirable if there is no bicarbonate in the CRR.

In another embodiment of the invention, the anode buffer layer 245 provides a region for proton concentration to transition between the polymer electrolyte membrane 265 to the anode 240. The concentration of protons in the polymer electrolyte membrane 265 depends both on its composition and the ion it is conducting. For example, a Nafion polymer electrolyte membrane 265 conducting protons has a high proton concentration. A FumaSep FAA-3 polymer electrolyte membrane 265 conducting hydroxide has a low proton concentration. For example, if the desired proton concentration at the anode 240 is more than 3 orders of magnitude different from the polymer electrolyte membrane 265, then an anode buffer layer 245 can be useful to effect the transition from the proton concentration of the polymer electrolyte membrane 265 to the desired proton concentration of the anode. The anode buffer layer 245 can include a single polymer or multiple polymers. If the anode buffer layer 245 includes multiple polymers, the multiple polymers can be mixed together or can be arranged in separate, adjacent layers. Materials that can be useful in providing a region for the pH transition include, but are not limited to, Nafion, FumaSep FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 4 above. In one embodiment of the invention, at least one of the ion-conducting polymers in the cathode 220, anode 240, polymer electrolyte membrane 265, cathode buffer layer 225, and anode buffer layer 245 is from a class that is different from at least one of the others.

Layer Porosity

It can be useful if some or all of the following layers are porous: the cathode 220, the cathode buffer layer 225, the anode 240 and the anode buffer layer 245. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 µm, between 10 nm and 100 µm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume), but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

MEA Fabrication

MEAs for $CO_x$ reduction may be fabricated using a variety of techniques. In various embodiments, MEAs fabrication employs multiple steps. Small differences in the parameters of the fabrication process can make a large difference in performance.

In certain embodiments, MEA fabrication employs a polymer-electrolyte membrane (e.g., a Nafion PEM) layer and depositing or otherwise forming an anion-exchange polymer electrolyte layer and cathode catalyst layer on the cathode and depositing or otherwise forming an anode catalyst layer on the anode. An alternate route is to fabricate the catalyst layers on to porous gas diffusion layers (e.g., carbon for the cathode or titanium for the anode) and sandwich the membrane (which may include the anion-exchange layer) between catalyst containing porous layers. In certain embodiments, catalyst layers are fabricated by making an ink of the solid catalyst and support particles and polymer electrolyte dispersed in a solvent. The ink may be applied by a variety of methods to the polymer electrolyte membrane or GDL. The solvent subsequently evaporates leaving behind a porous solid catalyst layer.

Imaging methods may be used to characterize the thickness and uniformity. The thickness should be consistent and controllable, and the uniformity smooth and as defect free as possible.

Various techniques may be employed to form the individual layers of the MEA. Generally, these techniques form the layer on a substrate such as a PEM layer or GDL as mentioned herein. Examples of such techniques include ultrasonic spray deposition, doctor blade application, gravure, screen printing, and decal transfer.

Catalyst inks using anion-exchange polymers are not well studied (particularly for certain polymers) and do not have the same solution structure as typical Nafion-based inks used in fuel cells and electrolyzers. The formulation and steps needed for form a well dispersed and stable catalyst ink were not known. It is believed that Nafion forms micell-like structures that allow relatively easy suspension in aqueous media. Other ion-conducting polymers and particularly some anion-conducting polymers do not form such structures and therefore are more difficult to provide in suspensions.

In certain embodiments, a catalyst layer ink is prepared by mixing metal or metal supported on carbon catalyst with ion-conducting polymer (e.g., an anion-conducting polymer) and dispersing in solvent (alcohol, etc.) by sonicating.

As indicated, certain fabrication techniques utilize doctor blade application, screen printing, decal transfer, electrospinning, etc. Roll-to-roll techniques such as gravure or microgravure may be used for high throughput processing.

MEA Post Treatments

After the MEA is fabricated, additional treatments may be used to increase performance. Examples the types of performance improvement include lifetime and voltage. In some embodiments, a post treatment introduces salt or certain salt ions into an MEA. In some embodiments, a post treatment produces an MEA that has structural modifications resulting from the treatments including better adhesion between layers.

Hot pressing: heating the MEA under pressure to bond the layers together. Hot pressing will help 'melt' layers together to prevent delamination.
  Time: about 2 min to 10 min (MEA only); 1.5 min-2 min (MEA+gas distribution layer (GDL)); the "MEA+GDL" may be pressed at least twice to form a stable assembly
  Temperature: about 100° C. to 150° C.;
  Pressure: between about 300 psi and 600 psi (for 3×3 inch ½ MEAs), but the MEA can tolerate about 2500 psi without GDL;
  Hydration: soaking the MEA in water or aqueous solutions to wet the polymer-electrolytes prior to cell assembly. In some embodiments, the aqueous solution is a salt solution as described herein.
  Boil Nafion or other polymer electrolyte MEA. This permanently changes the macrostructure of the polymer electrolyte and increases the amount of water in the polymer matrix. This increases ionic conductivity, but also increases water transport number.
  Heat to dry. This can decrease water content and can reduce the amount of water transported through the polymer electrolyte during operation.

Stabilized Interface Between MEA Layers

Water and $CO_2$ formed at the interface of an anion-conducting layer (e.g., a cathode buffer layer) and a cation-conducting membrane (e.g., a PEM) can cause the two layers to separate or delaminate where the polymer layers connect. The reaction at the bipolar interface is depicted in FIGS. 3 and 7.

In addition, it is desirable for the $CO_2$ to return to the cathode of the cell where it can be reduced instead of lost to the anode, so a pathway (e.g., pores) in an anion-exchange layer (e.g., a cathode buffer layer and/or cathode layer) provides both a way to remove water and $CO_2$ from the interface to prevent delamination and return $CO_2$ to the cathode where it can react.

Figure 7:
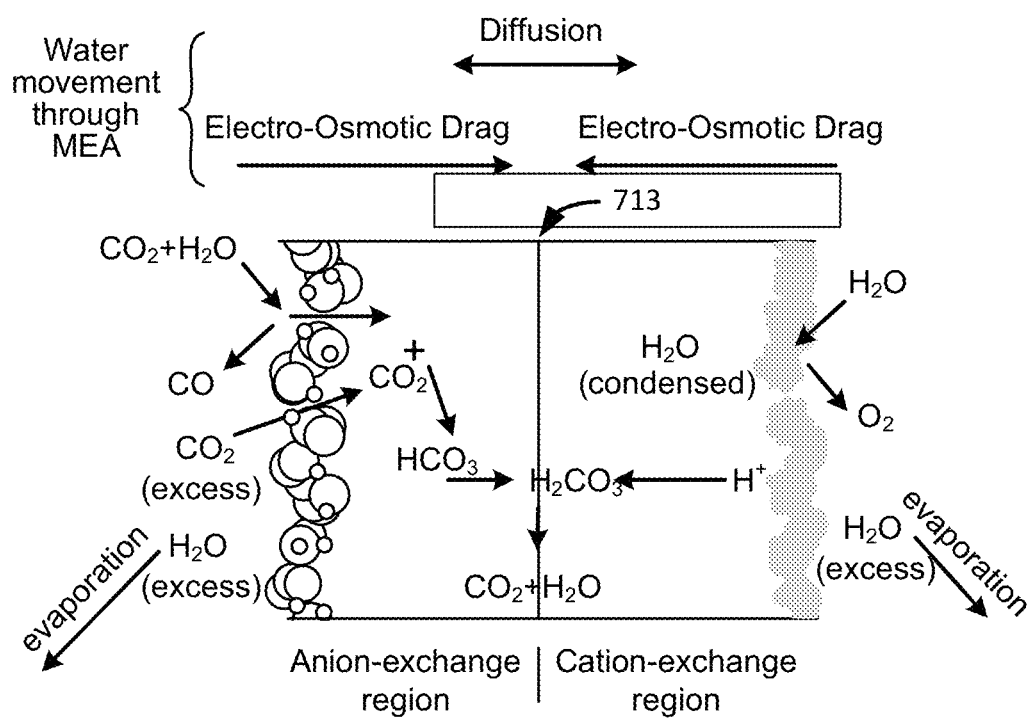
FIG. 7 is an illustration of an MEA similar to that shown FIG. 3, but additionally shows information relevant to mass transport and generation of $CO_2$ and water at a bipolar interface.

The structure depicted in FIG. 7 is similar to that depicted in FIG. 3, but FIG. 7 includes additional information relevant to mass transport and generation of $CO_2$ and water at a bipolar interface. For example, it shows hydroxide and $CO_2$ reacting on the cathode side to produce bicarbonate ions, which move toward the bipolar interface 713. On the anode side, hydrogen ions produced by water oxidation move toward bipolar interface 713, where they react with the bicarbonate ions to produce water and $CO_2$, both of which should be allowed to escape without damaging the bipolar layers.

Also depicted in FIG. 7 are water transport paths including (a) electroosmotic drag with anions from the cathode to interface 713, (b) electroosmotic drag with cations from the anode to interface 713, and (c) diffusion. Water evaporates at the anode and cathode.

Various MEA designs contain features that resist delamination and optionally provide a pathway for the reaction products to leave the interface area. In some embodiments, the bipolar interface is flat. But in some designs, the interface is provided with a composition gradient and/or interlocking structures. These are described further below with reference to FIGS. 10a, 10b, 10c, and 10d, which illustrate bipolar interfaces of MEA designs configured to resist delamination.

In some embodiments, the interface includes a gradient. A gradient may be formed, for example, by using two nozzles during spray deposition and adding anion-exchange polymer with the relative amounts of the polymers varied during deposition of the cation-exchange layer. Similarly, cation-exchange polymer may be added during deposition of the anion-exchange layer. Referring for example to FIG. 7, a gradient may extend through substantially all or a portion of the anion-exchange region and cation-exchange region, such that the anion-exchange region has predominantly anion-exchange polymer adjacent to the cathode with the relative amount of cation-exchange polymer increasing moving from the cathode toward the interface 713. Similarly, the cathode-exchange region has a predominantly cation-exchange polymer adjacent the anode cathode with the relative amount of anion-exchange polymer increasing moving from the anode toward the interface 713. In some embodiments, there are a pure anion-exchange and pure cation-exchange regions with a gradient between the two.

In some embodiments, the layers of the bipolar membrane are melted together. This may be accomplished by choosing an appropriate solvent. For example, Nafion is at least slightly soluble in a water/ethanol mixture. By using that mixture (or another solvent in which the cation-conducting polymer is soluble) as a solvent for the anion-conducting polymer can result in Nafion or other cation-conducting polymer at least slightly dissolvent and melting into the interface. In some embodiments, this results in a thin gradient, e.g., one that extends 0.5-10% into the anion-conducting polymer layer thickness.

Figure 8A:
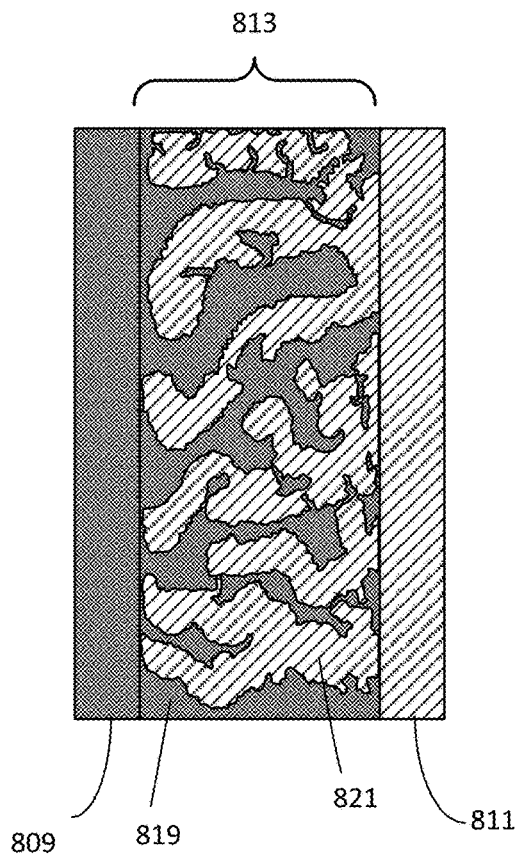
FIGS. 8A-8D present various MEA designs that contain features that resist delamination and optionally provide a pathway for the reaction products to leave the interface area.

In some embodiments, the interface includes a mixture of the polymers. FIG. 8A illustrates a bipolar interface 813 in which a cation-conducting polymer 821 and an anion-conducting polymer 819 are mixed. In the example of FIG. 8A, a portion of an anion-conducting polymer layer 809 and a portion of a cation-conducting polymer layer 811 are shown. The anion-conducting polymer layer 809 may be a pure anion-conducting polymer and the cation-conducting polymer layer 811 may be pure cation exchange polymer. The cation-conducting polymer 821 may be the same or different cation-conducting polymer as in the cation-conducting polymer layer 811. The anion-conducting polymer 819 may be the same or different anion-conducting polymer as in the anion-conducting polymer layer 809.

Figure 8B:
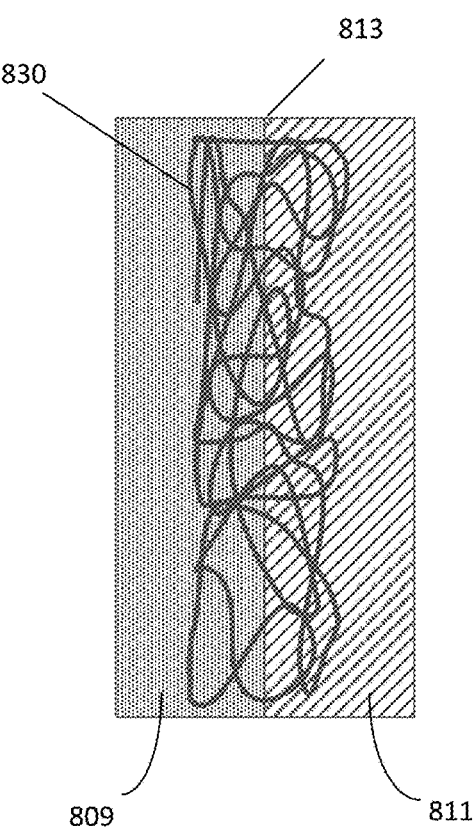

In some embodiments, the interface includes a third material that physically reinforces the interface. For example, FIG. 8B shows an example of a material 830 that straddles interface 813. That is, the material 830 partially resides in an anion-conducting polymer layer 809 and a cation-conducting polymer layer 811. Because of this, material 830 may bind the two layers in a manner that resists delamination. In one example, the material 830 is a porous inert material, such as porous PTFE. Such an interface may be fabricated, for example, by casting or otherwise applying the cation-conducting polymer and the anion-conducting polymer on opposite sides of a PTFE or similar porous film, followed by hot pressing.

Figure 8C:
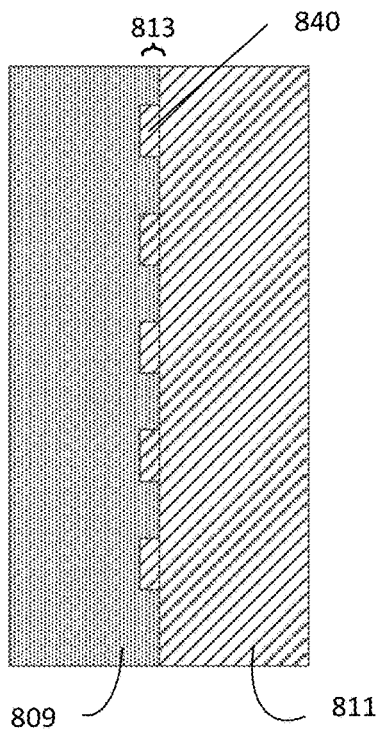

FIG. 8C illustrates a bipolar interface 813 having protrusions 840 of the cation-conducting polymer extending from the cation-conducting polymer layer 811 into the anion-conducting polymer layer 809. These protrusions may mechanically strengthen interface 813 so that it does not delaminate when $CO_2$ and water are produced at the interface. In some embodiments, protrusions extend from anion-conducting polymer layer 809 into cation-conducting polymer layer 811. In certain embodiments, protrusions extend both directions. Example dimensions are 10 μm-1 mm in the in-plane dimension, though smaller dimensions (e.g., 500 nm-1 μm) are possible. The out-of-plane dimension may be for example, 10-75% or 10-50% of the total thickness of the polymer layer into which it extends. The protrusions may be fabricated for example by any appropriate technique such as lithographic techniques or by spraying the polymer into a patterned mesh that is then removed. Surface roughening techniques may also be used to create protrusions. In some embodiments, protrusions may be formed from a different material, e.g., metal to help interlock the polymer layers and mechanically strengthen the interface.

Figure 8D:
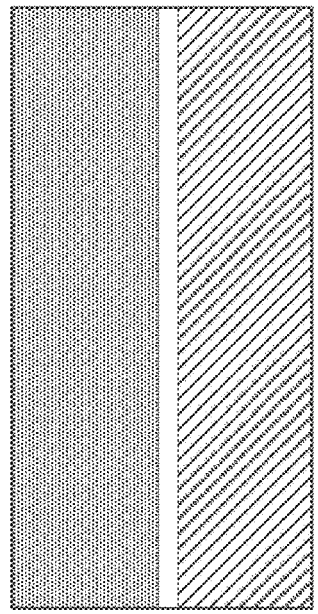

FIG. 8D illustrates a bipolar interface 813 having a third material 850 disposed between or mixed one or more of the cation-conducting polymer layer 811 into the anion-conducting polymer layer 809. In some embodiments, for example, the third material 850 can be an additive as discussed further below. In some embodiments, the third material 850 can be a blend of anion-conducting and cation-conducting ionomers at the interface. For example, it can be a mixture of Nafion 5 wt % ionomer and Orion 2 wt % mTPN1. In some embodiments, the third material may include ion acceptors and donors, either mixed together or provided as distinct layers.

In some embodiments, the interface includes additives to facilitate acid-base reactions and prevent delamination. In some embodiments, the additives may facilitate spreading out the acid base recombination a larger volume instead of just at a 2D interface of the anion conducting polymer and cation conducting polymer. This spreads out water and $CO_2$ formation, heat generation, and may lower the resistance of the membrane by decreasing the barrier to the acid-base reaction. These effects can be advantageous in helping avoid build-up of products, heat, and lowering resistive losses in the MEA leading to a lower cell voltage. Further, it helps avoid degrading materials at the interface due to heat and gas production.

Examples of additives that facilitate acid-base reactions include molecules that are both proton and anion acceptors, such as hydroxide containing ionic liquids with 1-butyl-3-methylimidazolium hydroxide being a specific example. Other ionic liquids may also be used. In some embodiments, an ionomer different from that of the anion-conductive polymer layer and the cation-conductive polymer layer may be used. For example, a relatively high conductivity anion-exchange material such as Sustainion may be used. Such anion-exchange material may not be selective enough to use as a cathode buffer layer, but can be used at the interface.

Additional examples of materials that may be present at the interface include block copolymers having different charged groups (e.g., both cation and anion stationary charge groups), cation-and-anion conducting polymers, resin material, ion donors such as oxides including graphene oxide, catalysts for acid/base recombination, catalysts that react $H_2$ and $O_2$ diffusing from the anode and cathode, water splitting catalysts, $CO_2$ absorbing material, and $H_2$ absorbing material.

In some embodiments, a cross-linker may be added to covalently cross-link the two polymers of the bipolar membrane. Examples of cross-linking groups include xylene, which may be provided on an ionomer. Other cross-linking groups may be used. A cross-linker may be provided, for example, on the cation-conductive polymer, with the anion-conductive polymer spray-deposited on top, followed by heating to induce the cross-linking reaction and introduce cross-linking across the interface.

In some embodiments, the anion-conducting polymer and the cation-conducting polymer of the bipolar membrane have the same backbone, with different stationary charge groups. As an example, Orion ionomers may be used with different stationary charge groups. The ionomers are more compatible and less apt to delaminate.

In the examples above, the interface 813 may be a three-dimensional volume having thickness that is between 1% and 90% of the overall thickness of the bipolar membrane, or between 5% and 90%, or between 10% and 80%, or between 20% and 70%, or between 30% and 60% of the overall thickness of the bipolar membrane. In some embodiments, it less than half the overall thickness, including between 1% and 45%, 5% and 45%, 5% and 40%, or 5% and 30%.

Hot pressing may be used in fabricating any of the bipolar interface designs described above.

Relative Sizes of MEA Layers

In certain embodiments, a polymer electrolyte membrane and an adjoining cathode buffer layer or other anion-conducting polymer layer may have relative thickness that facilitate the fabrication and/or operating performance of an MEA.

Figure 9:
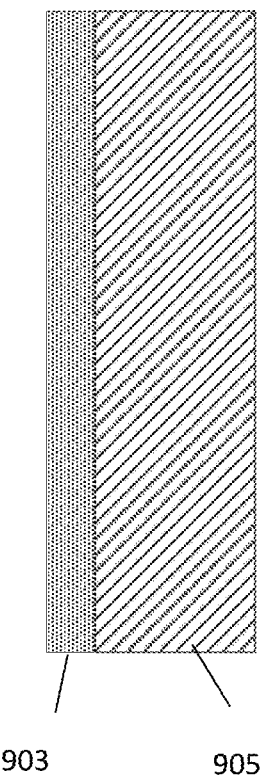
FIG. 9 is an illustration of a partial MEA that includes an anion-conducting polymer layer, which may be a cathode buffer layer, and a polymer electrolyte membrane, which may be cation-conducting polymer layer.

FIG. 9 depicts an example of a partial MEA that includes an anion-conducting polymer layer (AEM) 903, which may be a cathode buffer layer, and a polymer electrolyte membrane (PEM) 905, which may be cation-conducting polymer layer (e.g., a proton exchange polymer layer) or an anion-conducting polymer layer. In this example, the PEM 905 is relatively thicker than the anion-conducting polymer layer 903, which may be a cathode buffer layer, and a polymer electrolyte membrane (PEM) 905, which may be cation-conducting polymer layer (e.g., a proton exchange polymer layer) or an anion-conducting polymer layer. In this example, the PEM 905 is relatively thicker than the anion-conducting polymer layer 903. For example, the PEM 905 may be 120 micrometers compared with about 10-20 micrometers thick for the AEM 903.

In some cases, anion-conducting polymers such as those used in anion-conducting polymer layer 903 are substantially less conductive than cation-conducting polymers such as those used in PEM 905. Therefore, to provide the benefits of a cathode buffer layer (e.g., anion-conducting polymer layer 903) without substantially increasing the overall resistance of the MEA, a relatively thin cathode buffer is used. However, when a cathode buffer layer becomes too thin, it becomes difficult to handle during fabrication of the MEA and in other contexts. Therefore, in certain embodiments, a thin cathode buffer layer is fabricated on top of a relatively thicker PEM layer such as a cation-conducting polymer layer. The anion-conducting polymer layer may be fabricated on the PEM layer using, for example, any of the fabrication techniques described elsewhere herein.

In various embodiments, the polymer electrolyte membrane layer is between about 20 and 200 micrometers thick. In some embodiments, the polymer electrolyte membrane layer is between about 60 and 120 micrometers thick. In some embodiments, a thin polymer electrolyte membrane layer is used, being between about 20 and 60 micrometers thick. In some embodiments, a relatively thick polymer electrolyte layer is used, between about 120 and 200 micrometers thick.

In some embodiments, a thinner cathode buffer layer is used with a thinner polymer electrolyte membrane. This can facilitate movement of the $CO_2$ formed at the interface back to cathode, rather than to the anode. In some embodiments, a thicker cathode buffer layer is used with a thicker polymer electrolyte membrane. This can result in reducing cell voltage in some embodiments.

Factors that can influence the thickness of a cathode buffer layer include the ion selectivity of the anion-conducting polymer, the porosity of the anion-conducting polymer, the conformality of the anion-conducting polymer coating the polymer electrolyte membrane.

Many anion-conducting polymers are in the range of 95% selective for anions, with about 5% of the current being cations. Higher selectivity anion-conducting polymers, with greater than 99% selectivity for anions can allow for a reduction in a significant reduction in thickness while providing a sufficient buffer.

Mechanical strength of an anion-conducting layer can also influence its thickness, with stronger layers enabling thinner layers. Reducing porosity of an anion-conducting polymer may reduce the thickness of the anion-conducting layer.

In some implementations, a cathode buffer layer or other anion-conducting polymer layer that abuts the polymer electrolyte membrane is between about 10 and 20 micrometers thick. Using a >99% selective polymer can allow the cathode buffer layer to be reduced to between 2 and 10 microns in some embodiments.

In some cases, the ratio of thicknesses of the polymer electrolyte membrane and the adjoining anion-conducting polymer layer is between about 3:1-90:1 with the ratios at the higher end used with highly selective anion-conducting polymer layers. In some embodiments, the ratio is about 2:1-13:1, about 3:1-13.1, or about 7:1-13.1.

In certain embodiments, a relatively thinner PEM improves some aspects of the MEA's performance. Referring to FIG. 9, for example, polymer electrolyte membrane 905 may have a thickness of about 50 micrometers, while the anion-conducting layer may have a thickness between about 10 and 20 micrometers. A thin PEM favors movement of water generated at the AEM/PEM interface to move toward the anode. The pressure of gas on the cathode side of the cell can be about 80-450 psi, which causes the water at the interface to move to the anode. However, in some instances, a thick PEM can cause the majority of water to move through the AEM to the cathode, which leads to flooding. By using a thin PEM, flooding can be avoided.

$CO_x$ Reduction Reactor (CRR)

Figure 10:
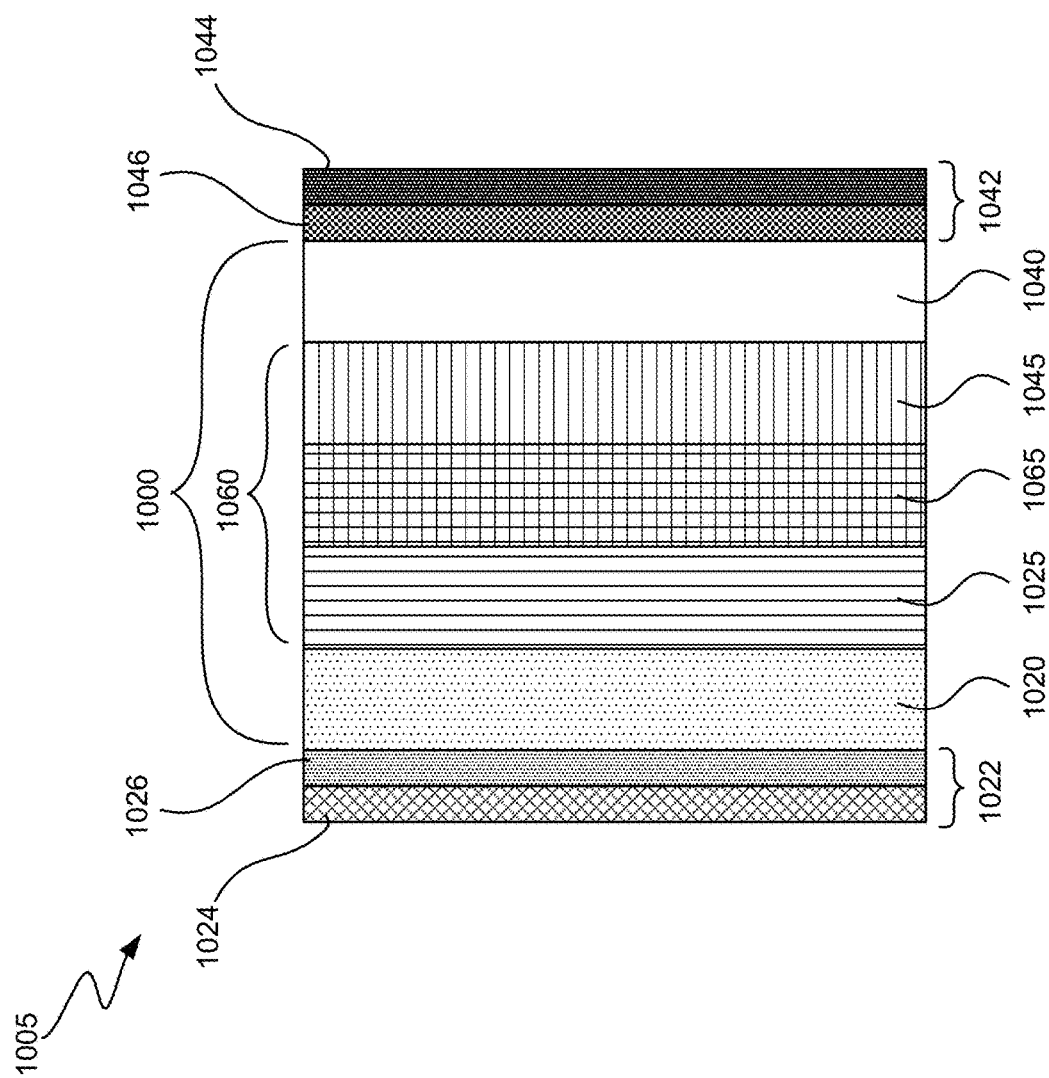
FIG. 10 is a schematic drawing that shows the major components of a $CO_x$ reduction reactor (CRR), according to an embodiment of the invention.

FIG. 10 is a schematic drawing that shows the major components of a $CO_x$ reduction reactor (CRR) 1005, according to an embodiment of the disclosure. The CRR 1005 has a membrane electrode assembly 1000 such as any of those described elsewhere herein. The membrane electrode assembly 1000 has a cathode 1020 and an anode 1040, separated by an ion-exchange layer 1060. The ion-exchange layer 1060 may include sublayers. The depicted embodiment has three sublayers: a cathode buffer layer 1025, a polymer electrolyte membrane 1065, and an optional anode buffer layer 1045. In addition, the CRR 1005 has a cathode support structure 1022 adjacent to the cathode 1020 and an anode support structure 1042 adjacent to the anode 1040.

The cathode support structure 1022 has a cathode polar plate 1024, made of, for example, graphite, to which a voltage can be applied. There can be flow field channels, such as serpentine channels, cut into the inside surfaces of the cathode polar plate 1024. There is also a cathode gas diffusion layer 1026 adjacent to the inside surface of the cathode polar plate 1024. In some arrangements, there is more than one cathode gas diffusion layer (not shown). The cathode gas diffusion layer 1026 facilitates the flow of gas into and out of the membrane electrode assembly 1000. An example of a cathode gas diffusion layer 1026 is a carbon paper that has a carbon microporous layer.

The anode support structure 1042 has an anode polar plate 1044, usually made of metal, to which a voltage can be applied. There can be flow field channels, such as serpentine channels, cut into the inside surfaces of the anode polar plate 1044. There is also an anode gas diffusion layer 1046 adjacent to the inside surface of the anode polar plate 1044. In some arrangements, there is more than one anode gas diffusion layer (not shown). The anode gas diffusion layer 1046 facilitates the flow of gas into and out of the membrane electrode assembly 1000. An example of an anode gas diffusion layer 1046 is a titanium mesh or titanium felt. In some arrangements, the gas diffusion layers 1026, 1046 are microporous.

There are also inlets and outlets (not shown) associated with the support structures 1022, 1042, which allow flow of reactants and products, respectively, to the membrane electrode assembly 1000. There are also various gaskets (not shown) that prevent leakage of reactants and products from the cell.

In one embodiment, a direct current (DC) voltage is applied to the membrane electrode assembly 1000 through the cathode polar plate 1024 and the anode polar plate 1042. Water is supplied to the anode 1040 and is oxidized over an oxidation catalyst to form molecular oxygen (O2), releasing protons (H+) and electrons (e−). The protons migrate through the ion-exchange layer 1060 toward the cathode 1020. The electrons flow through an external circuit (not shown). In one embodiment, the reaction is described as follows:

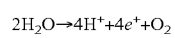

$$2H_2O \rightarrow 4H^+ + 4e^+ + O_2$$

In other embodiments, other reactants can be supplied to the anode 1040 and other reactions can occur.

While the depicted embodiment shows an ion-exchange layer having three sublayers, certain embodiments employ ion-exchange layers having only a single layer (e.g., a cation conducting polymer layer or an anion conducting polymer layer). Other embodiments have only two sublayers.

Figure 11:
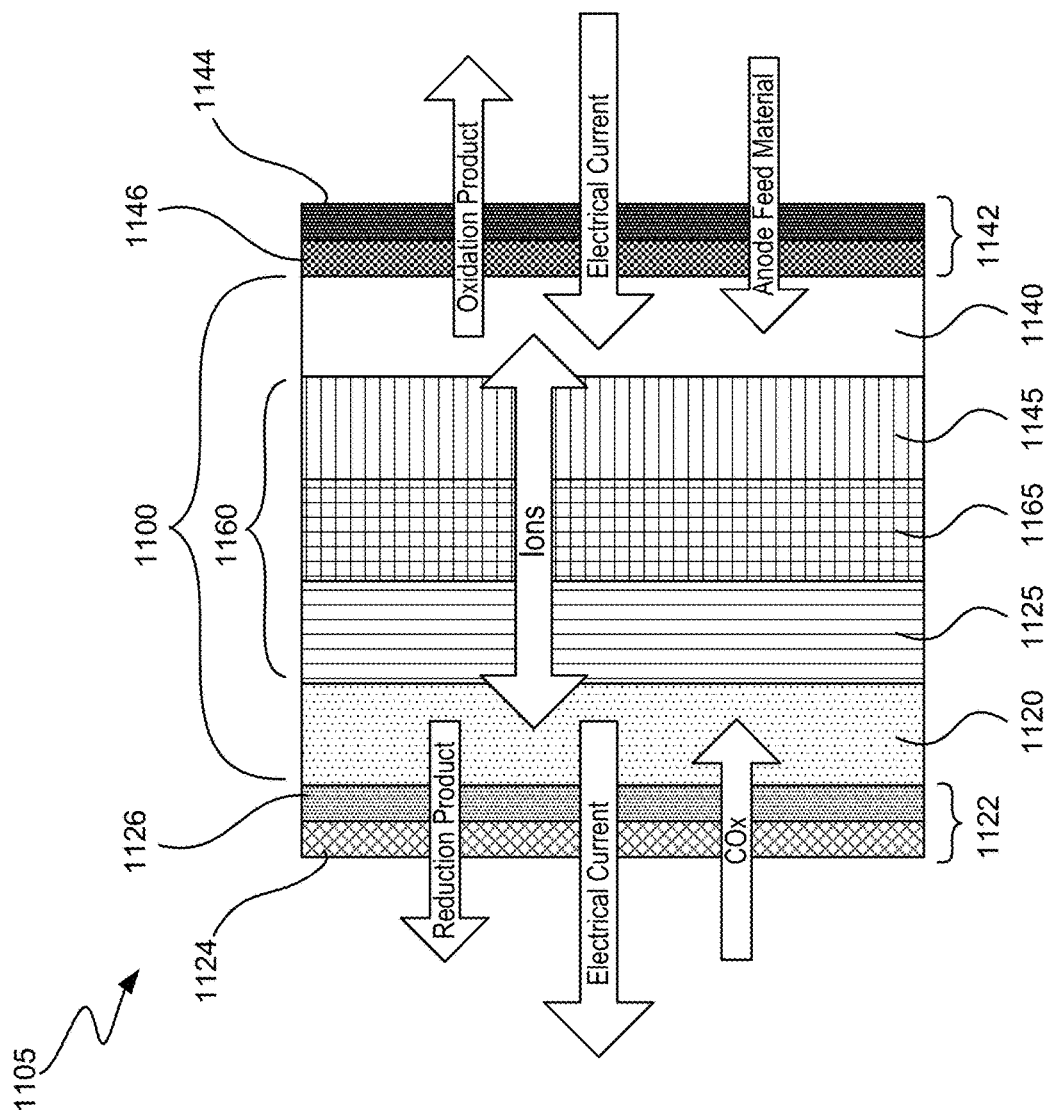
FIG. 11 is a schematic drawing that shows the major components of a CRR with arrows showing the flow of molecules, ions, and electrons according to one embodiment of the invention.

The flow of reactants, products, ions, and electrons through a CRR 1105 reactor is indicated in FIG. 11, according to an embodiment. The CRR 1105 has a membrane electrode assembly 1100 such as any of the MEAs described elsewhere herein. The membrane electrode assembly 1100 has a cathode 1120 and an anode 1140, separated by an ion-exchange layer 1160. In certain embodiments, the ion-exchange layer 1160 has three sublayers: a cathode buffer layer 1125, a polymer electrolyte membrane 1165, and an optional anode buffer layer 1145. In addition, the CRR 1105 has a cathode support structure 1122 adjacent to the cathode 1120 and an anode support structure 1142 adjacent to the anode 1140.

The cathode support structure 1122 has a cathode polar plate 1124, which may be made of graphite, to which a voltage can be applied. There can be flow field channels, such as serpentine channels, cut into the inside surfaces of the cathode polar plate 1124. There is also a cathode gas diffusion layer 1126 adjacent to the inside surface of the cathode polar plate 1124. In some arrangements, there is more than one cathode gas diffusion layer (not shown). The cathode gas diffusion layer 1126 facilitates the flow of gas into and out of the membrane electrode assembly 1100. An example of a cathode gas diffusion layer 1126 is a carbon paper that has a carbon microporous layer.

The anode support structure 1142 has an anode polar plate 1144, which may be made of metal, to which a voltage can be applied. There can be flow field channels, such as serpentine channels, cut into the inside surfaces of the anode polar plate 1144. There is also an anode gas diffusion layer 1146 adjacent to the inside surface of the anode polar plate 1144. In some arrangements, there is more than one anode gas diffusion layer (not shown). The anode gas diffusion layer 1146 facilitates the flow of gas into and out of the membrane electrode assembly 1100. An example of an anode gas diffusion layer 1146 is a titanium mesh or titanium felt. In some arrangements, the gas diffusion layers 1126, 1146 are microporous.

There can also be inlets and outlets associated with the support structures 1122, 1142, which allow flow of reactants and products, respectively, to the membrane electrode assembly 1100. There can also be various gaskets that prevent leakage of reactants and products from the cell.

$CO_x$ can be supplied to the cathode 1120 and reduced over $CO_x$ reduction catalysts in the presence of protons and electrons. The $CO_x$ can be supplied to the cathode 1120 at pressures between 0 psig and 1000 psig or any other suitable range. The $CO_x$ can be supplied to the cathode 1120 in concentrations below 100% or any other suitable percentage along with a mixture of other gases. In some arrangements, the concentration of $CO_x$ can be as low as approximately 0.5%, as low as 5%, or as low as 20% or any other suitable percentage.

In one embodiment, between approximately 10% and 100% of unreacted $CO_x$ is collected at an outlet adjacent to the cathode 1120, separated from reduction reaction products, and then recycled back to an inlet adjacent to the cathode 1120. In one embodiment, the oxidation products at the anode 1140 are compressed to pressures between 0 psig and 1500 psig.

In one embodiment, multiple CRRs (such as the one shown in FIG. 10) are arranged in an electrochemical stack and are operated together. The CRRs that make up the individual electrochemical cells of the stack can be connected electrically in series or in parallel. Reactants are supplied to individual CRRs and reaction products are then collected.

Figure 12:
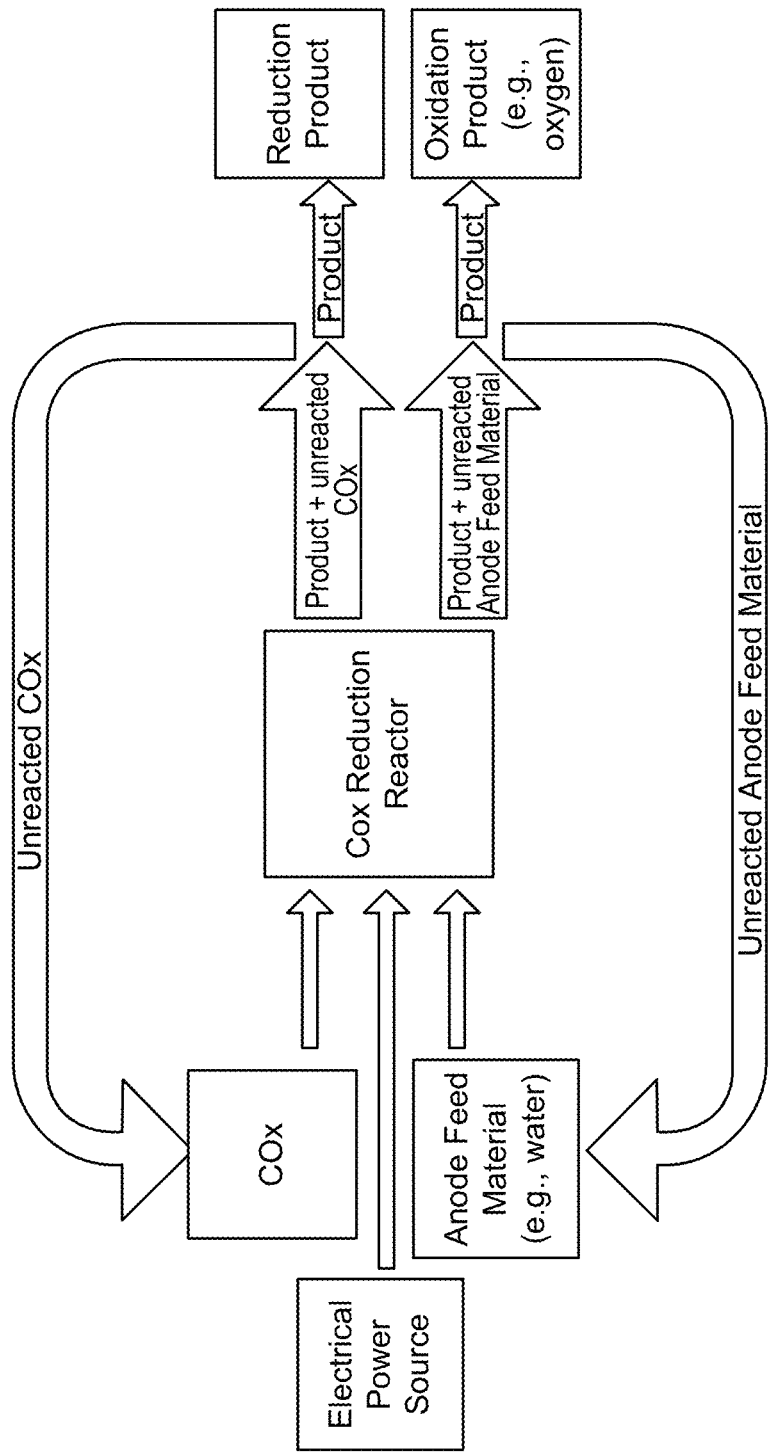
FIG. 12 is a schematic drawing that shows the major inputs and outputs of the CRR reactor.

In accordance with some embodiments, inputs and outputs to the reactor are shown in FIG. 12. $CO_x$ anode feed material, and electricity are fed to the reactor. $CO_x$ reduction product and any unreacted $CO_x$ leave the reactor. Unreacted $CO_x$ can be separated from the reduction product and recycled back to the input side of the reactor. Anode oxidation product and any unreacted anode feed material leave the reactor in a separate stream. Unreacted anode feed material can be recycled back to the input side of the reactor.

Various catalysts in the cathode of a CRR cause different products or mixtures of products to form from $CO_x$ reduction reactions. Examples of possible CO. reduction reactions at the cathode are described as follows:

$CO_2 + 2H^+ + 2e^+ \rightarrow CO + H_2O$ $2CO_2 + 12H^+ + 12e^- \rightarrow CH_2CH_2 + 4H_2O$ $2CO_2 + 12H^+ + 12e^- \rightarrow CH_3CH_2OH + 3H_2O$ $CO_2 + 8H^- + 8e^- \rightarrow CH_4 + 2H_2O$ $2CO + 8H^+ + 8e^- \rightarrow CH_2CH_2 + 2H_2O$ $2CO + 8H^- + 8e^- \rightarrow CH_3CH_2OH + H_2O$ $CO + 6H^+ + 8e^- \rightarrow CH_4 + H_2O$ In some embodiment, a method of operating a $CO_x$ reduction reactor, as described in the embodiments above, involves applying a DC voltage to the cathode polar plate and the anode polar plate, supplying oxidation reactants to the anode and allowing oxidation reactions to occur, supplying reduction reactants to the cathode and allowing reduction reactions to occur, collecting oxidation reaction products from the anode; and collecting reduction reaction products from the cathode.

In one arrangement, the DC voltage is greater than about −1.2V. In various arrangements, the oxidation reactants can be any of hydrogen, methane, ammonia, water, or combinations thereof, and/or any other suitable oxidation reactants. In one arrangement, the oxidation reactant is water. In various arrangements, the reduction reactants can be any of carbon dioxide, carbon monoxide, and combinations thereof, and/or any other suitable reduction reactants. In one arrangement, the reduction reactant is carbon dioxide.

EXAMPLES: AQUEOUS SALTS IN OPERATING MEA CELLS

Improved Lifetime and Faradaic Yield

Figure 13A:
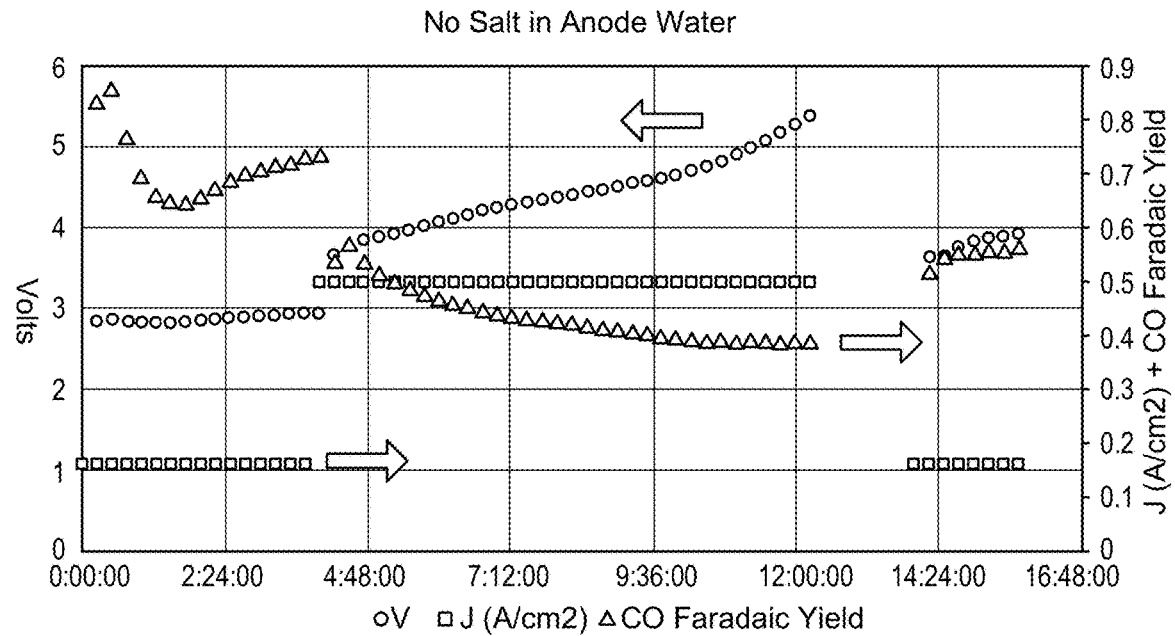
FIGS. 13A and 13B presents performance plots for two carbon dioxide electrolyzers, one with no salt in the anode water and one with 2 mM $NaHCO_3$ in the anode water.
Figure 13B:
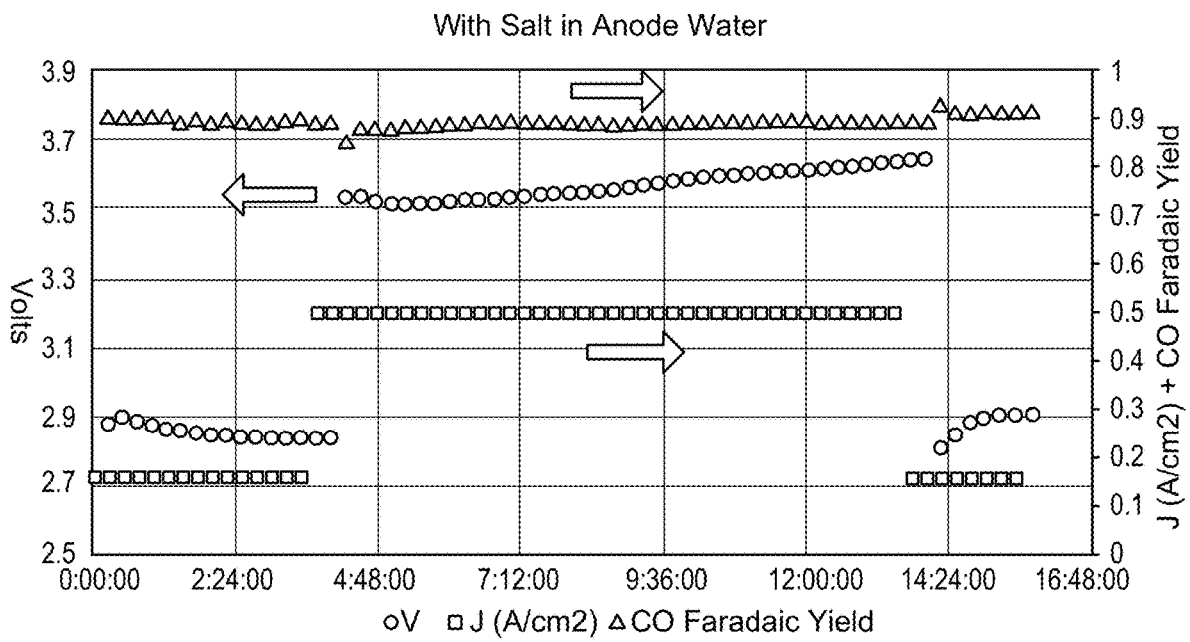

The addition of salt to the anode water can improve the Faradaic yield, lower the cell voltage, and decrease the performance decay rate. FIGS. 13A and 13B are two carbon dioxide electrolyzer performance plots, one with no salt in the anode water and one with 2 mM $NaHCO_3$ in the anode water. Both electrolyzers employed a bipolar MEA and a gold catalyst (cathode). In this example, the addition of the $NaHCO_3$ salt improves the cell performance. The cell with no salt in the anode water has an average voltage of 3.86V and average CO Faradaic yield of 0.53 for the first hour at 0.5 A/cm² and decay rate of 144 mV/hour and 0.018 CO Faradaic yield/hour for hours 2-5 at 500 mA/cm². In comparison, the cell with 2 mM $NaHCO_3$ has an average voltage of 3.52 V and average CO Faradaic yield of 0.936 for the first hour at 0.5 A/cm² and decay rate of 15.5 mV/hour and 0.001 CO Faradaic yield/hour for hours 2-5 at 500 mA/cm².

Figure 14:
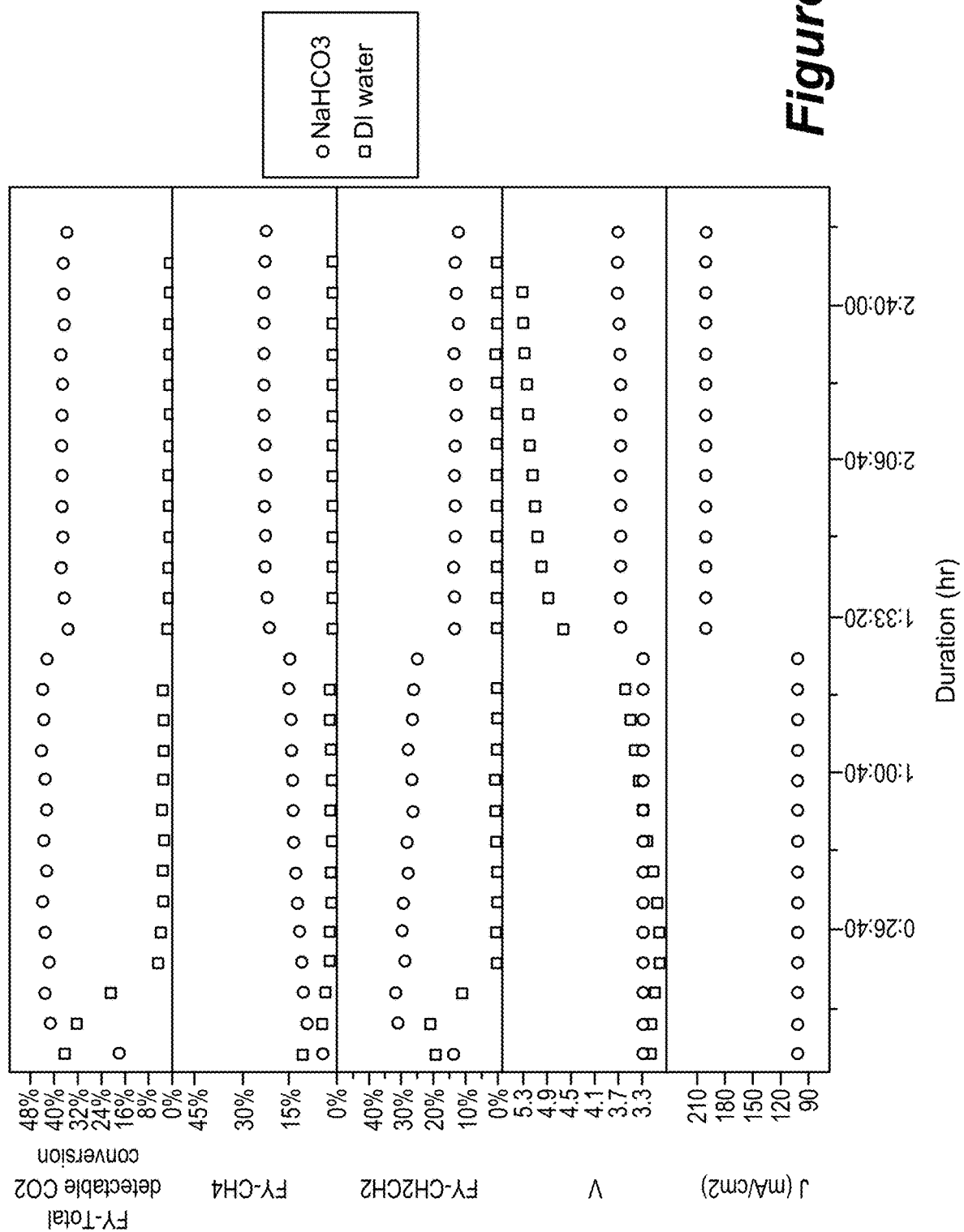
FIG. 14 presents plots demonstrating that salt has a performance enhancing effect in Faradaic yield and voltage efficiency of methane and ethylene producing $CO_2$ electrolyzer systems. The cells employed a bipolar MEA and a copper catalyst (cathode).

The presence of salt was also demonstrated to have a performance enhancing effect in Faradaic yield and voltage efficiency of methane and ethylene producing $CO_2$ electrolyzer systems. In this example, the presence of $NaHCO_3$ was shown to improve voltage from 5.19V to 3.86V at 0.2 A/cm² with an improved total detectable $CO_2$ Faradaic yield (includes CO, CH$_4$ and C$_2$H$_4$) improvement from 1% to 38%. The cells employed a bipolar MEA and a copper catalyst (cathode). See FIG. 14.

Figure 15:
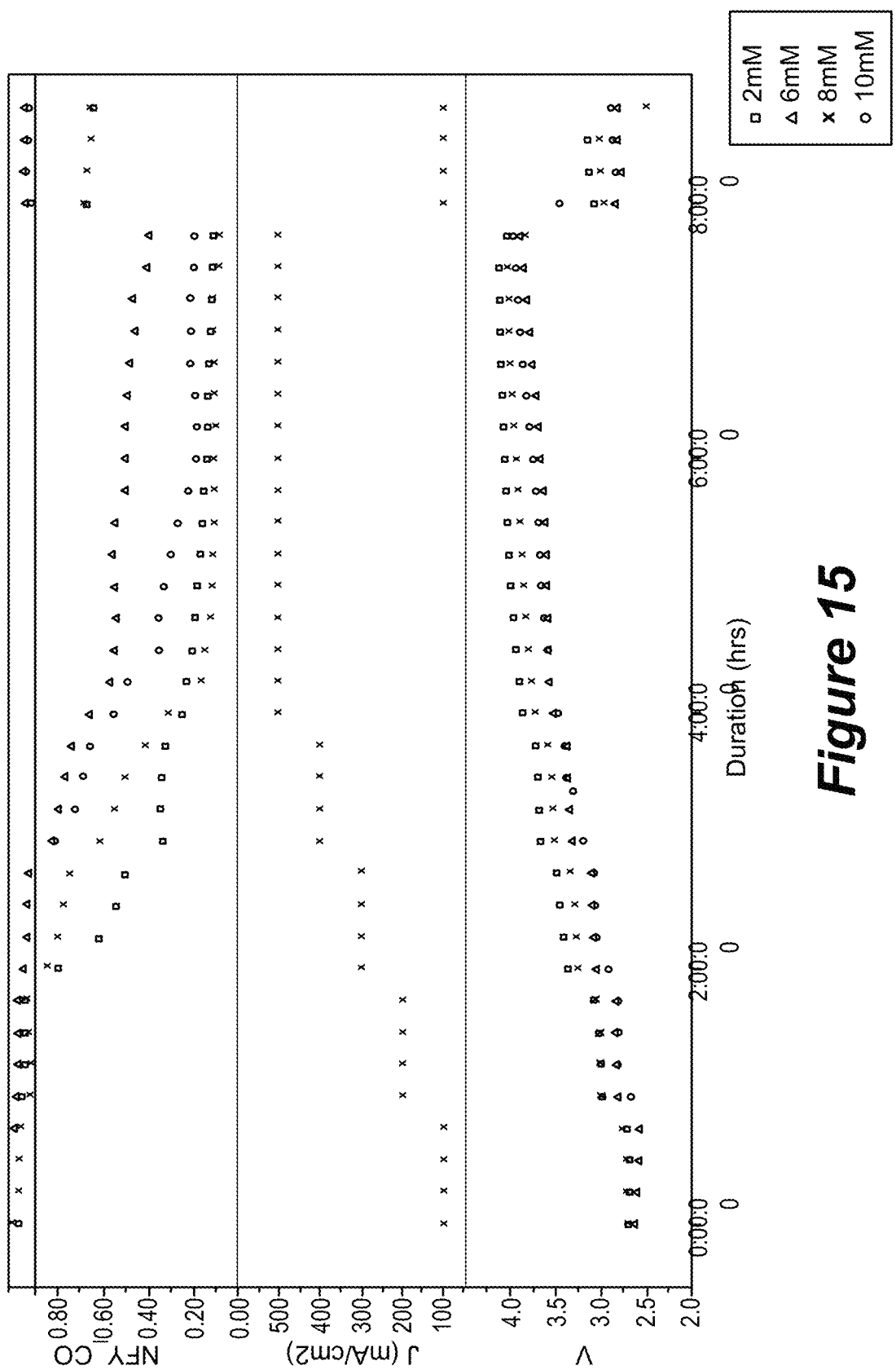
FIG. 15 presents experimental data showing that 6 mM $NaHCO_3$ showed the highest Faradaic yield, as compared to concentrations 2 mM, 8 mM, and 10 mM. The result is dependent on the size of surface area of the cell. All MEA cells employed a bipolar MEA and a gold catalyst (cathode).

Small variations in salt concentration can have a large effect. In the plot below, different concentrations of NaHCO$_3$ were added to the anode water of a 100 cm$^2$ CO$_2$ electrolysis cell. In this example, 6 mM NaHCO$_3$ showed the largest performance improvement, with higher Faradaic yield than lower concentration (2 mM) or higher concentrations (8 and 10 mM). The optimal concentration of salt also depends on the size of electrolyzer. In this example, 2 mM NaHCO$_3$ gives the best performance for a 25 cm$^2$ electrolyzer. All MEA cells employed a bipolar MEA and a gold catalyst (cathode). See FIG. 15.

Figure 16:
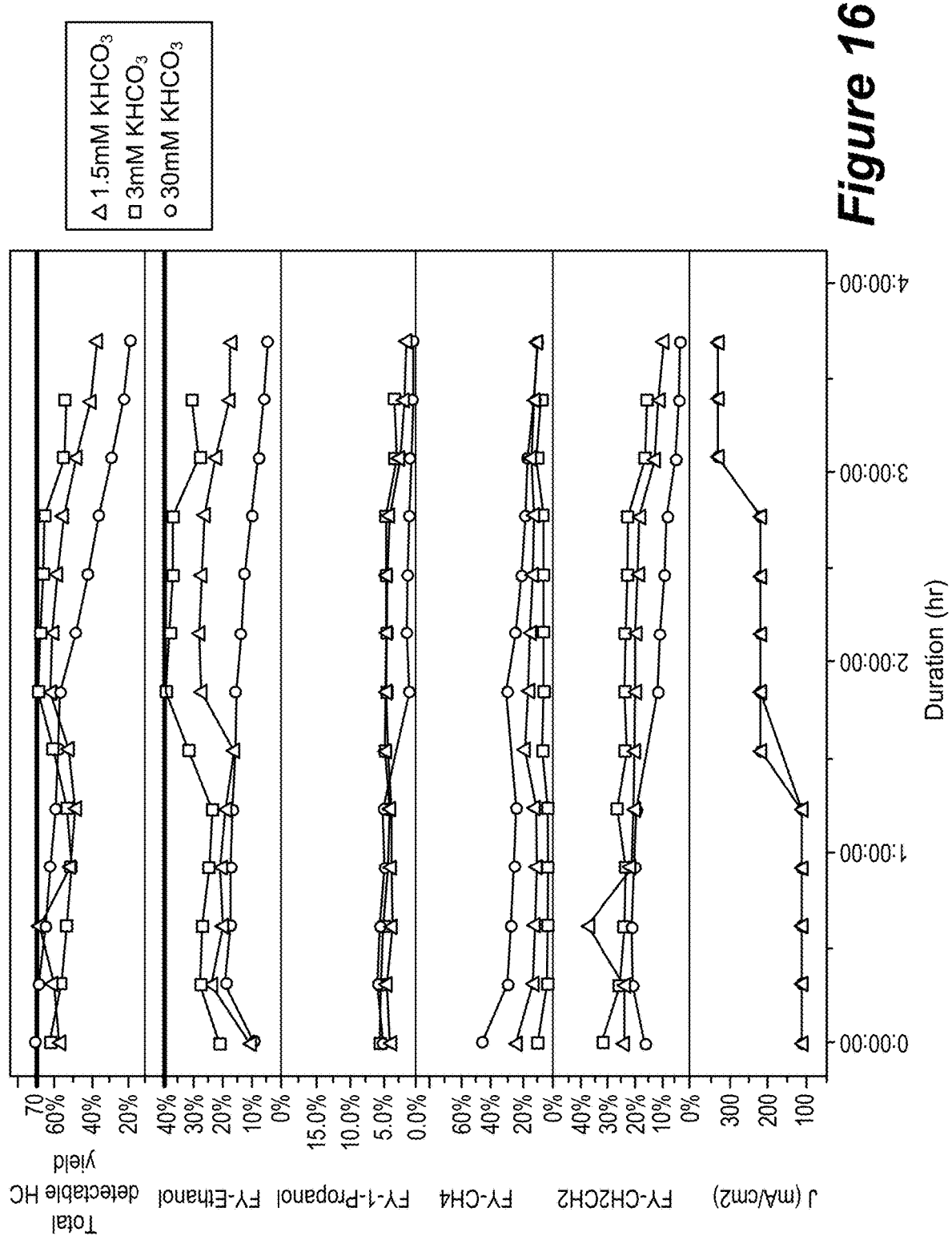
FIG. 16 shows an example in which salt concentration impacts production of C2 hydrocarbon (e.g., ethylene and ethanol) yields.

Similarly, in a copper-based catalyst system where the CO$_2$ electrolyzer converts CO$_2$ into methane, ethylene, ethanol and other small chain hydrocarbons and derivative organic compounds, the impact of salt concentration was observed. All MEA cells employed a bipolar MEA and a copper catalyst (cathode). The effect of KHCO$_3$ salt concentration was screened for optimizing the production of C2 hydrocarbon at levels of 1.5 mM to 30 mM. A total of 70% hydrocarbon yield was seen with concentration set at 3 mM KHCO$_3$. This setting was found to improve ethanol yield (40%) and ethylene yield (24%) compared to lower and higher concentrations. See FIG. 16.

Identity of the Salt Changes Product Selectivity

Figure 17:
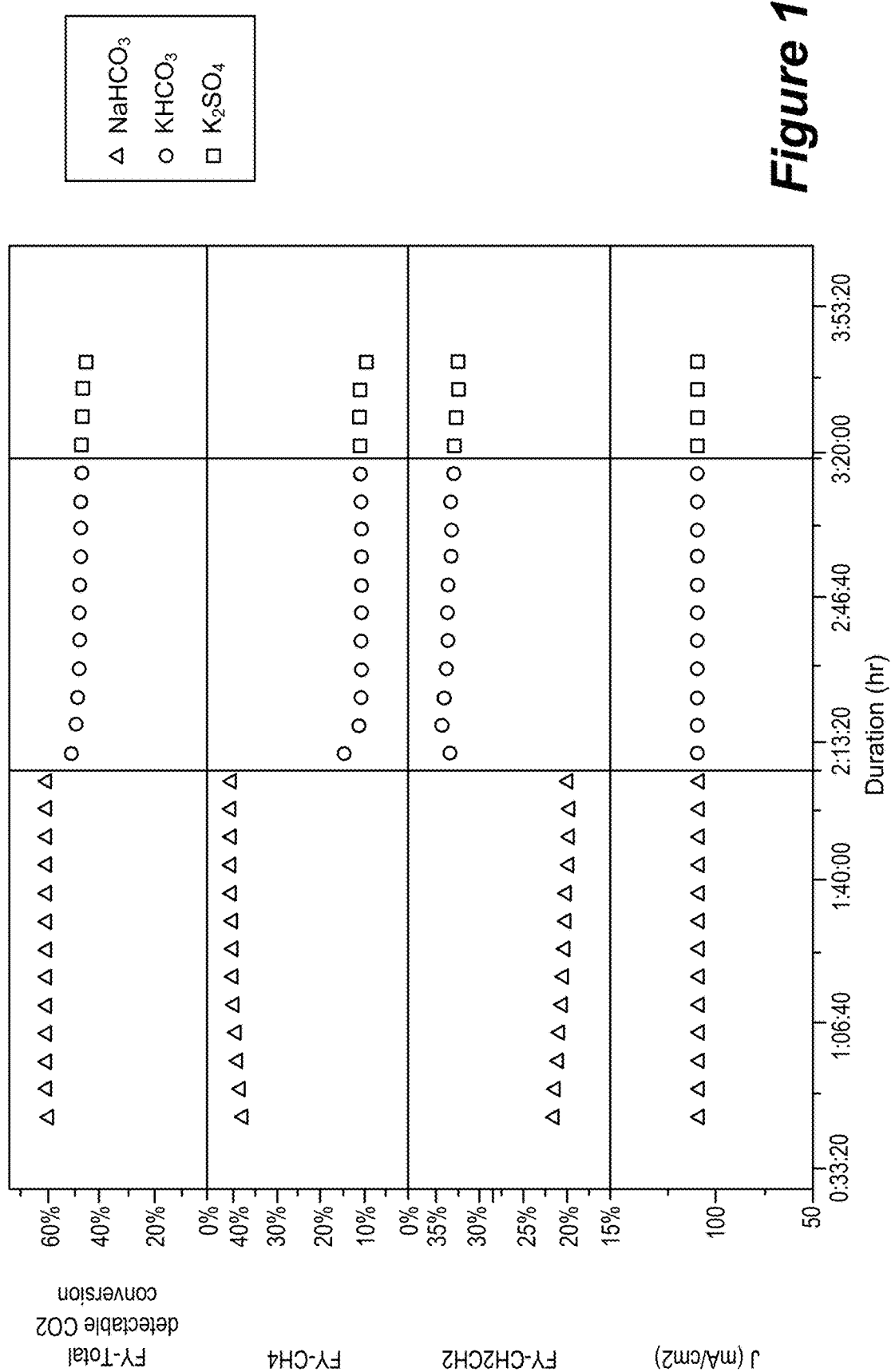
FIG. 17 presents data from an experiment in which anode water was changed from $NaHCO_3$ to $KHCO_3$ during a reaction. The selectivity for methane declined, while the selectivity for ethylene increased.

Changing the identity of the salt can change the product selectivity. For example, using a copper catalyst on the cathode and comparing the product selectivity of CO$_2$ electrolysis when 3 mM KHCO$_3$ or 3 mM NaHCO$_3$ are present in the anode water, shows that the presence of KHCO$_3$ improves the selectivity to ethanol and ethylene with minor improvements to methane selectivity. In FIG. 17, when the anode water was changed from NaHCO$_3$ to KHCO$_3$ during a reaction the selectivity for methane declined from 40% to 11% while the selectivity for ethylene increased from 20% to 35%. A lower sensitivity was shown to product selectivity when switching the anion from bicarbonate to sulfate. All cells in this example employed a bipolar MEA and a copper catalyst (cathode).

Figure 18:
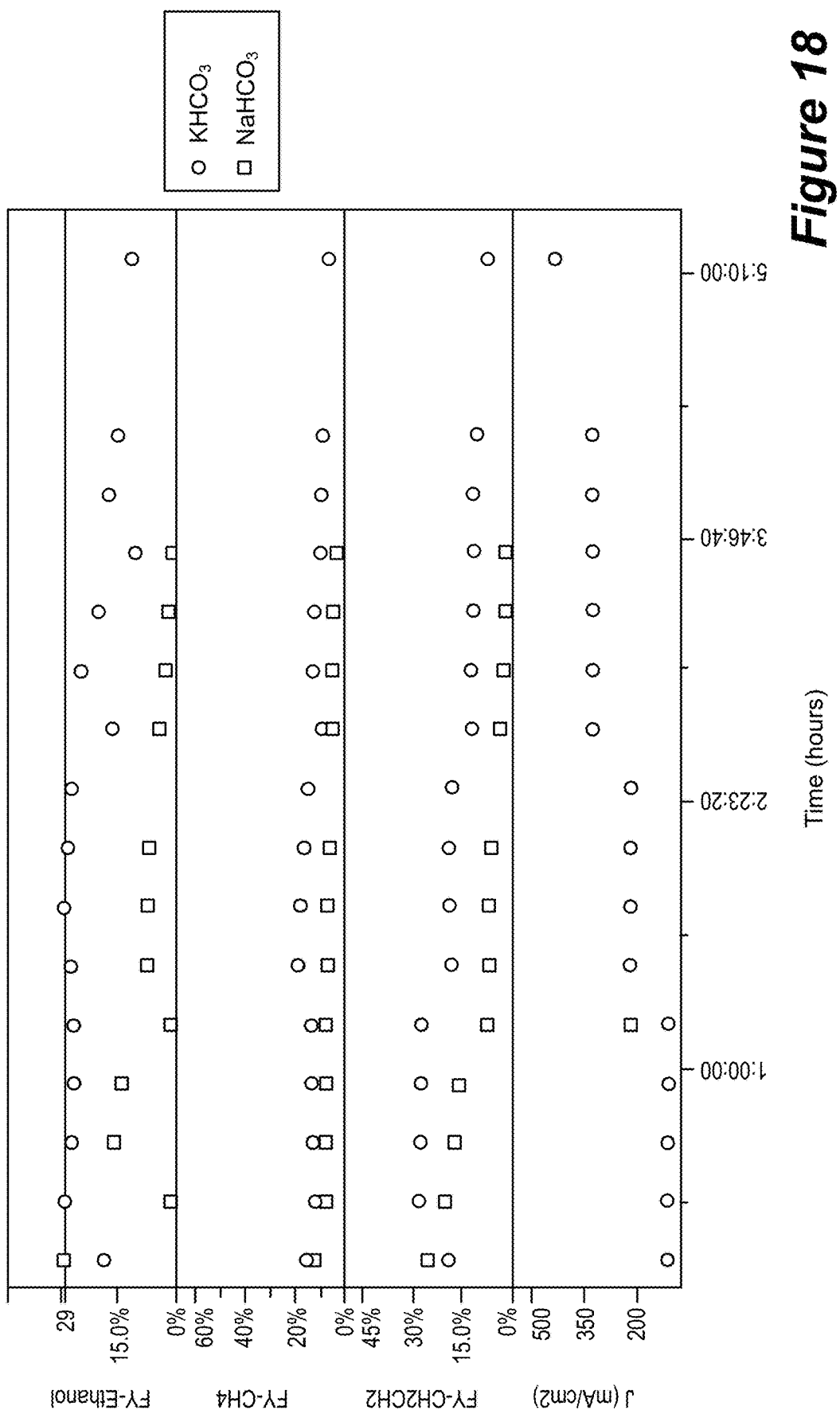
In FIG. 18 presents data illustrating improved selectivity toward ethanol when using $KHCO_3$ versus $NaHCO_3$.

In FIG. 18, improved selectivity toward ethanol was also seen when using a larger cation salt KHCO$_3$ versus the smaller cation NaHCO$_3$.

Figure 19A:
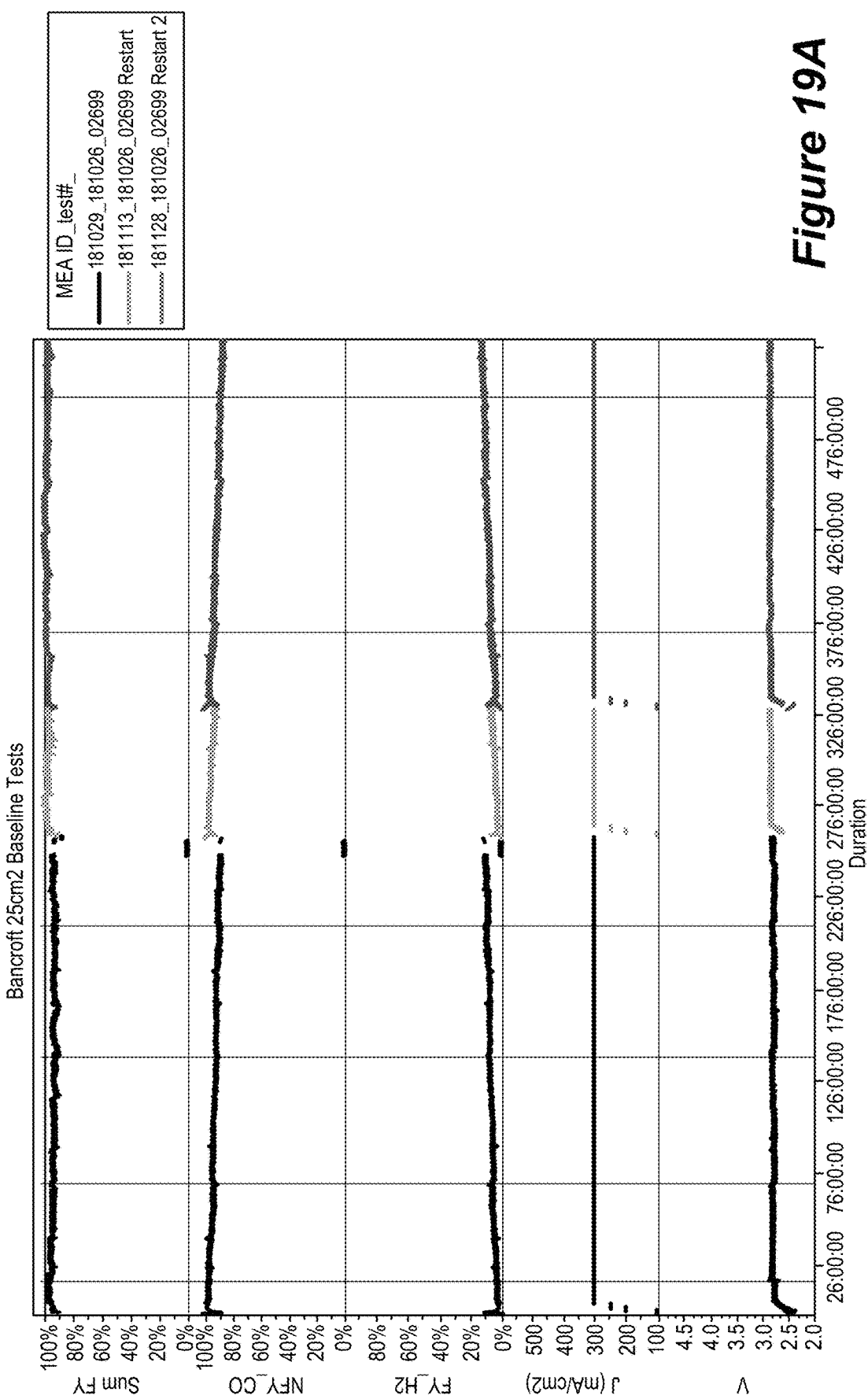

In some implementations, ion concentration will decrease during a long-term run. The addition of extra salts or change the electrolyte reservoir to fresh salt solution will help to recover the selectivity and voltage. FIGS. 19A and 19B (Table) illustrate the selectivity and voltage improvement after fresh salt solution is added or replace the old solution in the anolyte reservoir. The selectivity improves in the range of 0.3-2%, while the voltage is lowered in the range of 10-100 mV. In this example, all cells employed a bipolar MEA and a gold catalyst (cathode). The salt composition was 2 mM NaHCO$_3$. In one test, the salt solution was replenished by changing out solution directly.

Figure 20:
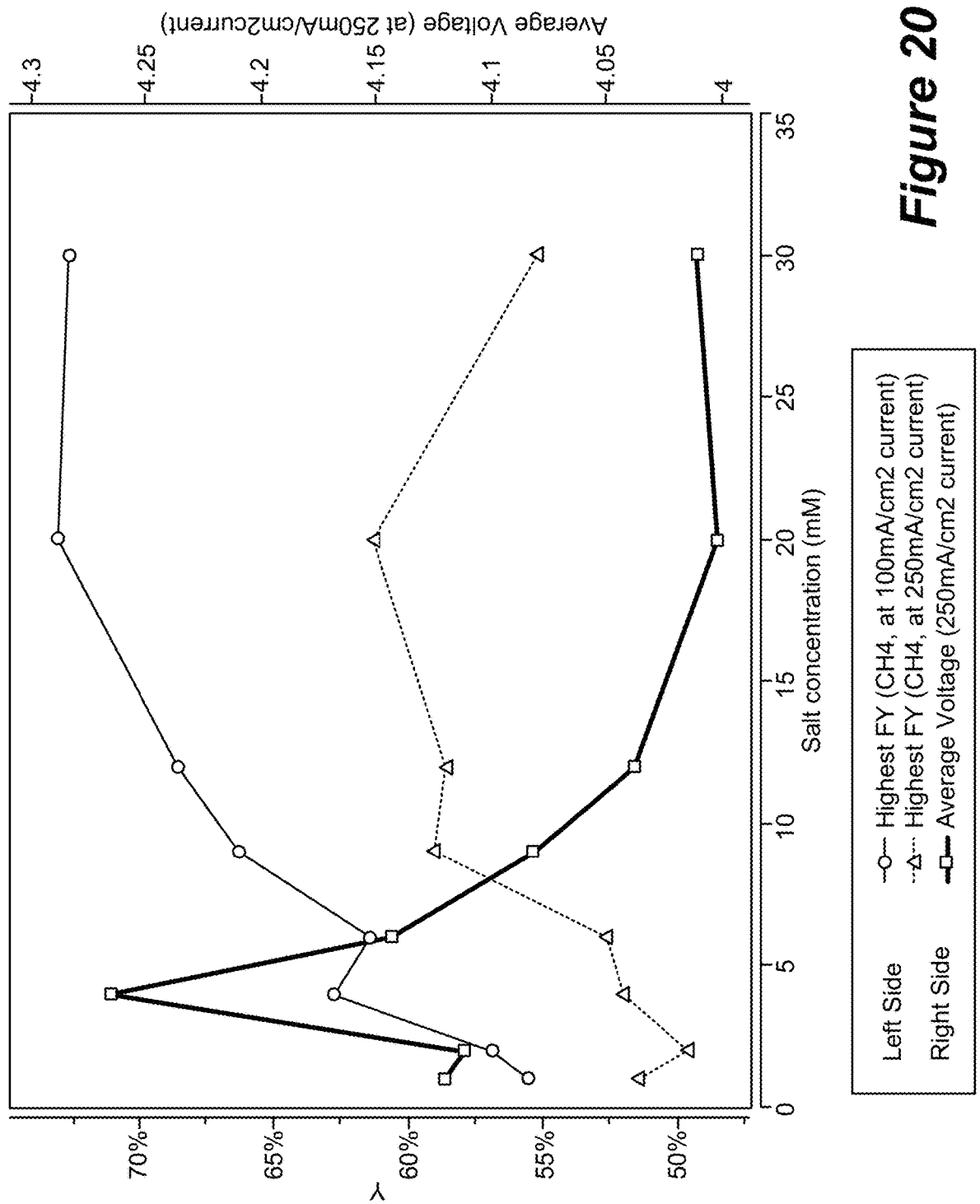
FIG. 20 presents a scan of salt concentration versus the selectivity of a copper catalyst toward methane in the range of 1 mM to 30 mM $NaHCO_3$.

A scan of salt concentration on the selectivity of a copper catalyst toward methane was done in the range of 1 mM to 30 mM NaHCO$_3$. Selectivity for methane was significantly impacted at a low current density of 100 mA/cm$^2$ showing an increase from 55% to 73% methane at the expense of hydrogen generation. Above 20 mM salt concentration the effect of increasing the amount of salt did not appear to positively impact performance. At 250 mA/cm$^2$ a similar improvement in yield was seen from around 52% to 62% methane, and improvement in voltage from 4.25 to 4.00 V with some decline above 20 mA/cm$^2$ salt concentration. See FIG. 20, which shows improved methane selectivity with increasing salt concentration up to 20 mM NaHCO$_3$ in a bipolar MEA cell.

Figure 21A:
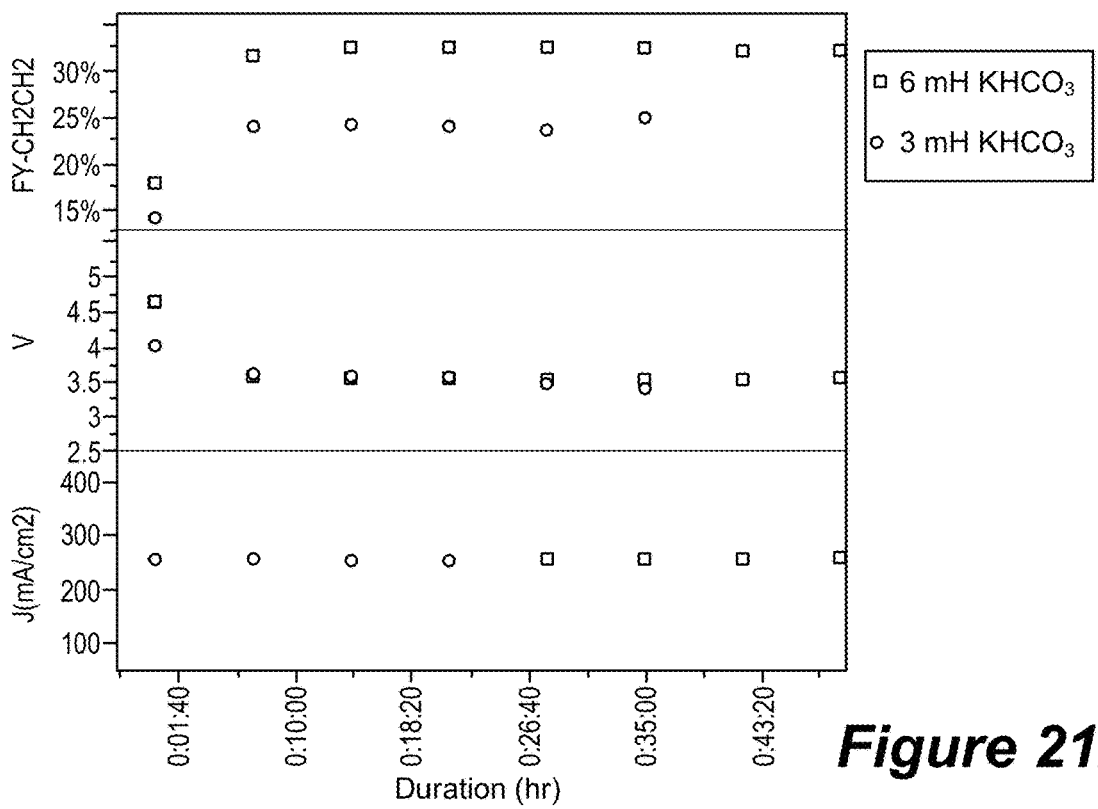
FIGS. 21A and 21B present data from a test of various salts for effect on ethylene selectivity at different concentrations.
Figure 21B:
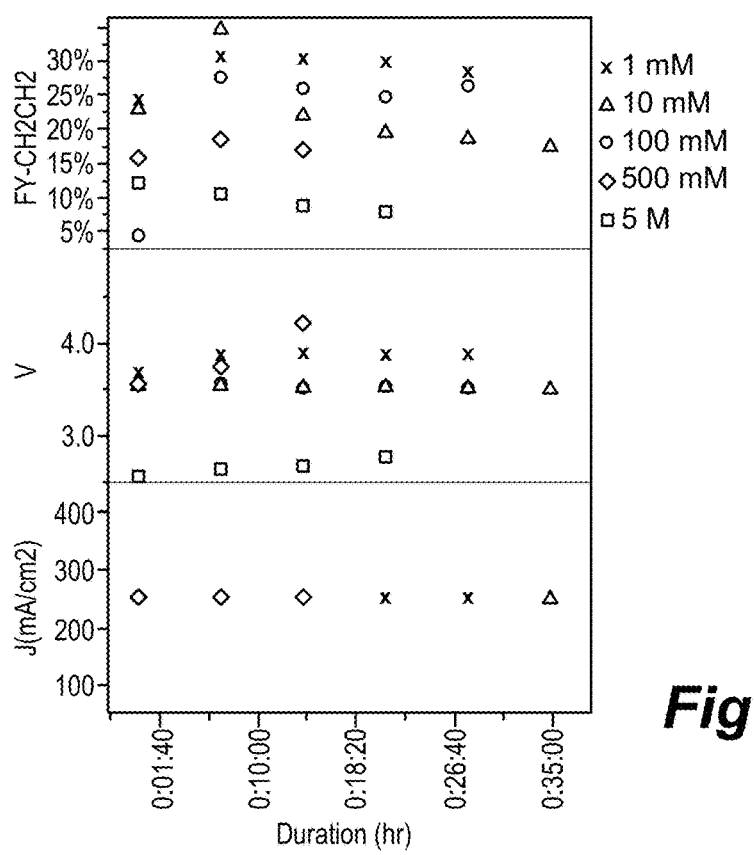

Various salts were tested for effect on ethylene selectivity at different concentrations. An anion conducting polymer only MEA was used with a copper catalyst (cathode). Concentration dependence of potassium bicarbonate salt was seen at 3 and 6 mM levels, with 33% ethylene from carbon monoxide yield at 6 mM. See FIG. 21A, which illustrates the effect of potassium bicarbonate salt in anolyte for CORR ethylene yield in anion conducting polymer only MEA. In contrast, potassium hydroxide salt is shown to improve voltage for the same reaction, with lower voltage seen as higher concentrations of KOH were used. Good performance for ethylene yield was seen at the lower KOH concentrations of around 0.1 and 0.01 M. See FIG. 21B, which illustrates the effect of potassium hydroxide salt concentration in anolyte for CORR ethylene yield in anion conducting polymer only setup.

Other Embodiments

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of electrolytically reducing a carbon oxide, the method comprising:
providing a salt solution to a membrane electrode assembly (MEA) comprising (a) a cathode layer comprising a carbon oxide reduction catalyst that promotes reduction of a carbon oxide; (b) an anode layer comprising a catalyst that promotes oxidation of a water; and (c) a polymer electrolyte membrane (PEM) layer disposed between, and in contact with, the cathode layer and the anode layer, wherein the salt solution comprises at least about 10 uM to less than 100 mM of a salt; and electrolytically reducing a carbon oxide at the cathode of the MEA while the MEA is in contact with the salt solution,
wherein the MEA is bipolar, having at least one layer of a cation conducting polymer, and at least one layer of an anion conducting polymer.

2. The method of claim 1, wherein the carbon oxide is carbon dioxide and wherein the reduction catalyst comprises gold, silver, copper, or a combination thereof.

3. The method of claim 1, wherein the carbon oxide is carbon monoxide and wherein the carbon oxide reduction catalyst comprises gold, silver, copper, or a combination thereof.

4. The method of claim 1, wherein the cathode layer comprises an anion conducting polymer.

5. The method of claim 1, wherein the anode layer comprises a cation conducting polymer.

6. The method of claim 1, wherein the PEM layer comprises a polymer electrolyte layer and a cathode buffer layer.

7. The method of claim 6, wherein the PEM layer comprises a cation conducting polymer and the cathode buffer layer comprises an anion conducting polymer.

8. The method of claim 1, wherein the PEM layer comprises an anion conducting polymer.

9. The method of claim 1, wherein the salt comprises alkali metal ions.

10. The method of claim 1, wherein the salt comprises an anion selected from the group consisting of phosphate, sulfate, carbonate, bicarbonate, and hydroxide.

11. The method of claim 1, wherein the carbon oxide reduction catalyst comprises copper, and wherein the salt comprises (i) an alkali metal cation, and (ii) a bicarbonate, a sulfate, or a hydroxide anion.

12. The method of claim 11, wherein the salt is present in the salt solution at a concentration of about 10 mM to about 50 mM.

13. The method of claim 11, wherein the salt is present in the salt solution at a concentration of about 1 mM to about 50 mM.

14. The method of claim 11, wherein the MEA is configured to produce methane by reducing carbon dioxide and/or carbon monoxide at the cathode layer, and wherein the salt comprises sodium ions.

15. The method of claim 11, wherein the MEA is configured to produce one or more organic compounds having two or more carbon atoms by reducing carbon dioxide and/or carbon monoxide at the cathode layer, and wherein the salt comprises ions of potassium, cesium, rubidium, or any combination thereof.

16. The method of claim 1, wherein the carbon oxide reduction catalyst comprises gold, and wherein the salt comprises (i) an alkali metal cation and (ii) a bicarbonate, hydroxide, or sulfate anion.

17. The method of claim 16, wherein the salt is present in the salt solution at a concentration of about 10 uM to about 20 mM.

18. The method of claim 16, wherein the salt is present in the salt solution at a concentration of about 100 uM to about 20 mM.

19. The method of claim 16, wherein the MEA is configured to produce carbon monoxide by reducing carbon dioxide at the cathode layer, and wherein the salt comprises alkali metal ions.

20. The method of claim 16, wherein the MEA comprises substantially no transition metal ions.

21. The method of claim 1, wherein the carbon oxide reduction catalyst comprises copper, and wherein the salt comprises (i) an alkali metal cation and (ii) a bicarbonate or hydroxide anion.

22. The method of claim 21, wherein the salt is present in the salt solution at a concentration of about 10 mM to about 50 mM.

23. The method of claim 21, wherein the salt is present in the salt solution at a concentration of about 1 mM to about 50 mM.

24. The method of claim 21, wherein the MEA is configured to produce methane by reducing carbon dioxide and/or carbon monoxide at the cathode layer, and wherein the salt comprises sodium ions.

25. The method of claim 21, wherein the MEA is configured to produce one or more organic compounds having two or more carbon atoms by reducing carbon dioxide and/or carbon monoxide at the cathode layer, and wherein the salt comprises ions potassium, cesium, rubidium, or any combination thereof.

26. The method of claim 1, wherein providing a salt solution to the MEA comprises supplying anode water to the anode layer of the MEA.

27. The method of claim 26, further comprising (i) recovering anode water that was supplied to the MEA, and (ii) recirculating recovered anode water to the anode layer of the MEA.

28. The method of claim 27, further comprising storing and/or treating the recovered anode water before recirculating the recovered anode water to the anode layer of the MEA.

29. The method of claim 27, further comprising purifying the anode water and/or the recovered anode water to remove impurities from the anode water.

30. The method of claim 1, further comprising (i) recovering water from a carbon oxide stream after the carbon oxide stream has contacted the cathode layer of the MEA, and (ii) providing recovered water from the carbon oxide stream to the anode layer of the MEA.

31. A method of electrolytically reducing a carbon oxide, the method comprising:
  providing a salt solution to a membrane electrode assembly (MEA) comprising
    (a) a cathode layer comprising a carbon oxide reduction catalyst comprising gold, silver, palladium, copper or a combination thereof, that promotes reduction of a carbon oxide;
    (b) an anode layer comprising a catalyst that promotes oxidation of a water; and
    (c) a polymer electrolyte membrane (PEM) layer disposed between, and in contact with, the cathode layer and the anode layer; and
  electrolytically reducing a carbon oxide at the cathode of the MEA while the MEA is in contact with the salt solution;
wherein the salt comprises (i) an alkali metal cation and (ii) a bicarbonate, hydroxide, or sulfate anion, and the salt is present in the salt solution at a concentration of about 1 mM to about 5 mM, and
wherein the MEA is a bipolar MEA.

32. The method of claim 31, wherein the carbon oxide reduction catalyst comprises gold, and wherein the salt comprises sodium bicarbonate or potassium bicarbonate.

33. The method of claim 32, wherein the salt is present in the salt solution at a concentration of about 2 mM to about 5 mM.

34. The method of claim 32, wherein the salt is potassium bicarbonate, the carbon oxide is carbon dioxide and the salt is present in the salt solution at a concentration of 3 mM.

* * * * *